(12) United States Patent
Gan et al.

(10) Patent No.: US 11,902,887 B2
(45) Date of Patent: Feb. 13, 2024

(54) ACCESS POINT AP MULTI-LINK DEVICE DISCOVERY METHOD AND RELATED APPARATUS

(71) Applicant: HUAWEI TECHNOLOGIES CO., LTD., Guangdong (CN)

(72) Inventors: Ming Gan, Shenzhen (CN); Guogang Huang, Shenzhen (CN); Yiqing Li, Shenzhen (CN); Yifan Zhou, Shenzhen (CN); Mengshi Hu, Shenzhen (CN); Dandan Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/959,034

(22) Filed: Oct. 3, 2022

(65) Prior Publication Data

US 2023/0024407 A1 Jan. 26, 2023

Related U.S. Application Data

(63) Continuation of application No. PCT/CN2021/082828, filed on Mar. 24, 2021.

(30) Foreign Application Priority Data

Apr. 3, 2020 (CN) .......................... 202010263231.7
Jul. 31, 2020 (CN) .......................... 202010763205.0

(51) Int. Cl.
*H04W 4/00* (2018.01)
*H04W 48/16* (2009.01)
(Continued)

(52) U.S. Cl.
CPC ........... *H04W 48/16* (2013.01); *H04W 48/08* (2013.01); *H04W 84/12* (2013.01)

(58) Field of Classification Search
CPC .............................. H04W 48/08; H04W 48/16
(Continued)

(56) References Cited

U.S. PATENT DOCUMENTS

2018/0302783 A1 10/2018 Mestanov et al.
2019/0174577 A1* 6/2019 Patil ...................... H04W 76/11
(Continued)

FOREIGN PATENT DOCUMENTS

CN   107205259 A   9/2017
CN   107920354 A   4/2018
(Continued)

OTHER PUBLICATIONS

IEEE Std 802.11-2016, "Telecommunications and Information Exchange Between Systems Local and Metropolitan Area Networks—Specific Requirements, Part 11: Wireless LAN Medium Access Control (MAC) and Physical Layer (PHY) Specifications," Approved Dec. 7, 2016, 3534 pages.
(Continued)

*Primary Examiner* — Temica M Beamer
(74) *Attorney, Agent, or Firm* — Fish & Richardson P.C.

(57) ABSTRACT

Embodiments of this application provide an access point (AP) multi-link device discovery method and a related apparatus, for example, in a wireless local area network (WLAN) supporting IEEE 802.11be. In an example method, a reporting AP sends a first management frame to a station. The first management frame carries information about a reported AP. The reporting AP is affiliated with an AP multi-link device. The reported AP is affiliated with the same multi-link device as the reporting AP. Or the reported AP belongs to a same multiple basic service set identifier (BSSID) set as another AP in the multi-link device with which the reporting AP is affiliated.

30 Claims, 22 Drawing Sheets

(51) Int. Cl.
*H04W 48/08* (2009.01)
*H04W 84/12* (2009.01)

(58) Field of Classification Search
USPC .......................................................... 370/328
See application file for complete search history.

(56) References Cited

U.S. PATENT DOCUMENTS

| 2019/0268221 | A1 | 8/2019 | Xiao et al. | |
|---|---|---|---|---|
| 2019/0335454 | A1 | 10/2019 | Huang et al. | |
| 2021/0282229 | A1* | 9/2021 | Stacey | H04W 48/16 |

FOREIGN PATENT DOCUMENTS

| CN | 110831107 A | 2/2020 |
|---|---|---|
| WO | 2020040589 A1 | 2/2020 |
| WO | 2020043433 A1 | 3/2020 |

OTHER PUBLICATIONS

IEEE P802.11ax/D6.0, "Draft Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications, Amendment Enhancements for High Efficiency WLAN," Nov. 2019, 780 pages.
International Search Report and Written Opinion in International Appln. No. PCT/CN2021/082828, dated Jun. 2, 2021, 18 pages (with English translation).
Office Action in Indian Appln. No. 202237058327, dated Feb. 16, 2023, 8 pages (with English translation).
Office Action in Chinese Appln. No. 202211586489.6, dated May 15, 2023, 7 pages.
Cariou et al., "Multi-link discovery—part 1," IEEE 802.11-20/0389r0, Mar. 15, 2020, 13 pages.
Cariou et al., "Multi-link discovery—part 2," IEEE 802.11-20/0390r0, Feb. 13, 2020, 13 pages.
Office Action in Japanese Appln. No. 2022-560030, dated Aug. 22, 2023, 8 pages (with English translation).
International Standard ISO/IEC/IEEE 8802-11, "Information technology—Telecommunications and information exchange between systems—Local and metropolitan area networks—Specific requirements—Part 11: Wireless LAN medium access control (MAC) and physical layer (PHY) specifications," IEEE Standard, IEEE, Piscataway, NJ USA, May 15, 2018, 3538 pages.
Extended European Search Report in European Appln No. 21779303.3, dated Jul. 20, 2023, 68 pages.
Gan et al., "Discovery mechanism for MLD," IEEE 802.11-20/0615-00-00be, May 10, 2020, 9 pages.

* cited by examiner

| Neighbor AP TBTT offset (neighbor AP TBTT offset) | BSSID (optional) (BSSID (optional)) | Short SSID (optional) (short SSID (optional)) | BSS parameter (optional) (BSS (optional)) | MLD identifier (optional) (MLD-index (optional)) |

Bit 0 ... Bit 7

| OCT recommended (OCT recommended) | Same SSID (same SSID) | Multiple BSSID (multiple BSSID) | Transmitted BSSID (transmitted BSSID) | Member of an extended service set with a 2.4/5 GHz co-located AP (member of ESS with 2.4/5 GHz co-located AP) | Unsolicited probe response active (unsolicited probe response active) | Co-located AP (co-located AP) | Same MLD (same MLD) |

FIG. 8(b)

| Neighbor AP TBTT offset (neighbor AP TBTT offset) | BSSID (optional) (BSSID (optional)) | Short SSID (optional) (short SSID (optional)) | BSS parameter (optional) (BSS (optional)) | MLD identifier (optional) (MLD-index (optional)) | Multiple BSSID set identifier (optional) (multiple BSSID set-index (optional)) | Link identifier (optional) (Link ID (optional)) |
|---|---|---|---|---|---|---|

Bit 0 ........ Bit 7

| OCT recommended (OCT recommended) | Same SSID (same SSID) | Multiple BSSID (multiple BSSID) | Transmitted BSSID (transmitted BSSID) | Member of an extended service set with a 2.4/5 GHz co-located AP (member of ESS with 2.4/5 GHz co-located AP) | Unsolicited probe response active (unsolicited probe response active) | Co-located AP (co-located AP) | Co-MLD (Co-MLD) |
|---|---|---|---|---|---|---|---|

FIG. 8(c)

| Category (category) | FT action (FT action) | STA address (STA address) | Target AP address (target AP address) | FT request frame body (FT request frame body) |
|---|---|---|---|---|

Byte length    1    1    6    6    Variable

| Category (category) | FT action (FT action) | STA address (STA address) | Target AP address (target AP address) | Status code (status code) | FT request frame body (FT request frame body) |
|---|---|---|---|---|---|

Byte length    1    1    6    6    2    Variable

US 11,902,887 B2

ACCESS POINT AP MULTI-LINK DEVICE DISCOVERY METHOD AND RELATED APPARATUS

CROSS-REFERENCE TO RELATED APPLICATIONS

This application is a continuation of International Application No. PCT/CN2021/082828, filed on Mar. 24, 2021, which claims priority to Chinese Patent Application No. 202010763205.0, filed on Jul. 31, 2020 and Chinese Patent Application No. 202010263231.7, filed on Apr. 3, 2020. All of the aforementioned patent applications are hereby incorporated by reference in their entireties.

TECHNICAL FIELD

This application relates to the field of communication technologies, and in particular, to an access point AP multi-link device discovery method and a related apparatus.

BACKGROUND

To greatly increase a service transmission rate of a WLAN system, the Institute of Electrical and Electronics Engineers ((Institute of Electrical and Electronics Engineers, IEEE) 802.11ax) standard further uses an orthogonal frequency division multiple access (Orthogonal Frequency Division Multiple Access, OFDMA) technology based on an existing orthogonal frequency division multiplexing (Orthogonal Frequency Division Multiplexing, OFDM) technology. The OFDMA technology supports a plurality of nodes to simultaneously send and receive data. This achieves multi-station diversity gains. In 2017 when the 802.11ax standard is finalized, the Federal Communications Commission (Federal Communications Commission, FCC) of the United States released a new free frequency band 5925-7125 MHz, which is referred to as 6 GHz in the following. In this case, 802.11ax standard workers expand an operating range of 802.11ax devices from 2.4 GHz and 5 GHz to 2.4 GHz, 5 GHz, and 6 GHz in the 802.11ax project authorization request (Project Authorization Request, PAR).

IEEE 802.11 next-generation Wi-Fi protocol (extremely high throughput, EHT) devices need to be forward compatible. Therefore, they also support operating spectrums of 802.11ax devices, that is, 2.4 GHz, 5 GHz, and 6 GHz frequency bands. Channel division is performed based on the newly opened free 6 GHz frequency band, and a supportable bandwidth may exceed a maximum bandwidth 160 MHz supported in 5 GHz, for example, may be 320 MHz. In IEEE 802.11ax next-generation Wi-Fi Extremely High Throughput protocol, a peak throughput may also be increased by using more streams, for example, increasing a quantity of streams to 16, through cooperation with multiple frequency bands (2.4 GHz, 5 GHz, and 6 GHz), or in another manner, in addition to using an ultra-high bandwidth. On a same frequency band, a peak throughput may be further increased through cooperation of multiple channels or in another manner. This reduces a service transmission delay. In the following, multiple frequency bands or multiple channels are collectively referred to as multiple links. Although multiple links are configured for 802.11ax Wi-Fi and earlier Wi-Fi that have a same operating frequency band, a different basic service set (Basic Service Set, BSS) is usually established for each of the multiple links, and communication with a station in a BSS to which the link belongs can be performed on only one link at the same time.

Main functions of 802.11ax and an earlier multiple (Multiple) basic service set identifier (Basic Service Set identifier, BSSID) technology are to virtualize one physical AP into a plurality of logical APs, that is, forming a plurality of virtual networks. Each virtual network is used to manage different stations. Similar to AP products in a current WIFI scenario, an AP can be virtualized into a home AP (home AP) and a guest AP (guest AP).

How to enable a station to quickly discover an AP multi-link device, so as to help the station to quickly find an appropriate AP for association is a technical problem that is being studied by persons skilled in the art.

SUMMARY

Embodiments of this application disclose an AP multi-link device discovery method and a related apparatus, to better discover a link.

According to a first aspect, an embodiment of this application provides an AP multi-link device discovery method. The method includes:

A reporting AP sends a first management frame to a station. The first management frame carries information about a neighbor AP, and the reporting AP is affiliated to an AP multi-link device.

The information about the neighbor AP includes one or more of first information, second information, or third information.

The first information indicates whether a reported AP is affiliated to the same MLD as the reporting AP or whether the reported AP belongs to a same multiple BSSID set as a member of the MLD to which the reporting AP is affiliated.

The second information indicates whether the reported AP belongs to the same multiple BSSID set as the member of the MLD to which the reporting AP is affiliated.

The third information indicates whether the reported AP is affiliated to the same MLD as the reporting AP.

In the foregoing method, a reduced neighbor report element of the first management frame carries information about the MLD to which the reported AP is affiliated and information about a multiple BSSID set to which the reported AP belongs, so that the station receiving the first management frame can learn of, based on the information, a basic status of each reported AP in the MLD and the multiple BSSID set, so as to better select an appropriate AP from the reporting AP and the reported AP for association.

According to a second aspect, an embodiment of this application provides an AP multi-link device discovery method. The method includes the following step:

A station receives a first management frame sent by a reporting AP. The first management frame carries information about a neighbor AP, and the reporting AP is affiliated to an AP multi-link device.

The information about the neighbor AP includes one or more of first information, second information, or third information.

The first information indicates whether a reported AP is affiliated to the same MLD as the reporting AP or whether the reported AP belongs to a same multiple BSSID set as a member of the MLD to which the reporting AP is affiliated.

The second information indicates whether the reported AP belongs to the same multiple BSSID set as the member of the MLD to which the reporting AP is affiliated.

The third information indicates whether the reported AP is affiliated to the same MLD as the reporting AP.

In the foregoing method, a reduced neighbor report element of the first management frame carries information about the MLD to which the reported AP is affiliated and information about a multiple BSSID set to which the reported AP belongs, so that the station receiving the first management frame can learn of, based on the information, a basic status of each reported AP in the MLD and the multiple BSSID set, so as to better select an appropriate AP from the reporting AP and the reported AP for association.

According to a third aspect, an embodiment of this application provides an AP multi-link device discovery apparatus. The apparatus includes:

a sending unit, configured to send a first management frame to a station, where the first management frame carries information about a neighbor AP, and the reporting AP is affiliated to an AP multi-link device.

The information about the neighbor AP includes one or more of first information, second information, or third information.

The first information indicates whether a reported AP is affiliated to the same MLD as the reporting AP or whether the reported AP belongs to a same multiple BSSID set as a member of the MLD to which the reporting AP is affiliated.

The second information indicates whether the reported AP belongs to the same multiple BSSID set as the member of the MLD to which the reporting AP is affiliated.

The third information indicates whether the reported AP is affiliated to the same MLD as the reporting AP.

In the foregoing method, a reduced neighbor report element of the first management frame carries information about the MLD to which the reported AP is affiliated and information about a multiple BSSID set to which the reported AP belongs, so that the station receiving the first management frame can learn of, based on the information, a basic status of each reported AP in the MLD and the multiple BSSID set, so as to better select an appropriate AP from the reporting AP and the reported AP for association.

According to a fourth aspect, an embodiment of this application provides an AP multi-link device discovery apparatus. The apparatus includes:

a receiving unit, configured to receive a first management frame sent by a reporting AP, where the first management frame carries information about a neighbor AP, and the reporting AP is affiliated to an AP multi-link device.

The information about the neighbor AP includes one or more of first information, second information, or third information.

The first information indicates whether a reported AP is affiliated to the same MLD as the reporting AP or whether the reported AP belongs to a same multiple BSSID set as a member of the MLD to which the reporting AP is affiliated.

The second information indicates whether the reported AP belongs to the same multiple BSSID set as the member of the MLD to which the reporting AP is affiliated.

The third information indicates whether the reported AP is affiliated to the same MLD as the reporting AP.

In the foregoing method, a reduced neighbor report element of the first management frame carries information about the MLD to which the reported AP is affiliated and information about a multiple BSSID set to which the reported AP belongs, so that the station receiving the first management frame can learn of, based on the information, a basic status of each reported AP in the MLD and the multiple BSSID set, so as to better select an appropriate AP from the reporting AP and the reported AP for association.

In a possible implementation of the first aspect, the second aspect, the third aspect, or the fourth aspect, the information about the neighbor AP further includes fourth information. The fourth information indicates whether the reported AP belongs to a multiple BSSID set.

In a possible implementation of the first aspect, the second aspect, the third aspect, or the fourth aspect, the information about the neighbor AP further includes eighth information. The eighth information includes an MLD index of the MLD to which the reported AP is affiliated.

In a possible implementation of the first aspect, the second aspect, the third aspect, or the fourth aspect, the reported AP is affiliated to the same MLD as the reporting AP or belongs to the same multiple BSSID set as the member of the MLD to which the reporting AP is affiliated, the information about the neighbor AP includes the eighth information.

In a possible implementation of the first aspect, the second aspect, the third aspect, or the fourth aspect, the reported AP belongs to the same multiple BSSID set as the member of the MLD to which the reporting AP is affiliated, the information about the neighbor AP includes the eighth information.

In a possible implementation of the first aspect, the second aspect, the third aspect, or the fourth aspect, the information about the neighbor AP further includes ninth information. The ninth information includes a multiple BSSID set index of the multiple BSSID set to which the reported AP belongs.

In a possible implementation of the first aspect, the second aspect, the third aspect, or the fourth aspect,
the reported AP belongs to the multiple BSSID set, and
the reported AP is affiliated to the same MLD as the reporting AP,
the information about the neighbor AP includes the ninth information.

In a possible implementation of the first aspect, the second aspect, the third aspect, or the fourth aspect, the reported AP belongs to the same multiple BSSID set as the member of the MLD to which the reporting AP is affiliated,
the information about the neighbor AP includes the ninth information.

In a possible implementation of the first aspect, the second aspect, the third aspect, or the fourth aspect, the information about the neighbor AP further includes fifth information. The fifth information indicates a link identifier of the reported AP.

In a possible implementation of the first aspect, the second aspect, the third aspect, or the fourth aspect, the information about the neighbor AP further includes one or more of sixth information or seventh information.

The sixth information indicates a link identifier of the reporting AP and/or a MAC address of the MLD to which the reporting AP is affiliated.

In an implementation, the sixth information is located in an MLD element of the first management frame.

In an implementation, the reporting AP in the AP MLD sends the first management frame on a link on which the reporting AP operates. The first management frame carries the MLD element.

In an implementation, the MLD element includes MLD common information, but does not carry subelement information corresponding to each AP. The MLD common information includes at least one of an MLD MAC address, a link identifier, or an MLD index.

The MLD index indicates a sequence number of an AP MLD, and is the same as an MLD index indicated by the eighth information in the reduced neighbor report element (Reduced Neighbor Report element, RNR element) in the first management frame. In other words, the same AP MLD means that the MLD index that is carried in the RNR element carried in the first management frame is the same as the MLD index that is carried in the MLD element carried in the first management frame.

The seventh information indicates whether the first management frame carries information about all first reported APs, or indicates whether the management frame carries the information about all the first reported APs and information about members of a multiple BSSID set to which all the first reported APs belong. The first reported AP is an AP member other than the reporting AP of the MLD to which the reporting AP is affiliated.

In a possible implementation of the first aspect, the second aspect, the third aspect, or the fourth aspect, the information about the neighbor AP is carried in a reduced neighbor report element or a neighbor report element.

In a possible implementation of the first aspect, the second aspect, the third aspect, or the fourth aspect, the first management frame is a beacon frame or a probe response frame.

According to a fifth aspect, an embodiment of this application provides an AP multi-link device discovery method. The method includes the following step:

A reporting AP sends a second management frame to a station. The second management frame carries information about a neighbor AP, and the reporting AP is affiliated to an AP multi-link device. The information about the neighbor AP includes first information. The first information includes one or more of the following content:
  whether a reported AP is affiliated to the same MLD as the reporting AP;
  whether the reported AP is an AP in an MLD; or
  whether the reported AP is affiliated to a same MLD as a previous reported AP.

In the foregoing method, a neighbor report element of the second management frame carries information about an MLD to which a reported AP is affiliated, so that the station receiving the second management frame can learn of a basic status of each reported AP in the MLD based on the information. This helps select, from the neighbor APs, a candidate AP present during BSS transition of the station.

According to a sixth aspect, an embodiment of this application provides an AP multi-link device discovery method. The method includes the following step:

A station receives a second management frame sent by a reporting AP. The second management frame carries information about a neighbor AP, and the reporting AP is affiliated to an AP multi-link device. The information about the neighbor AP includes first information. The first information includes one or more of the following content:
  whether a reported AP is affiliated to the same MLD as the reporting AP;
  whether the reported AP is an AP in an MLD; or
  whether the reported AP is affiliated to a same MLD as a previous reported AP.

In the foregoing method, a neighbor report element of the second management frame carries information about an MLD to which a reported AP is affiliated, so that the station receiving the second management frame can learn of a basic status of each reported AP in the MLD based on the information. This helps select, from the neighbor APs, a candidate AP present during BSS transition of the station.

According to a seventh aspect, an embodiment of this application provides an AP multi-link device discovery apparatus. The apparatus includes:
  a sending unit, configured to send a second management frame to a station, where the second management frame carries information about a neighbor AP, and the reporting AP is affiliated to an AP multi-link device; and the information about the neighbor AP includes first information, and the first information includes one or more of the following content:
    whether a reported AP is affiliated to the same MLD as the reporting AP;
    whether the reported AP is an AP in an MLD; or
    whether the reported AP is affiliated to a same MLD as a previous reported AP.

In the foregoing method, a neighbor report element of the second management frame carries information about an MLD to which a reported AP is affiliated, so that the station receiving the second management frame can learn of a basic status of each reported AP in the MLD based on the information. This helps select, from the neighbor APs, a candidate AP present during BSS transition of the station.

According to an eighth aspect, an embodiment of this application provides an AP multi-link device discovery apparatus. The apparatus includes:
  a receiving unit, configured to receive a second management frame sent by a reporting AP, where the second management frame carries information about a neighbor AP, and the reporting AP is affiliated to an AP multi-link device; and the information about the neighbor AP includes first information, and the first information includes one or more of the following content:
    whether a reported AP is affiliated to the same MLD as the reporting AP;
    whether the reported AP is an AP in an MLD; or
    whether the reported AP is affiliated to a same MLD as a previous reported AP.

In the foregoing method, a neighbor report element of the second management frame carries information about an MLD to which a reported AP is affiliated, so that the station receiving the second management frame can learn of a basic status of each reported AP in the MLD based on the information. This helps select, from the neighbor APs, a candidate AP present during BSS transition of the station.

In a possible implementation of the fifth aspect, the sixth aspect, the seventh aspect, or the eighth aspect, the information about the neighbor AP further includes second information. The second information includes one or more of a MAC address of the AP multi-link device MLD to which the reported AP is affiliated, a count of APs included in the AP multi-link device MLD to which the reported AP is affiliated, an indication of a simultaneous transmitting/receiving STR capability between APs in the AP multi-link device MLD to which the reported AP is affiliated, a link identifier corresponding to the reported AP, or information about APs other than the reported AP in the AP multi-link device MLD to which the reported AP is affiliated.

In a possible implementation of the fifth aspect, the sixth aspect, the seventh aspect, or the eighth aspect, if the reported AP is an AP in an MLD, the information about the neighbor AP further includes the second information.

In a possible implementation of the fifth aspect, the sixth aspect, the seventh aspect, or the eighth aspect, the second information specifically includes a MAC address of the AP multi-link device MLD to which the reported AP is affiliated.

In a possible implementation of the fifth aspect, the sixth aspect, the seventh aspect, or the eighth aspect, information about each of the APs other than the reported AP in the AP multi-link device to which the reported AP is affiliated is carried in one neighbor report element.

In a possible implementation of the fifth aspect, the sixth aspect, the seventh aspect, or the eighth aspect, the information about the neighbor AP includes an operating class, a channel number, and a BSSID, and the information about the neighbor AP is carried in a neighbor report element.

In a possible implementation of the fifth aspect, the sixth aspect, the seventh aspect, or the eighth aspect, the information about the neighbor AP includes a link identifier, and the information about the neighbor AP is carried in a neighbor report element.

In a possible implementation of the fifth aspect, the sixth aspect, the seventh aspect, or the eighth aspect, the first information is specifically carried in a reserved field of a BSSID information field in the neighbor report element or in the reduced neighbor report element.

In a possible implementation of the fifth aspect, the sixth aspect, the seventh aspect, or the eighth aspect, the second information is specifically carried in an optional subelement field of the neighbor report element.

In a possible implementation of the fifth aspect, the sixth aspect, the seventh aspect, or the eighth aspect, the second management frame is a beacon frame, a probe response frame, an association response frame, a reassociation response frame, or an authentication frame.

According to a ninth aspect, an embodiment of this application provides a fast BSS transition method. The method includes:

sending a fast transition request frame to an associated current access point AP, where the fast transition request frame is for requesting transition to a target AP, and the target AP is an AP in an AP multi-link device MLD; and receiving a fast transition response frame sent by the current AP, where the fast transition response frame includes first address information.

The fast transition request frame and the fast transition response frame include the first address information, and the first address information includes a MAC address of an MLD to which a station sending the fast transition request frame is affiliated and a MAC address of an MLD to which the target AP is affiliated.

The foregoing method can help all stations in the multi-link device participate in fast transition.

According to a tenth aspect, an embodiment of this application provides a fast BSS transition method. The method includes the following steps:

A current access point AP receives a fast transition request frame sent by a station. The fast transition request frame is for requesting transition to a target AP, and the target AP is an AP in an AP multi-link device MLD.

The current AP sends a fast transition response frame to the station. The fast transition response frame includes first address information.

The fast transition request frame and the fast transition response frame include first address information, and the first address information includes a MAC address of an MLD to which the station sending the fast transition request frame is affiliated and a MAC address of an MLD to which the target AP is affiliated.

The foregoing method can help all stations in the multi-link device participate in fast transition.

According to an eleventh aspect, an embodiment of this application provides a fast BSS transition apparatus. The apparatus includes:

a sending unit, configured to send a fast transition request frame to an associated current access point AP, where the fast transition request frame is for requesting transition to a target AP, and the target AP is an AP in an AP multi-link device MLD; and a receiving unit, configured to receive a fast transition response frame sent by the current AP, where the fast transition response frame includes first address information.

The fast transition request frame and the fast transition response frame include first address information, and the first address information includes a MAC address of an MLD to which a station sending the fast transition request frame is affiliated and a MAC address of an MLD to which the target AP is affiliated.

The foregoing method can help all stations in the multi-link device participate in fast transition.

According to a twelfth aspect, an embodiment of this application provides a fast BSS transition apparatus. The apparatus includes:

a receiving unit, configured to receive a fast transition request frame sent by a station, where the fast transition request frame is for requesting to transition to a target AP, and the target AP is an AP in an AP multi-link device MLD; and a sending unit, configured to send a fast transition response frame to the station, where the fast transition response frame includes first address information.

The fast transition request frame and the fast transition response frame include first address information, and the first address information includes a MAC address of an MLD to which the station sending the fast transition request frame is affiliated and a MAC address of an MLD to which the target AP is affiliated.

The foregoing method can help all stations in the multi-link device participate in fast transition.

In a possible implementation of the ninth aspect, the tenth aspect, the eleventh aspect, or the twelfth aspect, the MAC address, in the first address information, of the MLD to which the station sending the fast transition request frame and the fast transition response frame is affiliated is carried in a station address field; and a MAC address, in the first address information, of the MLD to which the target AP is affiliated is carried in a target AP address field.

According to a thirteenth aspect of embodiments of this application, a computer-readable storage medium is provided. The computer-readable storage medium stores computer program code. When a computer program runs on a processor, the processor is enabled to perform the method in any one of the first aspect, the second aspect, the fifth aspect, the sixth aspect, the ninth aspect, or the tenth aspect, and the corresponding possible implementations.

According to a fourteenth aspect of embodiments of this application, a computer program product is provided. The program product stores a computer program (instructions) executed by the foregoing processor. When the computer program runs on the processor, the processor is enabled to perform the method in any one of the first aspect, the second aspect, the fifth aspect, the sixth aspect, the ninth aspect, or the tenth aspect, and the corresponding possible implementations.

According to a fifteenth aspect of embodiments of this application, a communication apparatus is provided. The apparatus includes a processor, and may further include a transceiver and a memory. The transceiver is configured to send and receive information, or is configured to communicate with another network element. The memory is configured to store a computer program (instructions). The processor is configured to execute the computer program to support the communication apparatus to perform the method in any one of the first aspect, the second aspect, the fifth aspect, the sixth aspect, the ninth aspect, or the tenth aspect, and the corresponding possible implementations.

According to a sixteenth aspect of embodiments of this application, a communication apparatus is provided. The apparatus may exist in a product form of a chip. A structure of the apparatus includes a processor, and may further include a memory. The memory is configured to be coupled to the processor and store a program (instructions) and data that are necessary for the apparatus. The processor is configured to execute the computer program stored in the memory, to support the communication apparatus to perform the method in any one of the first aspect, the second aspect, the fifth aspect, the sixth aspect, the ninth aspect, or the tenth aspect, and the corresponding possible implementations. Optionally, the memory may be located in the processor, and is an internal storage. Alternatively, the processor may be located outside the processor, is coupled to the processor, and is an external storage.

According to a seventeenth aspect of embodiments of this application, a communication apparatus is provided. The apparatus may exist in a product form of a chip. A structure of the apparatus includes a processor and an interface circuit. The processor is configured to communicate with another apparatus by using a receiving circuit, so that the apparatus performs the method in any one of the first aspect, the second aspect, the fifth aspect, the sixth aspect, the ninth aspect, or the tenth aspect, and the corresponding possible implementations.

BRIEF DESCRIPTION OF DRAWINGS

The following describes accompanying drawings used in embodiments of this application.

FIG. 8(b) is a schematic diagram of a format of still another TBTT information field according to an embodiment of this application;

FIG. 8(c) is a schematic diagram of a format of yet another TBTT information field according to an embodiment of this application;

DESCRIPTION OF EMBODIMENTS

Figure 1:
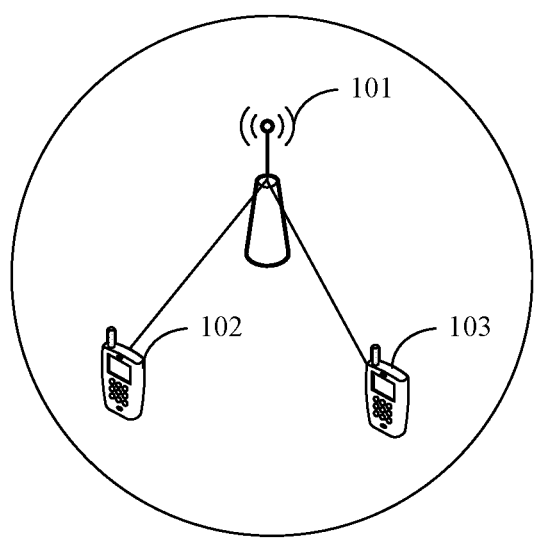
FIG. 1 is a schematic diagram of a structure of a communication system according to an embodiment of this application.

The following first describes related technologies in this application, and then describes embodiments of this application with reference to the accompanying drawings.

An embodiment of this application provides a communication method applied to a wireless communication system. The wireless communication system may be a wireless local area network (Wireless local area network, WLAN) or a cellular network. The method may be performed by a communication device in the wireless communication system or a chip or a processor in the communication device. The communication device may be a wireless communication device that supports concurrent transmission performed on multiple links. For example, the communication device is referred to as a multi-link device (Multi-link device) or a multi-band device (multi-band device). For example, in the wireless local area network, the communication device supports communication performed by using IEEE 802.11 series protocols, and the IEEE 802.11 series protocols includes: 802.11be, 802.11ax, or 802.11a/b/g/n/ac.

1. A multi-link device (Multi-link device, MLD) is also referred to as a multi-band device (multi-band device).

The multi-link device MLD includes one or more affiliated stations, and the affiliated station is a logical station. "A multi-link device includes an affiliated station" is also briefly described as "A multi-link device includes a station" in embodiments of this application. An affiliated station may be an access point (Access Point, AP) or a non-access point station (non-access point station, non-AP STA). For ease of description, in this application, a multi-link device whose affiliated station is an AP may be referred to as a multi-link AP, a multi-link AP device, or an AP multi-link device (AP multi-link device), and a multi-link device whose affiliated station is a non-AP STA may be referred to as a multi-link STA, a multi-link STA device, or a STA multi-link device (STA multi-link device).

The multi-link device MLD may implement wireless communication in compliance with 802.11 series protocols, for example, in compliance with the Extremely High Throughput (Extremely High Throughput, EHT) protocol, or in compliance with 802.11be—based or 802.11be—compatible protocol, thereby implementing communication with another device. The another device may be a multi-link device or may not be a multi-link device.

Each logical station may operate on one link, but a plurality of logical stations are allowed to operate on a same link. A link identifier mentioned below identifies or represents one station operating on one link. In other words, if there is more than one logical station on one link, more than one link identifier is required to identify or represent the logical stations. The link identifier mentioned below sometimes also indicates a station operating on the link. If data transmission is performed between a multi-link device and another multi-link device, before communication, the multi-link device and the another multi-link device may first negotiate or communicate with each other about a correspondence between a link identifier and a link or a station on a link, or an AP multi-link device indicates a correspondence between a link identifier and a link or a station on a link through a broadcast management frame, for example, a beacon frame. Therefore, during data transmission, a link identifier is carried without transmitting a large amount of signaling information to indicate a link or a station on a link. This reduces signaling overheads and improves transmission efficiency.

The following uses an example in which the foregoing one multi-link device is an AP multi-link device, and the foregoing another multi-link device is a STA multi-link device for description. In an example, when the AP multi-link device establishes a BSS, a management frame, for example, a beacon frame, sent by the AP multi-link device carries an element including a plurality of link identifier information fields. Each link identifier information field may indicate a correspondence between a link identifier and a station operating on a link. Each link identifier information field includes a link identifier, and further includes one or more of a MAC address, an operating class, or a channel number. One or more of the MAC address, the operating class, or the channel number may identify a link. In another example, in a multi-link association establishment process, the AP multi-link device and the STA multi-link device negotiate for a plurality of link identifier information fields. In subsequent communication, the AP multi-link device or the STA multi-link device identifies or represents a station in the multi-link device by using a link identifier. The link identifier may further represent one or more attributes of a MAC address, an operating set, and a channel number of the station. The MAC address may alternatively be an association identifier of the associated AP multi-link device. Optionally, if a plurality of stations operate on one link, meanings represented by a link identifier (which is a numeric ID) include not only a channel number and an operating class in which the link is located, but also an identifier of a station operating on the link, for example, a MAC address or an AID of a station.

FIG. 1 is an example diagram of an application scenario to which an embodiment of this application is applied. The application scenario includes a first station 101 and a second station 102. Multiple links may be used for communication between the first station 101 and the second station 102, to improve a throughput. The first station may be a multi-link device, and the second station may be a single-link device, a multi-link device, or the like. In a scenario, the first station 101 is an AP multi-link device, and the second station 102 is a STA multi-link device or a station (for example, a single-link station). In another scenario, the first station 101 is a STA multi-link device, and the second station 102 is an AP (for example, a single-link AP) or an AP multi-link device. In still another scenario, the first station 101 is an AP multi-link device, and the second station 102 is an AP multi-link device or an AP. In still another scenario, the first station 101 is a STA multi-link device, and the second station 102 is a STA multi-link device or a STA. Certainly, the wireless local area network may further include another device. A quantity and a type of devices shown in FIG. 1 are merely examples.

Figure 2A:
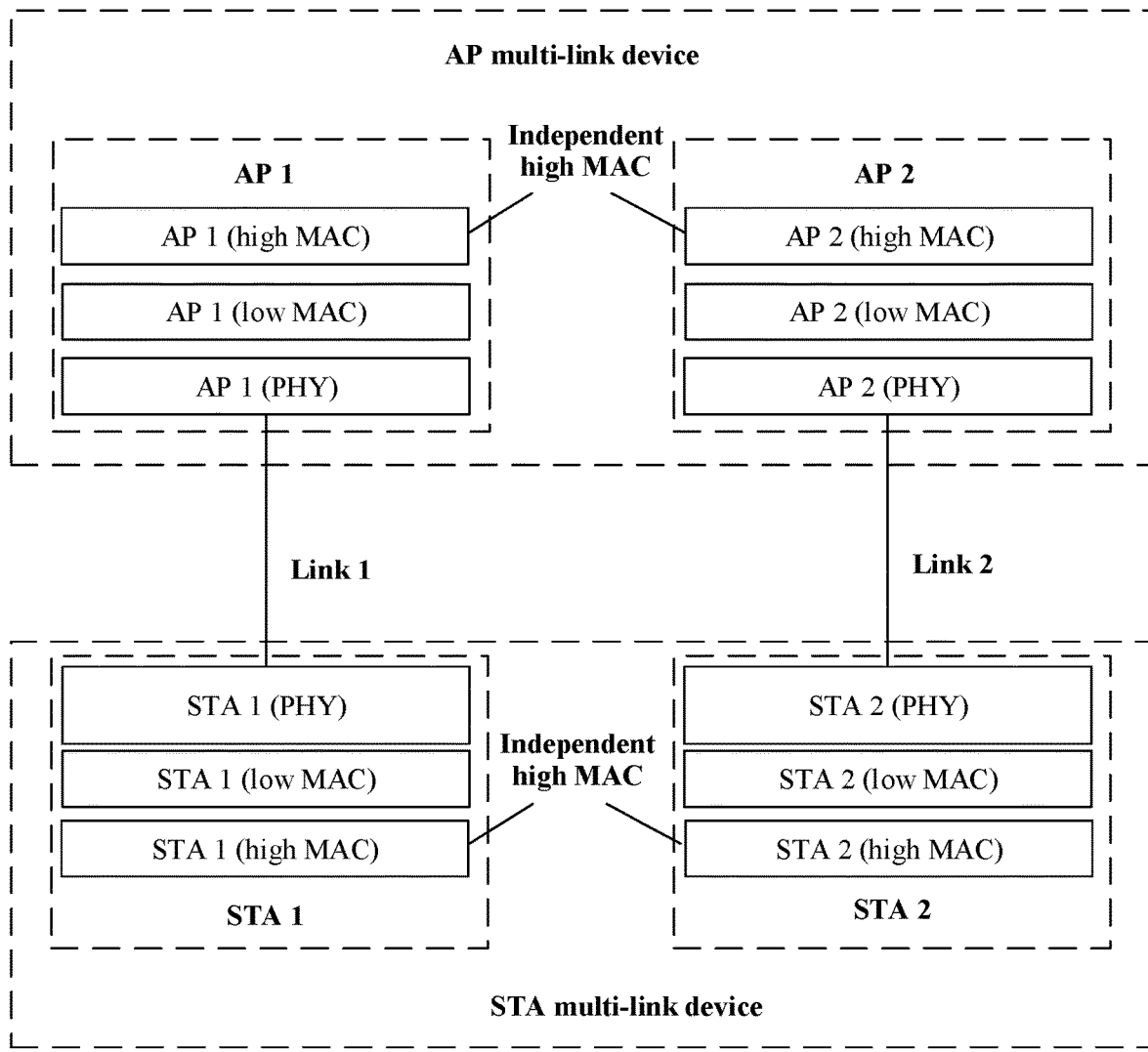
FIG. 2(a) is a schematic diagram of a structure of a multi-link device according to an embodiment of this application.
Figure 2B:
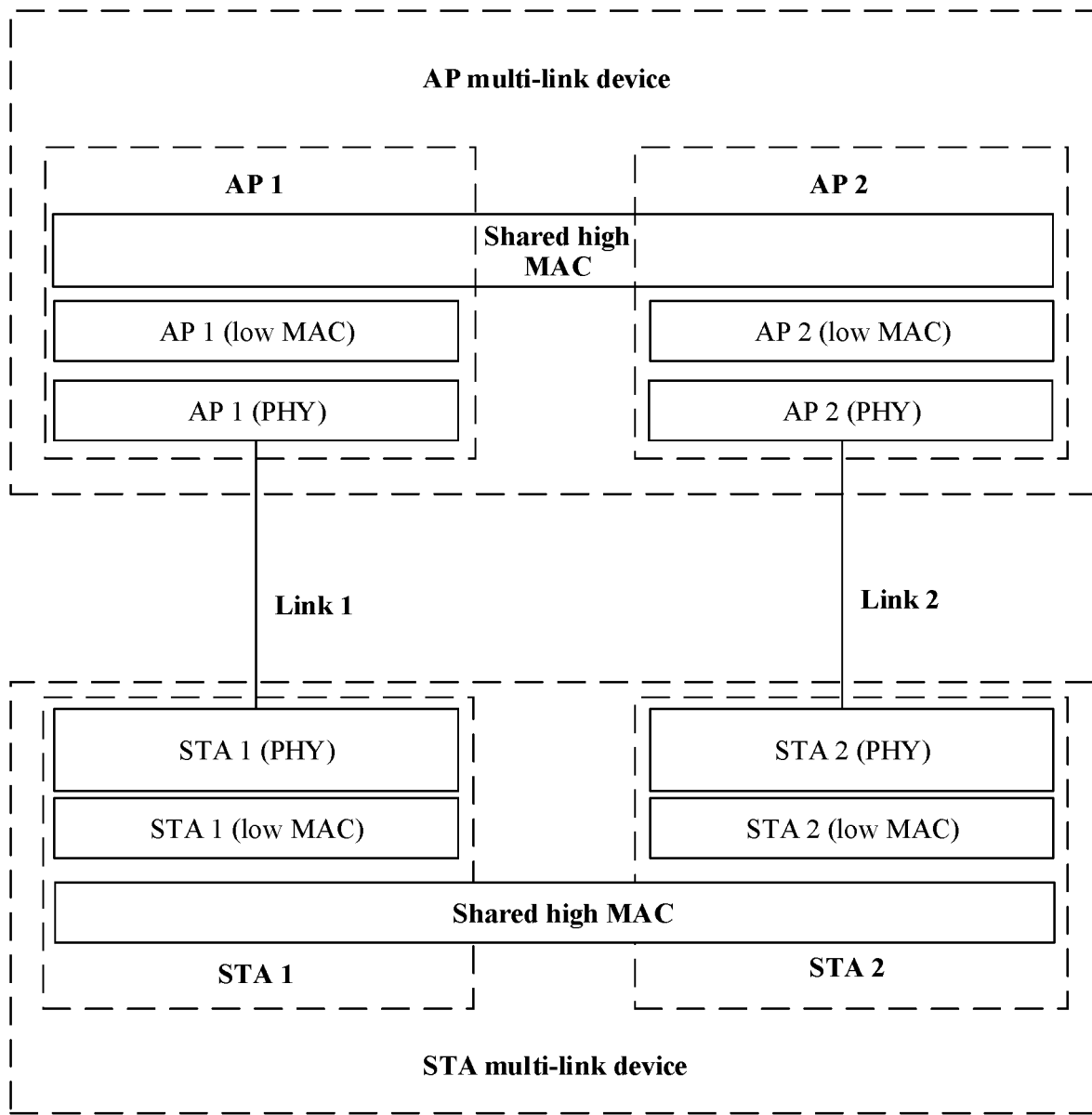
FIG. 2(b) is a schematic diagram of a structure of another multi-link device according to an embodiment of this application.

FIG. 2(a) and FIG. 2(b) are schematic diagrams of structures of an AP multi-link device and a STA multi-link device that participate in communication. 802.11 standards focus on 802.11 physical layer (Physical layer, PHY) and media access control (Media Access Control, MAC) layer parts of an AP multi-link device and a STA multi-link device (such as a mobile phone and a notebook computer).

As shown in FIG. 2(a), a plurality of APs included in the AP multi-link device are independent of each other at a low MAC (Low MAC) layer and a PHY layer, and are also independent of each other at a high MAC (High MAC) layer. A plurality of STAs included in the STA multi-link device are independent of each other at a low MAC (Low MAC) layer and a PHY layer, and are also independent of each other at a high MAC (High MAC) layer.

As shown in FIG. 2(b), a plurality of APs included in the AP multi-link device are independent of each other at a low MAC (Low MAC) layer and a PHY layer, and share a high MAC (High MAC) layer. A plurality of STAs included in the STA multi-link device are independent of each other at a low MAC (Low MAC) layer and a PHY layer, and share a high MAC (High MAC) layer.

For example, the STA multi-link device may use a structure in which high MAC layers are independent of each other, and the AP multi-link device may use a structure in which a high MAC layer is shared. Alternatively, the STA multi-link device may use a structure in which a high MAC layer is shared, and the AP multi-link device may use a structure in which high MAC layers are independent of each other. For example, the high MAC layer or the low MAC layer may be implemented by one processor in a chip system of the multi-link device, or may be implemented by different processing modules in a chip system.

Figure 2C:
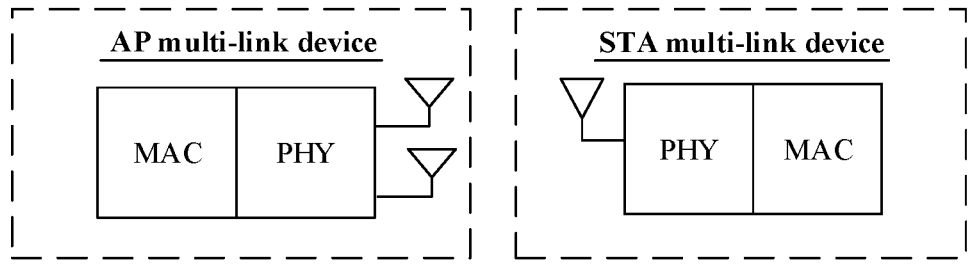
FIG. 2(c) is a schematic diagram of a structure of another multi-link device according to an embodiment of this application.

For example, the multi-link device in this embodiment of this application may be a single-antenna device, or may be a multi-antenna device. For example, the multi-link device may be a device with more than two antennas. A quantity of antennas included in the multi-link device is not limited in embodiments of this application. For example, FIG. 2(c) shows an example in which an AP multi-link device is a multi-antenna device and a STA multi-link device is a single-antenna device. In this embodiment of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

Figure 3A:
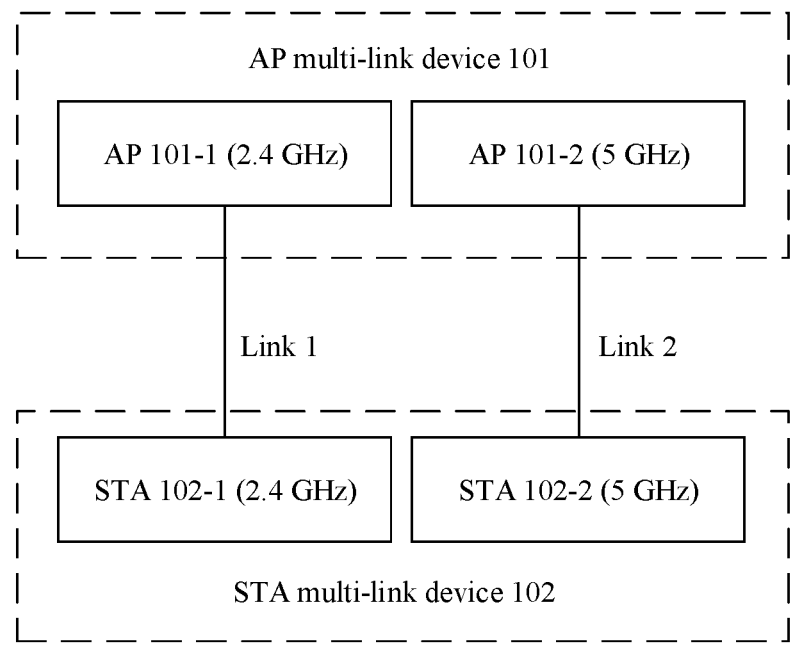
FIG. 3(a) is a schematic diagram of a type of multi-link communication according to an embodiment of this application.
Figure 3B:
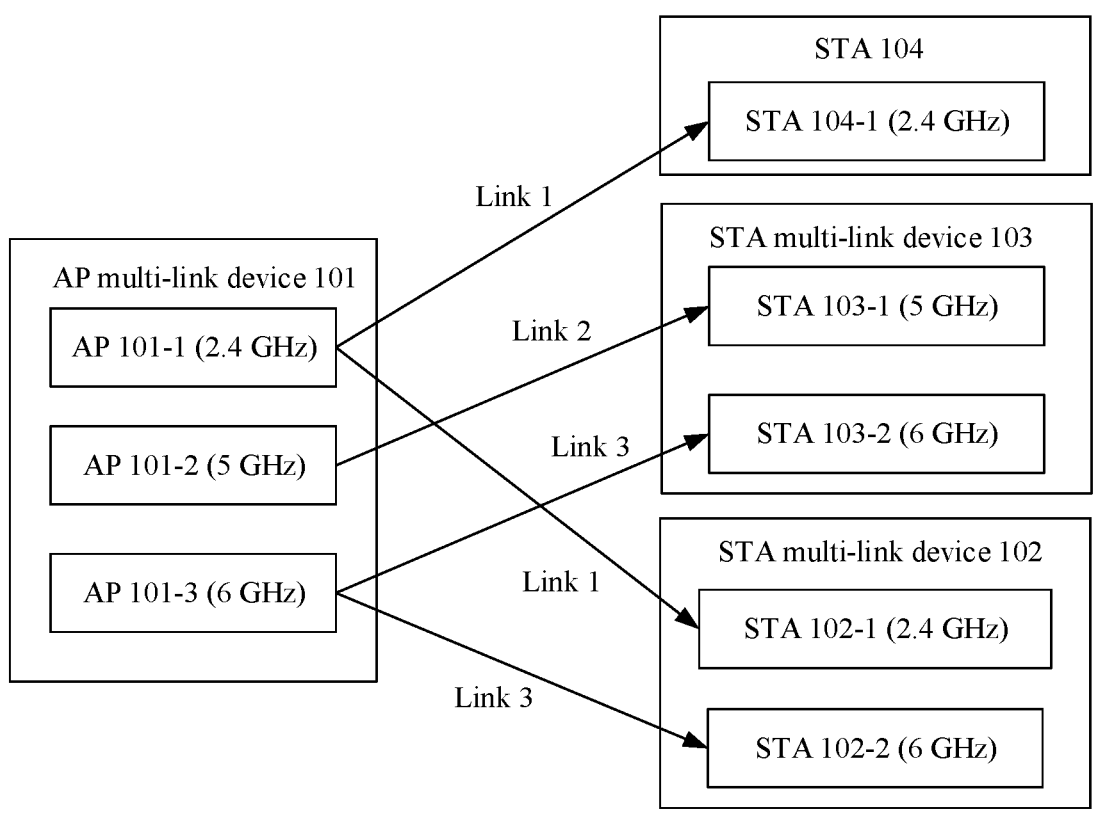
FIG. 3(b) is a schematic diagram of another type of multi-link communication according to an embodiment of this application.

Frequency bands on which the multi-link device operates may include but are not limited to sub 1 GHz, 2.4 GHz, 5 GHz, 6 GHz, and a high frequency 60 GHz. FIG. 3(a) and FIG. 3(b) are two schematic diagrams of communication between a multi-link device and another device in a wireless local area network on multiple links.

FIG. 3(a) shows a scenario in which an AP multi-link device 101 communicates with a STA multi-link device 102. The AP multi-link device 101 includes an affiliated AP 101-1 and an affiliated AP 101-2, the STA multi-link device 102 includes an affiliated STA 102-1 and an affiliated STA 102-2, and the AP multi-link device 101 communicate with the STA multi-link device 102 in parallel on a link 1 and a link 2.

FIG. 3(b) shows a scenario in which an AP multi-link device 101 communicates with a STA multi-link device 102, a STA multi-link device 103, and a STA 104. The AP multi-link device 101 includes an affiliated AP 101-1 to an affiliated AP 101-3. The STA multi-link device 102 includes two affiliated STAs: a STA 102-1 and a STA 102-2. The STA multi-link device 103 includes two affiliated STAs: a STA 103-1 and a STA 103-2. The STA 104 each are a single-link device. The AP multi-link device may separately communicate with the STA multi-link device 102 on a link 1 and a link 3, communicate with the STA multi-link device 103 on a link 2 and a link 3, and communicate with the STA 104 on a link 1. In an example, the STA 104 operates on a 2.4 GHz frequency band. The STA multi-link device 103 includes the STA 103-1 and the STA 103-2, where the STA 103-1 operates on a 5 GHz frequency band, and the STA 103-2 operates on a 6 GHz frequency band. The STA multi-link device 102 includes the STA 102-1 and the STA 102-2, where the STA 102-1 operates on a 2.4 GHz frequency band, and the STA 102-2 operates on a 6 GHz frequency band. The AP 101-1 operating on the 2.4 GHz frequency band in the AP multi-link device may perform uplink or downlink data transmission with the STA 104 and the STA 102-1 in the STA multi-link device 102 on a link 1. The AP 101-2 operating on the 5 GHz frequency band in the AP multi-link device may perform uplink or downlink data transmission with the STA 103-1 operating on the GHz frequency band in the STA multi-link device 103 on a link 2. The AP 101-3 operating on the 6 GHz frequency band in the AP multi-link device 101 may perform uplink or downlink data transmission with the STA 102-2 operating on the 6 GHz frequency band in the STA multi-link device 102 on a link 3, and may also perform uplink or downlink data transmission with the STA 103-2 in the STA multi-link device on the link 3.

It should be noted that FIG. 3(a) shows that the AP multi-link device supports only two frequency bands, and FIG. 3(b) uses only an example in which the AP multi-link device supports three frequency bands (2.4 GHz, 5 GHz, and 6 GHz), each frequency band corresponds to one link, and the AP multi-link device 101 may operate on one or more of the link 1, the link 2, or the link 3. On an AP side or a STA side, the link herein may be further understood as a station operating on the link. In an actual application, the AP multi-link device and the STA multi-link device may further support more or fewer frequency bands, that is, the AP multi-link device and the STA multi-link device may operate on more or fewer links. This is not limited in this embodiment of this application For example, the multi-link device is an apparatus with a wireless communication function, and the apparatus may be a device, or may be a chip, a processing system, or the like installed on the device. The device on which the chip or the processing system is installed may implement methods and functions in embodiments of this application under control of the chip or the processing system. For example, the multi-link STA in embodiments of this application has a wireless transceiver function, may support the 802.11 series protocols, and may communicate with the multi-link AP, another multi-link STA, or a single-link device. For example, the multi-link STA is any user communication device that allows a user to communicate with an AP and then with the WLAN. For example, the multi-link STA may be user equipment that can access a network, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone; or may be an internet of things node in the internet of things, an in-vehicle communication apparatus in the internet of vehicles, or the like. The multi-link STA may alternatively be a chip or a processing system in the foregoing terminals. The multi-link AP in embodiments of this application is an apparatus that provides a service to the multi-link STA, and can support the 802.11 series protocols. For example, the multi-link AP may be a communication entity such as a communication server, a router, a switch, or a network bridge, or the multi-link AP may include various forms of macro base stations, micro base stations, relay stations, or the like. Certainly, the multi-link AP may further be a chip and a processing system in the various forms of devices, to implement the methods and functions of embodiments of this application. In addition, the multi-link device may support high-rate and low-latency transmission. With continuous evolution of wireless local area network application scenarios, the multi-link device may be further applied to more scenarios, for example, serving as a sensor node (for example, a smart water meter, a smart electricity meter, or a smart air detection node) in smart city, a smart device (for example, a smart camera, a projector, a display screen, a television, a stereo, a refrigerator, or a washing machine) in smart home, a node in internet of things, an entertainment terminal (for example, AR, VR, or another wearable device), a smart device (for example, a printer, or a projector) in smart office, an internet of vehicles device in internet of vehicles, or infrastructure (for example, a vending machine, a self-service navigation console, a self-checkout device, or a self-service food machine) in daily life scenarios. Specific forms of the multi-link STA and the multi-link AP are not specifically limited in embodiments of this application, and are merely examples for description herein. The 802.11 series protocols may include 802.11be, 802.11ax, 802.11a/b/g/n/ac, and the like.

2. Multiple (Multiple) service set identifier (Basic Service Set identifier, BSSID) mode A multiple BSSID (multiple BSSID) set is a combination of some cooperative APs, and all the cooperative APs share one operating class, one channel number, and one antenna interface. In the multiple BSSID set, there is only one AP corresponding to a transmitted (transmitted) BSSID, and other APs are APs corresponding to a nontransmitted (nontransmitted) BSSID. Information about the multiple BSSID set (that is, a multiple BSSID element) is carried in a beacon frame, probe response frame, or neighbor report sent by the AP corresponding to the transmitted BSSID. Information about a BSSID of the APs corresponding to the nontransmitted BSSID is derived based on a multiple BSSID element or the like in the foregoing received beacon frame, probe response frame, neighbor report.

In a multiple BSSID technology, one physical AP may be virtualized into a plurality of logical APs. Each virtual AP manages one BSS. Different virtual APs usually have different SSIDs and permission, such as security mechanisms or transmission opportunities. A BSSID corresponding to one virtual AP in the plurality of APs obtained through virtualization is configured as a transmitted (Transmitted) BSSID. The virtual AP may be referred to as a transmitted (Transmitted) AP. A BSSID corresponding to another virtual AP is configured as a nontransmitted BSSID. The virtual AP may be referred to as a nontransmitted (nontransmitted) AP. Generally, a plurality of APs in a multiple BSSID set may also be understood as a plurality of cooperative AP devices obtained by virtualizing one AP device. Only an AP corresponding to a transmitted BSSID can send a beacon (beacon) frame and a probe response (Probe Response) frame. If the probe request (Probe Request) frame sent by the STA is for an AP corresponding to a nontransmitted BSSID in a multiple BSSID set (set), the AP corresponding to the transmitted BSSID needs to assist in replying with the probe response frame. The beacon frame sent by the AP corresponding to the transmitted BSSID includes a multiple BSSID element, and the APs corresponding to the nontransmitted BSSID cannot send a beacon frame. Association identifiers (AID, association identifier) allocated by a plurality of virtual APs to stations managed by the plurality of virtual APs share one space, that is, the AIDs allocated to stations managed by the plurality of virtual BSSs cannot be the same.

Optionally, as shown in Table 1, the multiple BSSID element includes an element ID, a length, a maximum BSSID indicator, and a subelement. The maximum BSSID indicator indicates that a maximum quantity of BSSIDs included in the foregoing multiple BSSID set is n, and the optional subelement includes information about each nontransmitted BSSID. A receive end may calculate a value of each BSSID in the multiple BSSID set based on a reference BSSID, the maximum BSSID indicator, and a BSSID index. Each BSSID includes 48 bits. A value of most significant (48-n) bits of each BSSID in the multiple BSSID set is the same as a value of most significant (48-n) bits of the reference BSSID, and a value of least significant n bits of each BSSID in the multiple BSSID set is obtained by performing a modulo operation on a sum of a value of least significant n bits of the reference BSSID and a value of a BSSID index x by using 2n. The reference BSSID (that is, the transmitted BSSID) is carried in a BSSID field in a MAC header of a frame (for example, a beacon frame) including the multiple BSSID element. For a specific calculation method, refer to the 802.11-2016 standard protocol.

TABLE 1

| Multiple BSSID element | | | | |
| --- | --- | --- | --- | --- |
| | ID | Element Length | Maximum BSSID indicator | Optional subelement |
| Byte | 1 | 1 | 6 | Variable |

Table 2 may show the "optional subelement" in Table 1.

TABLE 2

| Optional subelement | | |
| --- | --- | --- |
| Subelement ID | Name | Extensible |
| 0 | Nontransmitted BSSID profile | No |
| 1-220 | Reserved | |
| 221 | Vendor-specific | Vendor-defined |
| 222-255 | Reserved | |

In Table 2, the nontransmitted BSSID profile (profile) includes an element or elements of one or more APs or DMG STAB having a nontransmitted BSSID, and the nontransmitted BSSID profile (profile) includes but is not limited to the following elements:

1. A plurality of other elements in a beacon and a nontransmitted BSSID capability element that need to be included in each nontransmitted BSSID.

2. An SSID element and a multiple BSSID-Index element: The multiple BSSID-Index element includes a BSSID index field.

3. An FMS descriptor (descriptor) element that is further included if the multiple BSSID element is carried in the beacon.

4. None of the following elements: timestamp and beacon frame interval fields (The Timestamp and Beacon Interval fields), a DSSS parameter set (DSSS Parameter Set), an IBSS parameter set (IBSS Parameter Set), a country (Country), a channel switch announcement (Channel Switch Announcement), an extended channel switch announcement (Extended Channel Switch Announcement), a wide bandwidth channel switch (Wide Bandwidth Channel Switch), a transmit power envelope (Transmit Power Envelope), supported operating classes (Supported Operating Classes), an IBSS DFS, ERP information (ERP Information), HT Capabilities (HT Capabilities), an HT operation (HT Operation), VHT capabilities (VHT Capabilities), a VHT operation (VHT Operation), SIG beacon compatibility (SIG Beacon Compatibility), a short beacon interval (Short Beacon Interval), SIG capabilities (SIG Capabilities), a SIG operation (SIG Operation (llah)), and other elements. These elements usually have same element values as the AP corresponding to the transmitted BSSID.

5. An optional non-inheritance (non-inheritance) element: The element is the last element in the nontransmitted BSSID profile. The non-inheritance element includes IDs and element ID extensions of a series of elements that are in the nontransmitted BSSID and that cannot be inherited from the transmitted BSSID. It should be noted that specific content of the element is omitted herein. Specifically, as shown in Table 3, the non-inheritance element includes an element ID, a length, an element ID extension, an element ID list, and an element ID extension list. The element ID extension number are present only when an element ID value is 255.

TABLE 3

| Non-inheritance element | | | | |
|---|---|---|---|---|
| One byte | One byte | One byte | One or more bytes | One or more bytes |
| Element ID | Length | Element ID extension | Element ID list | Element ID extension list |

3. AP discovery and association

To be associated with and establish a connection to an AP, a station first needs to discover the AP through scanning. There are two types of scanning: active scanning and passive scanning.

Passive scanning means receiving a management frame sent by an AP on a channel, for example, a beacon frame, an association response frame, a reassociation response frame, an authentication frame, or a probe response frame. For example, the station transitions between different channels to search for the beacon frame sent by the AP. Once the station obtains admission control information of the AP by using the beacon frame, the station may further obtain other additional information from the AP by exchanging a probe request (Probe Request) frame and a probe response (Probe Response) frame.

Active scanning means that a station actively sends a broadcast probe request (Probe Request) frame when the station does not detect a beacon frame, where if a specific condition is satisfied, an AP receiving the probe request frame may initiate random channel access to reply with a probe response frame.

In the scanning process, to assist the station in fast scanning, the AP includes a reduced neighbor report element (Reduced Neighbor Report element) in a management frame, for example, a beacon (Beacon) frame or a probe response (Probe response) frame, to prevent the station from continuously performing channel scanning. This reduces scanning time of the station. In addition, when the station finds that a received signal strength indicator (Received Signal Strength Indicator, RSSI) of a currently associated AP decreases to a specific value or basic service set (Basic Service Set, BSS) transition needs to be performed due to other reasons, the AP may include a neighbor report element (Neighbor Report element) in a BSS transition management query (BSS Transition management Query) frame, a BSS transition management request (BSS Transition management Request) frame, or a BSS transition management response (BSS Transition management Response) frame, to notify the station of surrounding BSSs and related information of the BSSs to assist the station in performing BSS transition. The following describes the neighbor report element and the reduced neighbor report element.

Neighbor report element (Neighbor Report element): An AP carries the neighbor report element in a management frame, for example, a beacon frame, an association response frame, a reassociation response frame, an authentication frame, or a probe response frame. During scanning, a station receives the management frame sent by the AP, obtains information about surrounding APs based on the neighbor report element in the management frame, and then chooses to be associated with an appropriate AP.

Figure 3C:
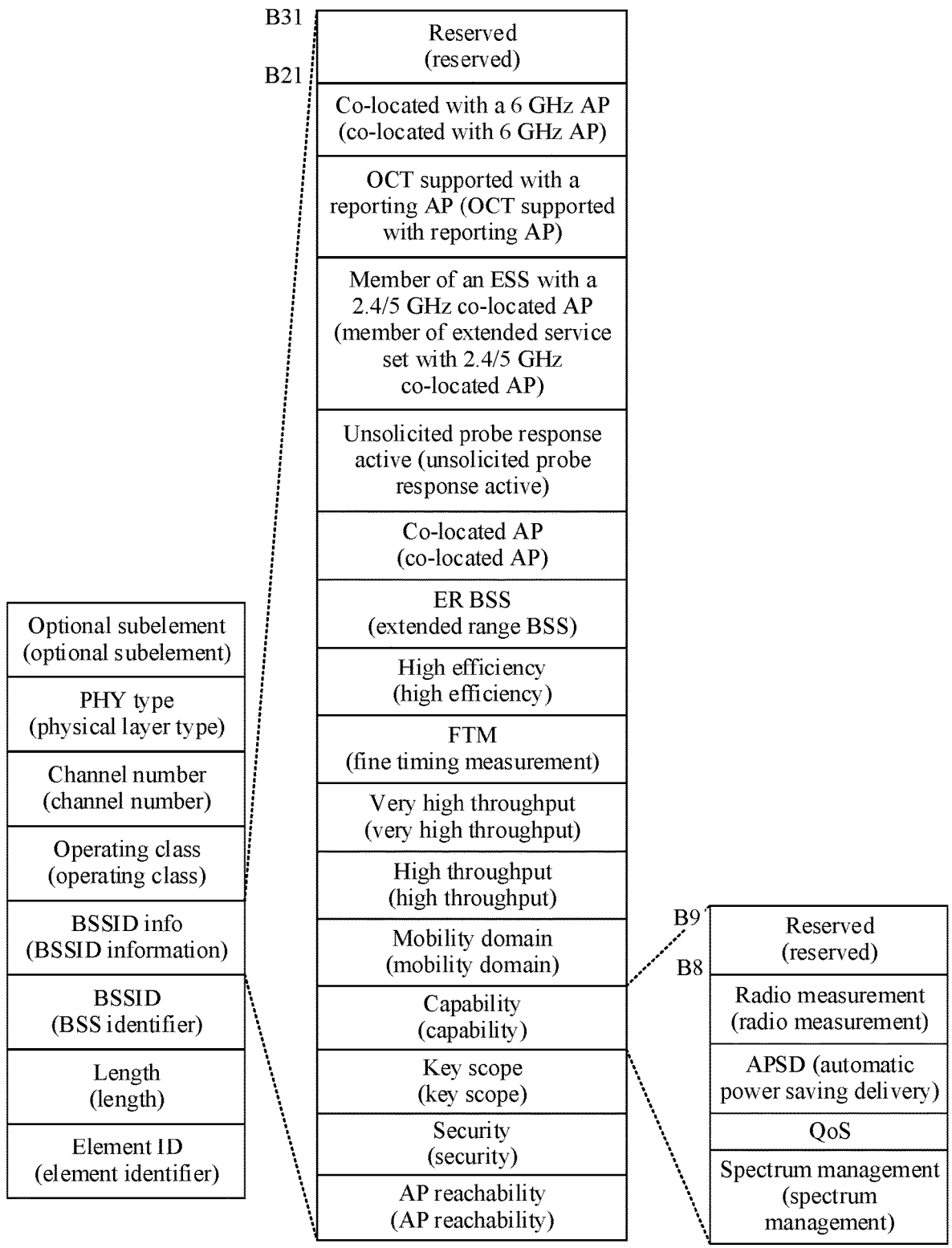
FIG. 3(c) is a schematic diagram of a format of a neighbor report element according to an embodiment of this application.

Specifically, the neighbor report element (Neighbor Report element) describes information about a neighbor AP and information about a BSS to which the neighbor AP belongs. The AP may carry a plurality of neighbor report elements to indicate related information of a plurality of neighbor APs. FIG. 3(c) shows an indication format. It can be learned from FIG. 3(c) that the neighbor report element may include the following fields:

a BSSID field indicating a BSSID corresponding to a reported neighbor AP;

a BSSID info (BSSID information) field indicating related information of a neighbor BSSID;

an operating class (operating class) field and a channel number (channel number) field that indicate a specific channel on which the neighbor BSSID is located;

a PHY type (PHY type) field indicates a physical layer type of an AP corresponding to the neighbor BSSID; and an optional subelement (optional subelement) field carrying some optional subelements.

The BSSID info (BSSID information) field carries the following information fields:

an AP reachability (AP reachability) field indicating whether the neighbor AP is reachable;

a security (security) field indicating whether the neighbor AP supports a same security configuration as an existing connection;

a key scope (key scope) field indicating whether the neighbor AP has a same authenticator as a reporting AP;

a capabilities (capability) field indicating some optional capability information of the neighbor AP;

a mobility domain (mobility domain) field indicating whether the neighbor AP and the reporting AP are in a same mobility domain;

a high throughput (high throughput) field indicating that content of an HT capabilities element (carried in the optional subelement field) of the neighbor AP is the same as that of an HT capabilities element of the reporting AP;

a very high throughput (Very High Throughput) field indicating that content of a VHT capabilities element (VHT capabilities element) of the neighbor AP is the same as that of a VHT capabilities element of the reporting AP;

an FTM (fine time measurement, fine timing measurement) field indicating whether the neighbor AP supports fine timing measurement;

a high efficiency (High Efficiency) field indicating that content of an HE capabilities element (HE capabilities element) of the neighbor AP is the same as that of an HE capabilities element of the reporting AP;

an ER (Extended range) BSS (extended range BSS) field indicating that a beacon sent by the neighbor AP is sent in an HE ER SU PPDU manner;

a co-located AP (co-located AP) field indicating whether the neighbor AP and the reporting AP are co-located APs;

an unsolicited probe response active (unsolicited probe response active) field indicating whether the neighbor AP enables an active probe response;

a member of ESS with 2.4/5 GHz co-located AP (ESS (extended service set, extended service set) in which the 2.4/5 GHz co-located AP is located) field indicating whether the neighbor AP is a member of an extended service set with 2.4/5 GHz AP co-located;

an OCT supported with reporting AP (OCT supported with neighbor AP) field indicating whether the neighbor AP supports exchange of an MPDU of a management frame type by using an on-channel tunneling (On-channel tunneling, OCT) mechanism; and a co-located with 6 GHz AP (co-located with 6 GHz AP) field indicating whether the neighbor AP and a 6 GHz AP are co-located.

The capabilities (capability) field may further include the following information fields:
- a spectrum management (spectrum management) field indicating whether the neighbor AP supports a spectrum management function;
- a QoS field indicating whether the neighbor AP supports a QoS mechanism;
- an APSD field indicating whether the neighbor AP supports an automatic power saving delivery mechanism; and
- a radio measurement (radio measurement) field indicating whether the neighbor AP supports a radio measurement function.

Reduced neighbor report element (Reduced Neighbor Report element): An AP includes the reduced neighbor report element in a management frame, for example, a beacon frame or a probe response frame. During scanning, a station receives the management frame sent by the AP, obtains information about surrounding APs based on the reduced neighbor report element in the management frame, and then chooses to be associated with an appropriate AP.

Figure 3D:
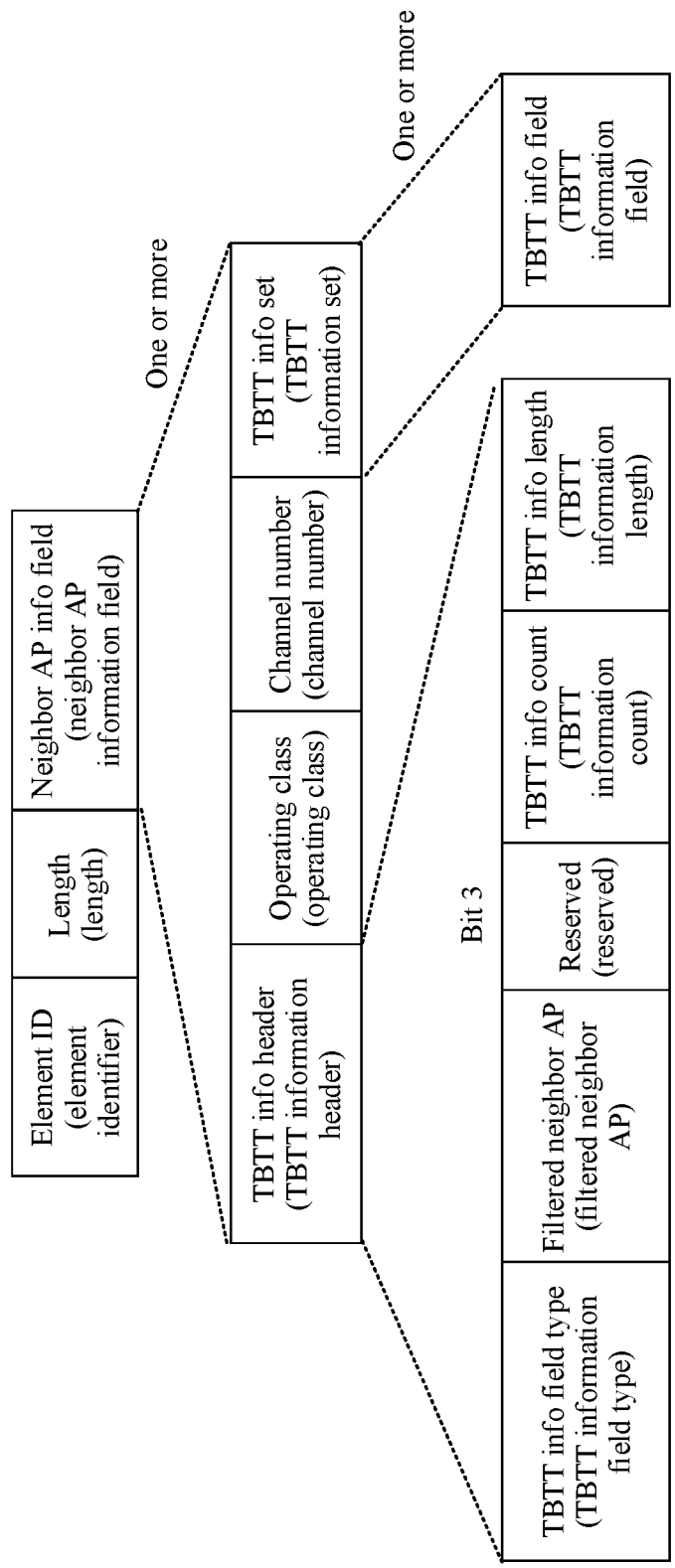
FIG. 3(d) is a schematic diagram of a format of a reduced neighbor report element according to an embodiment of this application.
Figure 3:
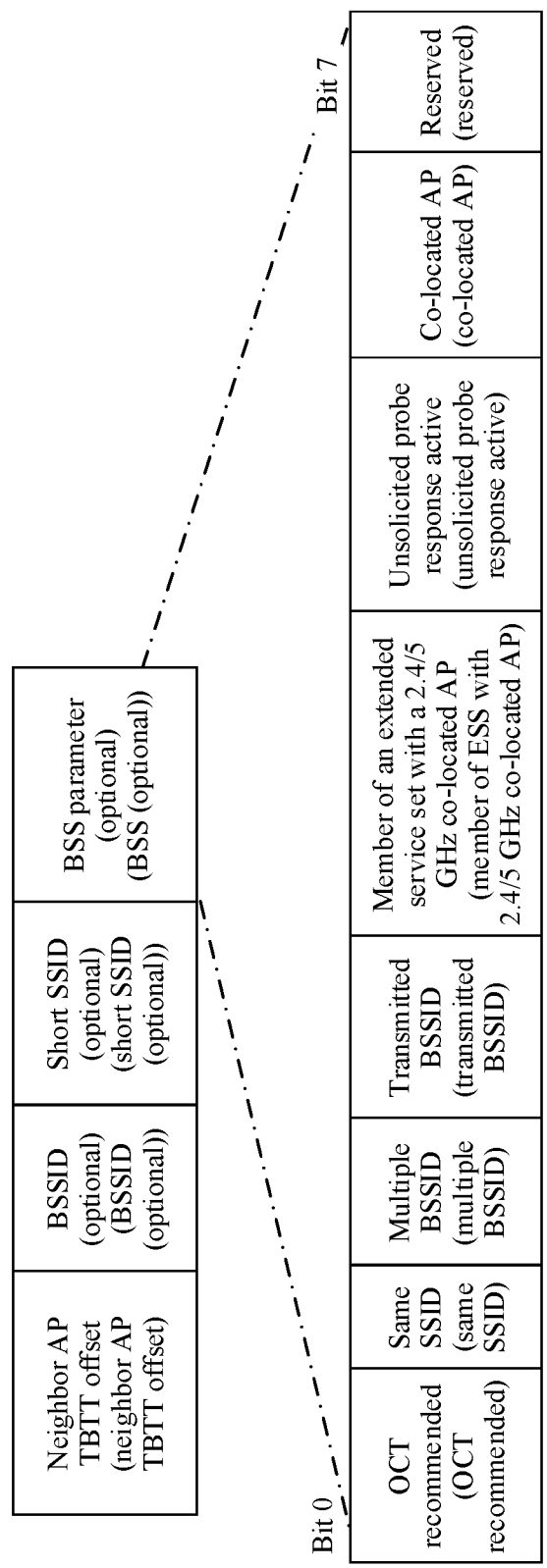
FIG. 3(e) is a schematic diagram of a format of a TBTT information field according to an embodiment of this application.

Specifically, the reduced neighbor report element (Reduced Neighbor Report element) usually carries one or more neighbor AP info fields to describe information about one or more neighbor APs and information about a BSS to which the one or more neighbor APs belong. FIG. 3(d) shows an indication format. It can be learned from FIG. 3(d) that the reduced neighbor report element may include the following fields:
- a TBTT info header (target beacon transmission time (target beacon transmission time, TBTT) information header) field carries the following information fields:
  - a TBTT info field type (TBTT information field type) field indicating a type of TBTT info (TBTT information) and indicating a format of a TBTT info field together with a TBTT info length (TBTT information length) field;
  - a filtered neighbor AP (filtered neighbor AP) field indicating whether SSIDs of all BSSs carried in the neighbor AP info (neighbor AP information) fields match an SSID in a probe request frame;
  - a reserved field (1-bit);
  - a TBTT info count field indicating a quantity of TBTT info fields included in a TBTT info set; and
  - a TBTT info length (TBTT information length) field indicating a length of each TBTT info field. Table 4 shows formats of carried specific information of different lengths.

TABLE 4

| TBTT information length (byte) | Content carried in a TBTT information field |
| --- | --- |
| 1 | TBTT offset field of a neighbor AP |
| 2 | TBTT offset field and BSS parameter field of the neighbor AP |
| 5 | TBTT offset field and short SSID field of the neighbor AP |
| 6 | TBTT offset field, short SSID field, and BSS parameter field of the neighbor AP |
| 7 | TBTT offset field and BSSID field of the neighbor AP |
| 8 | TBTT offset field, BSSID field, and BSS parameter field of the neighbor AP |
| 11 | TBTT offset field, BSSID field, and short SSID field of the neighbor AP |

TABLE 4-continued

| TBTT information length (byte) | Content carried in a TBTT information field |
| --- | --- |
| 12 | TBTT offset field, BSSID field, short SSID field, and BSS parameter field of the neighbor AP |
| 0, 9-10 | Reserved |
| 13-255 | Reserved. Information in first 12 bytes is the same as a carried field with a TBTT information length of 12. |

The following provides a specific format of the TBTT info (TBTT information) field present when the TBTT information length is 12 bytes:
- a neighbor AP TBTT offset (target beacon transmission time offset of a neighbor AP) field indicating an offset between beacon sending time of a neighbor AP and beacon sending time of a reporting AP;
- a BSSID (BSS identifier) field indicating a BSS identifier corresponding to the neighbor AP;
- a short SSID (short service set identifier) field indicating a service set identifier to which the neighbor AP belongs;
- a BSS parameter (BSS parameter) field indicating a related parameter of the neighbor AP, and as shown in FIG. 3(e), includes the following information fields:
  - an OCT recommended (on-channel tunneling mechanism recommended) field indicating that the neighbor AP expects to exchange an MPDU of a management type with the reporting AP by using the OCT mechanism;
  - a same SSID (same service set identifier) field indicating whether the neighbor AP and the reporting AP have a same SSID;
  - a multiple BSSID (multiple basic service set identifier) field indicating whether the neighbor AP is a part of a multiple BSSID set;
  - a transmitted BSSID (transmitted basic service set identifier) field indicating whether the neighbor AP is a transmitted BSSID or a nontransmitted BSSID if the neighbor AP is a part of the multiple BSSID set;
  - a member of ESS with 2.4/5 GHz co-located AP (member of extended service set with 2.4/5 GHz co-located AP) field indicating whether the neighbor AP is a member of an extended service set with 2.4/5 GHz co-located AP (that is, whether the neighbor AP is a 6 GHz only AP);
  - an unsolicited probe response active (unsolicited probe response active) field indicating whether the neighbor AP enables an active probe response; and
  - a co-located AP (co-located AP) field indicating whether the neighbor AP and the reporting AP are co-located.

It should be noted that, in this embodiment of this application, an AP that is described in a neighbor report element (Neighbor Report element) or a reduced neighbor report element (Reduced Neighbor Report element) is a reported AP (reported access point (AP)) (reported access point (AP): An AP that is described in an element such as a Neighbor Report element or a Reduced Neighbor Report element). A subsequently mentioned neighbor AP may be understood as the reported AP. An AP that is sending a neighbor report element or a reduced neighbor Report element is a reporting AP (reporting access point (AP): An AP that is transmitting an element, such as a Neighbor Report element or a Reduced Neighbor Report element, describing a reported AP).

How to enable a station to discover an AP multi-link device (an AP in the AP multi-link device optionally belongs to a multiple BSSID set) is a technical problem that is being studied by a person skilled in the art.

Figure 4:
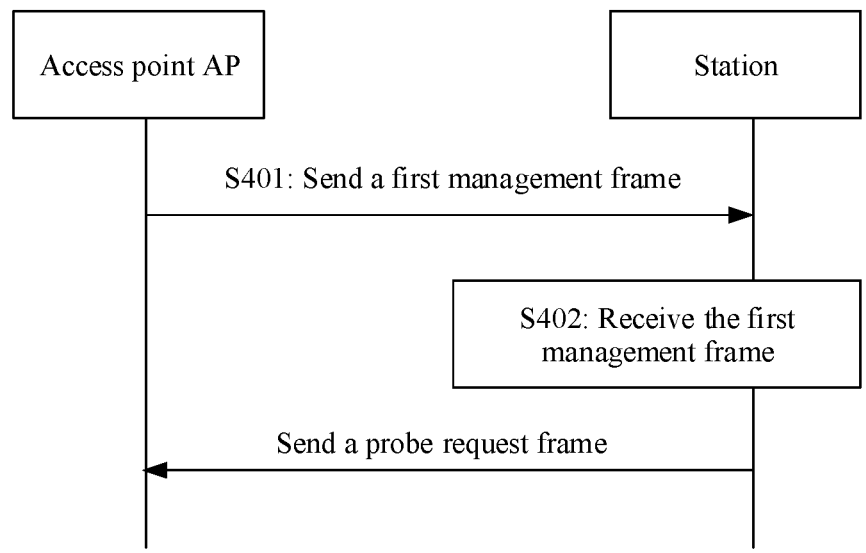
FIG. 4 is a schematic diagram of interaction of an AP multi-link device discovery method according to an embodiment of this application.

Refer to FIG. 4. FIG. 4 shows an AP multi-link device discovery method according to an embodiment of this application. The method may be applied between stations, between an access point and a station, and between access points. For ease of description, the following uses communication between an access point and a station as an example for description. The method includes but is not limited to the following steps.

Step S401: An access point AP sends a first management frame to a station.

The first management frame carries information used by the station to discover an AP multi-link device, so that the station receiving the information can establish an association with the corresponding AP. For example, the first management frame may be a beacon frame or a probe response frame. The first management frame may be sent by an AP multi-link device, or a reporting AP (reporting AP) in the AP multi-link device. The station receiving the first management frame may be a station in a station multi-link device, or may be a single-link station. In another type of BSS (for example, a mesh (mesh) BSS or an independent (Independent) BSS), the first management frame may also be sent by a station affiliated to a multi-link device MLD. The first management frame may alternatively be received by an access point that is affiliated to an MLD or that is a single-link access point. The following illustrates an example in which the reporting AP in the AP multi-link device sends the first management frame to the station.

In this embodiment of this application, in an example, the AP multi-link device may include one logical AP, which transitions and operates on multiple links. In another example, the AP multi-link device includes n logical APs that operate on n different links (link), respectively. Therefore, the n links may be represented by link identifiers: link1, link2, . . . , and linkn. MAC addresses of the APs are different. An AP multi-link device is identified by using an MLD MAC address (address), that is, the MAC address is for identifying an AP multi-link device management entity (management entity). A MAC address of the AP multi-link device may be the same as one MAC address of the n logical APs included in the multi-link AP, or may be different from all MAC addresses of the n logical APs. For example, the MAC address of the AP multi-link device is a common MAC address, and may identify the AP multi-link device.

In an example, one or more logical APs in the AP multi-link device may belong to one or more multiple (Multiple) base service set identifier (Basic Service Set Identifier, BSSID) sets (set). In an example, logical APs in an AP multi-link device belong to different multiple BSSID sets. In another example, a plurality of logical APs in the AP multi-link device may belong to a same multiple BSSID set. For example, if two logical APs in the AP multi-link device operate on one link, the two logical APs may belong to a same multiple BSSID set.

Figure 5:
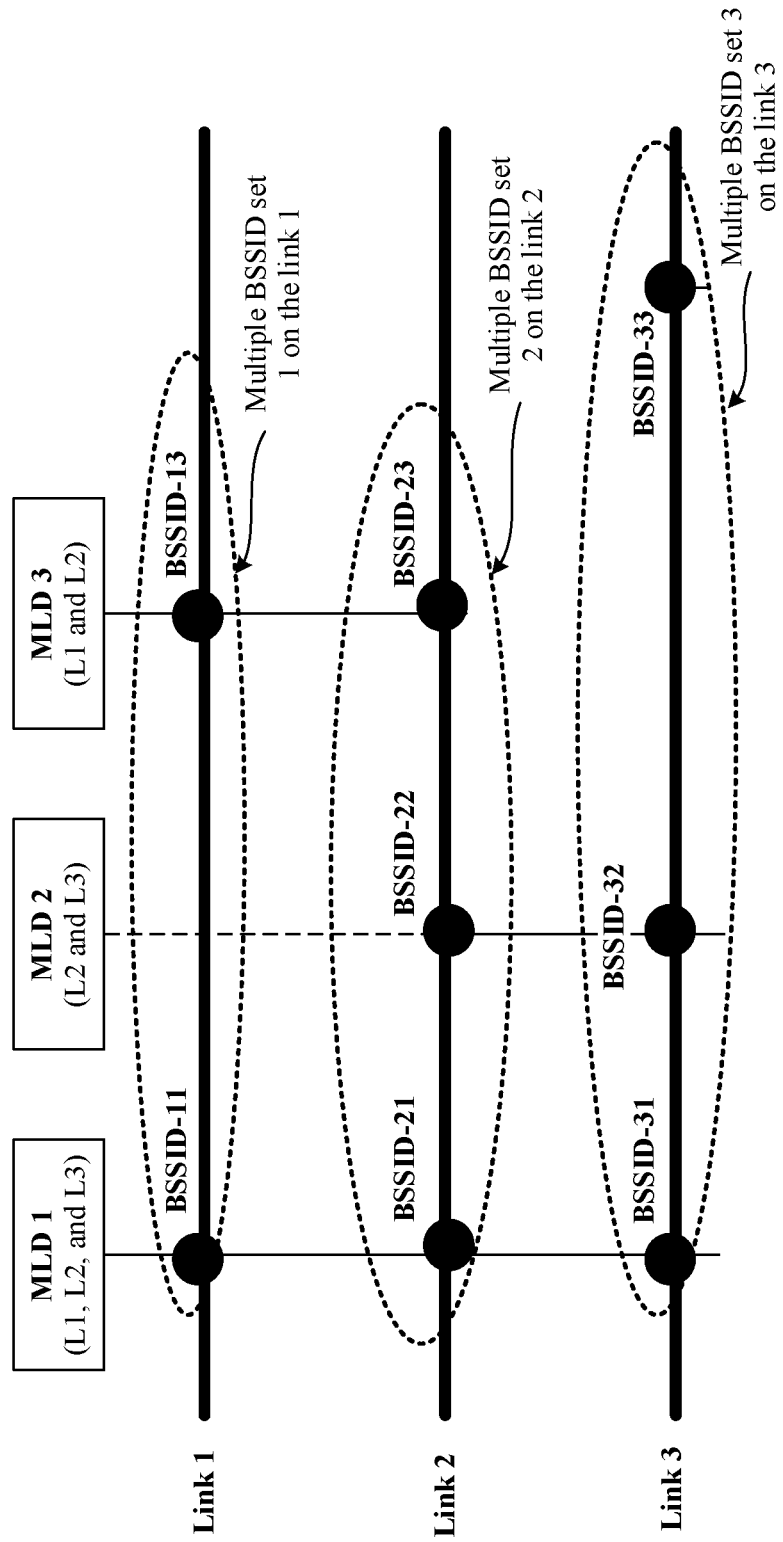
FIG. 5 is a schematic diagram of a framework of an MLD-based multiple BSSID set according to an embodiment of this application.

For example, as shown in FIG. 5, a MAC address of a multi-link device is, for example, MLD1, and the multi-link device includes three logical APs: an AP 1, an AP 2, and an AP 3. The AP 1, the AP 2, and the AP 3 operate on a link 1 (link 1), a link 2 (link 2), and a link 3 (link 3), respectively. MAC addresses of the AP 1, the AP 2, and the AP 3 are BSSID_11, BSSID_21, and BSSID_31, respectively (before 802.11ax, a BSSID of a BSS established by an AP is an AP MAC address, and may change subsequently). The AP 1 is a member of a multiple BSSID set 1, and the multiple BSSID set 1 further includes an AP 4 whose MAC address is BSSID_13. The AP 2 is a member of a multiple BSSID set 2, and the multiple BSSID set 2 further includes an AP 5 whose MAC address is BSSID_22 and an AP 6 whose MAC address is BSSID_23. The AP 3 is a member of a multiple BSSID set 3, and the multiple BSSID set 3 further includes an AP 7 whose MAC address is BSSID_32 and the AP 8 whose MAC address is BSSID_33.

Figure 6:
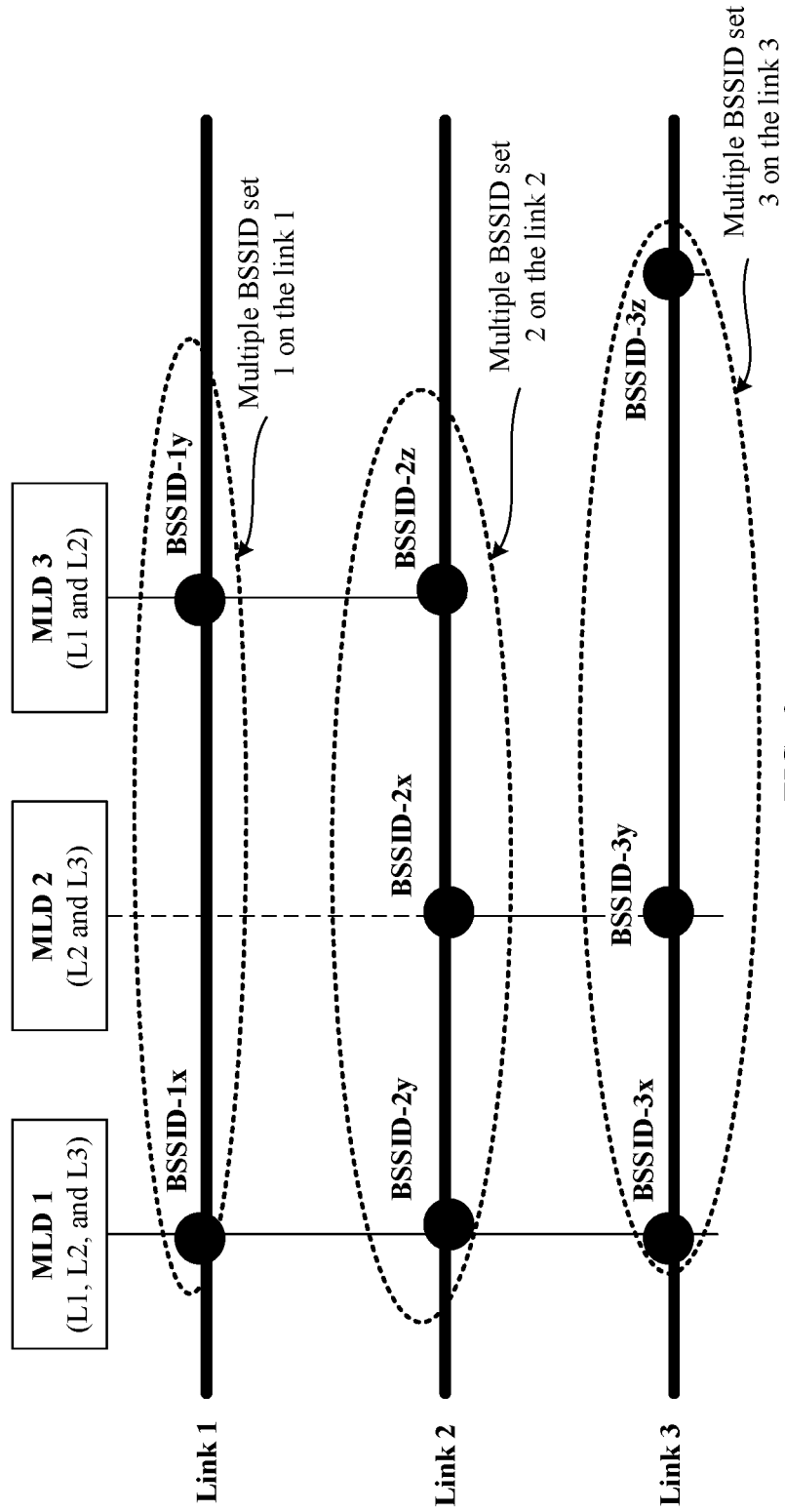
FIG. 6 is a schematic diagram of a framework of another MLD-based multiple BSSID set according to an embodiment of this application.

FIG. 6 shows an architecture in which APs in BSSs identified by transmitted BSSIDs in a plurality of multiple BSSID sets are not affiliated to a same AP multi-link device. For ease of description, an AP in a BSS identified by a transmitted BSSID may be referred to as a transmitted AP (AP corresponding to a transmitted BSSID). An AP in a BSS identified by a nontransmitted BSSID is referred to as a nontransmitted AP (AP corresponding to a nontransmitted BSSID). An AP whose MAC address identifier ends with x is an AP corresponding to a transmitted BSSID, and an AP whose MAC address identifier ends with y or z is an AP corresponding to a nontransmitted BSSID. For example, an AP corresponding to a transmitted BSSID in a multiple BSSID set 1 is an AP 1 whose MAC address identifier is BSSID_1x, and an AP corresponding to a nontransmitted BSSID in the multiple BSSID set 1 is an AP 4 whose MAC address identifier is BSSID_1y. An AP corresponding to a transmitted BSSID in a multiple BSSID set 2 is an AP 5 whose MAC address identifier is BSSID_2x, and APs corresponding to nontransmitted BSSIDs in the multiple BSSID set 2 include an AP 2 whose address identifier is BSSID_2y and an AP 6 whose MAC address identifier is BSSID_2z. An AP corresponding to a transmitted BSSID in a multiple BSSID set 3 is an AP 3 whose MAC address identifier is BSSID_3x, and APs corresponding to nontransmitted BSSIDs in the multiple BSSID set 3 include an AP 7 whose MAC address identifier is BSSID_3y and an AP 8 whose MAC address identifier is BSSID_3z. It can be learned from FIG. 6 that APs corresponding to transmitted BSSIDs from different multiple BSSID sets (that is, transmitted APs) are distributed in different AP multi-link devices. For example, an AP whose MAC address is BSSID-1x and an AP whose MAC address is BSSID-2x are respectively located in an AP multi-link device MLD 1 and an AP multi-link device MLD 2.

Figure 7:
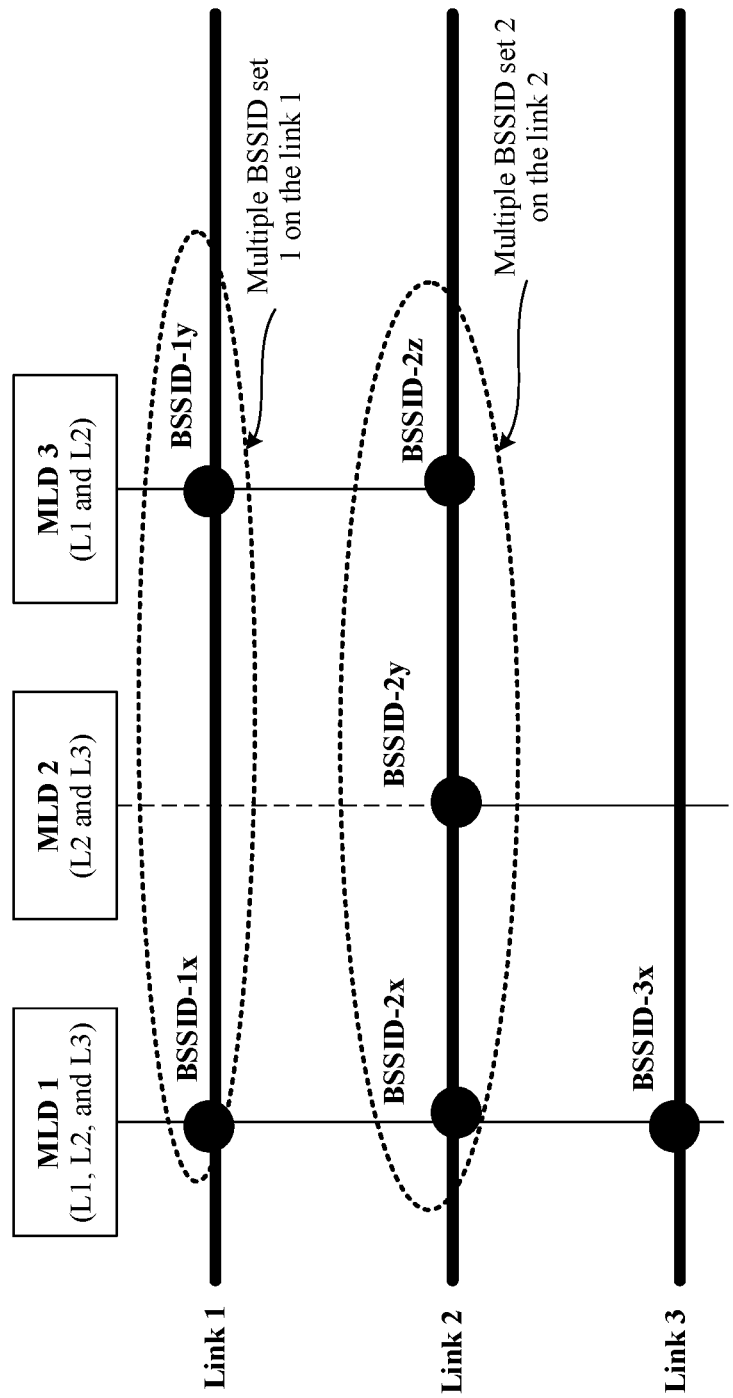
FIG. 7 is a schematic diagram of a framework of still another MLD-based multiple BSSID set according to an embodiment of this application.

FIG. 7 shows that APs in BSSs identified by transmitted BSSIDs in a plurality of multiple BSSID sets come from a same AP multi-link device. For ease of description, an AP in a BSS identified by a transmitted BSSID may be referred to as a transmitted AP (AP corresponding to a transmitted BSSID). An AP in a BSS identified by a nontransmitted BSSID is referred to as a nontransmitted AP (AP corresponding to a nontransmitted BSSID). An AP whose MAC address identifier ends with x is an AP corresponding to a transmitted BSSID, and an AP whose MAC address identifier ends with y or z is an AP corresponding to a nontransmitted BSSID. For example, an AP corresponding to a transmitted BSSID in a multiple BSSID set 1 is an AP 1 whose MAC address identifier is BSSID_1x, and an AP corresponding to a nontransmitted BSSID in the multiple BSSID set 1 is an AP 4 whose MAC address identifier is BSSID_1y. An AP corresponding to a transmitted BSSID in a multiple BSSID set 2 is an AP 2 whose MAC address identifier is BSSID_2x, and APs corresponding to nontransmitted BSSIDs in the multiple BSSID set 2 include an AP 5 whose MAC address identifier is BSSID_2y and an AP 6 whose MAC address identifier is BSSID_2z. An AP corresponding to a transmitted BSSID in a multiple BSSID set 3 is an AP 3 whose MAC address identifier is BSSID_3x, and APs corresponding to nontransmitted BSSIDs in the multiple BSSID set 3 include an AP 7 whose MAC address identifier is BSSID_3y and an AP 8 whose MAC address identifier is BSSID_3z. It can be learned from FIG. 7 that APs corresponding to transmitted BSSIDs from different multiple BSSID sets (that is, transmitted APs) are all in an AP multi-link device MLD 1.

In this embodiment of this application, the first management frame carries information about a neighbor AP. For example, the information about the neighbor AP is carried in a neighbor report element or a reduced neighbor report element (Reduced Neighbor Report element). The following uses a reduced neighbor report element as an example for description. The reduced neighbor report element needs to carry information about an AP other than the reporting AP in the AP multi-link device. For example, the information about the AP other than the reporting AP includes one or more of: an operating class, a channel number, a BSSID, or a short SSID of the AP other than the reporting AP, information about whether the AP other than the reporting AP belongs to a multiple BSSID set, and information about whether the AP other than the reporting AP belongs to a transmitted BSSID. If the AP other than the reporting AP belongs to a multiple BSSID set, information about each AP in the multiple BSSID set is further included. It may be understood that, when the information about the neighbor AP of the reporting AP is reported by the reporting AP, the neighbor AP is also referred to as a reported AP. The following uses an example to describe a reduced neighbor report element.

The reduced neighbor report element (Reduced Neighbor Report element) includes one or more of first information (or referred to as a Co-MLD field), second information (or referred to as an MLD multiple BSSID field), or third information (or referred to as a same MLD field).

The first information indicates whether a reported AP is affiliated to the same MLD as the reporting AP or whether the reported AP belongs to a same multiple BSSID set as a member AP of the MLD to which the reporting AP is affiliated.

A field carrying the first information may be referred to as a first information field. The first information field may also have another name, for example, a co-MLD (Co-MLD)

FIELD

Figure 8A:
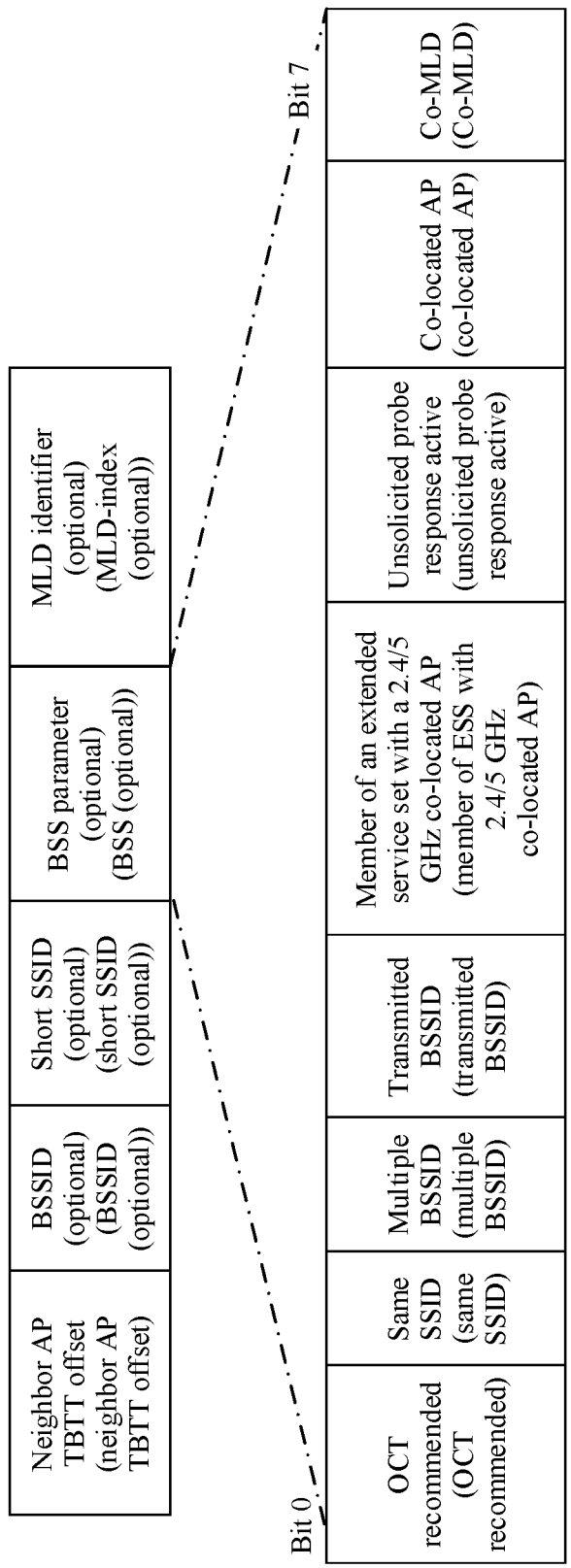
FIG. 8(a) is a schematic diagram of a format of another TBTT information field according to an embodiment of this application.

Optionally, the first information field may be set in a BSS parameter (BSS parameter) field or a TBTT information field of the reduced neighbor report element. FIG. 8(a) illustrates a specific example in which the Co-MLD field is a reserved (reserved) bit (bit 7) of the BSS parameter (BSS parameter) field. As shown in example 1 in FIG. 8 (a), if the reported AP is affiliated to the same MLD as the reporting AP or the reported AP belongs to a same multiple BSSID set as a member of the MLD to which the reporting AP is affiliated, a value of an indication bit of a Co-MLD field in the BSS parameter field is set to 1. If the reported AP is neither affiliated to the same MLD as the reporting AP nor belongs to the same multiple BSSID set as the member of the MLD to which the reporting AP is affiliated, the value of the indication bit is set to 0. In example 2, whether the reported AP is affiliated to the same MLD as the reporting AP may be indicated by using one indication bit. For example, when a value of the indication bit is set to 1, it indicates that the reported AP is affiliated to the same MLD as the reporting AP. When the value of the indication bit is set to 0, it indicates that the reported AP is not affiliated to the same MLD as the reporting AP. In addition, whether the reported AP belongs to a same multiple BSSID set as a member of the MLD to which the reporting AP is affiliated may be indicated by using another indication bit. For example, when a value of the indication bit is set to 1, it indicates that the reported AP belongs to a same multiple BSSID set as a member of the MLD to which the reporting AP is affiliated. When the value of the indication bit is set to 0, it indicates that the reported AP does not belong to the same multiple BSSID set as the member of the MLD to which the reporting AP is affiliated. The two indication bits are carried in the Co-MLD field. In still another example, it is assumed that the reported AP is affiliated to the same MLD as the reporting AP or the reported AP belongs to a same multiple BSSID set as a member of the MLD to which the reporting AP is affiliated. In this case, when the Co-MLD field is set to 1, it indicates that the reported AP is affiliated to the same MLD as the reporting AP or the reported AP belongs to the same multiple BSSID set as the member of the MLD to which the reporting AP is affiliated. On the contrary, it is assumed that the reported AP is not affiliated to the same MLD as the reporting AP or the reported AP does not belong to the same multiple BSSID set as the member of the MLD to which the reporting AP is affiliated. In this case, when the Co-MLD field is set to 0, it indicates that the reported AP is neither affiliated to the same MLD as the reporting AP, nor belongs to the same multiple BSSID set as the member of the MLD to which the reporting AP is affiliated.

As shown in FIG. 8 (a), optionally, the TBTT information field may further include an MLD-Index field. When the Co-MLD field is set to 1, the MLD-index field carries an index or a MAC address of the MLD to which the reporting AP and the reported AP are affiliated, to indicate the MLD. When the Co-MLD field is set to 0, the TBTT information field may include an MLD-index field. The MLD-index field may be set to reserved or another value. Certainly, the TBTT information field may alternatively include no MLD-index field. The following further describes other examples of the MLD-index field.

The second information indicates whether the reported AP belongs to the same multiple BSSID set as the member of the MLD to which the reporting AP is affiliated.

A field carrying the second information may be referred to as a second information field. The second information field may also have another name, for example, an MLD multiple BSSID field. The second information field may be set in a BSS parameter field or a TBTT information field of the reduced neighbor report element, and the MLD multiple BSSID field may be a newly added field in the BSS parameter field or the TBTT information field of the reduced neighbor report element.

The third information indicates whether the reported AP is affiliated to the same MLD as the reporting AP. If the reported AP is affiliated to the same MLD as the reporting AP, the third information is set to a seventh value. If the reported AP is not affiliated to the same MLD as the reporting AP, the third information is set to an eighth value. For example, the third information includes one bit. When the bit is set to 1, it indicates that the reported AP is affiliated to the same MLD as the reporting AP. When the bit is set to 0, it indicates that the reported AP is not affiliated to the same MLD as the reporting AP. A field carrying the third information may be referred to as a third information field. The third information field may have another name.

The third information field may be set in a BSS parameter (BSS parameter) field or a TBTT information field of the reduced neighbor report element. FIG. 8(*b*) is used as an example. The third information field may be specifically a same MLD field in the BSS parameter field of the reduced neighbor report element. The same MLD field may be a reserved (reserved) bit (B7) in the BSS parameter field. If the reported AP is in the same MLD as the reporting AP, a value of an indication bit in the same MLD field in the BSS parameter field is set to 1. If the reported AP is not in the same MLD as the reporting AP, the value of the indication bit is set to 0. FIG. 8(*b*) is used as an example. Optionally, the TBTT information field may further include an MLD-Index field. When the same MLD field is set to 1, the MLD-index field carries an index or a MAC address of the MLD to which the reporting AP and the reported AP are affiliated, to indicate the MLD. When the same MLD field is set to 0, the TBTT information field may include an MLD-index field. The MLD-index field may be set to reserved or another value. Certainly, the TBTT information field may alternatively include no MLD-index field. The following further describes other examples of the MLD-index field.

Fourth information indicates whether the reported AP belongs to a multiple BSSID set.

For example, the fourth information may be specifically a multiple BSSID indication bit. The multiple BSSID indication bit is set to a specific value. For example, the multiple BSSID indication bit includes one bit. When the bit is set to 1, it indicates that the reported AP belongs to a multiple BSSID set. Alternatively, the multiple BSSID indication bit is set to another specific value. For example, the multiple BSSID indication bit includes one bit. When the bit is set to 0, it indicates that the reported AP does not belong to the multiple BSSID set. For example, the multiple BSSID indication bit may be a multiple BSSID field in a BSS parameter field.

Eighth information indicates an MLD index (MLD-Index) of the reported AP (reported AP). A field carrying the eighth information may be referred to as an eighth information field. The eighth information field may also have another name, for example, an MLD-index field. The eighth information subfield may be set in a TBTT info (TBTT information) field of the reduced neighbor report element (Reduced Neighbor Report element). Optionally, when a reporting AP needs to perform reporting for a plurality of reported APs, each of the plurality of reported APs corresponds to an MLD index, and the MLD indexes may be used to distinguish between different MLDs. Therefore, when MLD indexes of two reported APs are the same, it indicates that the two reported APs are affiliated to a same MLD. For example, if both an MLD index of an MLD to which the reported AP whose MAC address is BSSID-2x is affiliated and an MLD index of an MLD to which a reported AP whose MAC address is BSSID-3y is affiliated are 2, it indicates that the two reported APs both are affiliated to an MLD 2. Optionally, when a same reported AP is marked by different reporting APs, marked MLD indexes may be the same, or may be different. Optionally, the MLD index field may carry an MLD index, or may carry an MLD MAC address, an MLD identifier, or the like.

Optionally, a special value of the MLD index field may indicate whether the reported AP and the reporting AP are affiliated to a same MLD. For example, if a reported AP and a reporting AP are affiliated to a same MLD, a special MLD index value (for example, all may be carried in the eighth information to indicate an index of the MLD, so as to indicate that the reported AP and the reporting AP are affiliated to the same MLD. Subsequently, when a receive end (for example, a station) reads the special MLD index value, although the receive end cannot directly obtain an MLD index of the MLD to which the reported AP is affiliated, the receive end may learn that the MLD index of the MLD to which the reported AP is affiliated is the same as an MLD index of the reporting AP. Because the receive end may obtain, from the first management frame, the MLD index of the MLD to which the reporting AP is affiliated, the receive end can obtain the MLD index of the MLD to which the reported AP is affiliated.

Optionally, if the reported AP is not affiliated to any MLD, the reported AP has no corresponding MLD index. Therefore, a special MLD index value (which is set to, for example, 255) may be carried in the eighth information to indicate that the reported AP has no corresponding MLD index (in other words, the special value (which is set to, for example, 255) of the eighth information indicates that the reported AP is not affiliated to any MLD). Certainly, if the reported AP is not affiliated to any MLD, it may also be considered that the reported AP is affiliated to a virtual AP multi-link device MLD. The virtual AP multi-link device MLD includes one AP. In this case, the virtual MLD to which the reported AP is affiliated also has a normal MLD-Index, but an MLD-Index of an MLD to which another AP is affiliated is different from the MLD-Index of the virtual MLD to which the reporting AP is affiliated.

In an embodiment, the eighth information may be carried in the reduced neighbor report element (Reduced Neighbor Report element) only in a case in which the reported AP is in a same MLD as the reporting AP or belongs to a same multiple BSSID set as a member of the MLD to which the reporting AP is affiliated. The following uses an example for description.

Optionally, the first information may indicate whether the reported AP is affiliated to the same MLD as the reporting AP or belongs to a same multiple BSSID set as a member of the MLD to which the reporting AP is affiliated. If the reported AP is affiliated to the same MLD as the reporting AP or the reported AP belongs to the same multiple BSSID set as the member of the MLD to which the reporting AP is affiliated, the first information may carry a third value. If the reported AP is neither affiliated to the same MLD as the reporting AP nor belongs to the same multiple BSSID set as the member of the MLD to which the reporting AP is affiliated (that is, the reported AP is neither in the same MLD as the reporting AP nor belongs to the same multiple BSSID set as the member of the MLD to which the reporting AP is affiliated), the first information may carry a fourth value. For example, the first information includes one bit. When the bit is set to 1, it indicates that the reported AP is affiliated to the same MLD as the reporting AP or the reported AP belongs to the same multiple BSSID set as the member of the MLD to which the reporting AP is affiliated. When the bit is set to 0, it indicates that the reported AP is neither affiliated to the same MLD as the reporting AP nor belongs to the same multiple BSSID set as the member of the MLD to which the reporting AP is affiliated. Optionally, the third information may indicate that the reported AP is affiliated to the same MLD as the reporting AP. Further, the eighth information is carried in the reduced neighbor report element (Reduced Neighbor Report element).

For example, as shown in FIG. 8(*a*), if the first information in the Co-MLD field indicates that the reported AP is in a same MLD as the reporting AP or the reported AP belongs to a same multiple BSSID set as a member of the MLD to which the reporting AP is affiliated, the eighth information is carried in an MLD-Index field.

Optionally, as shown in FIG. 8 (b), if the same-MLD field indicates that the reported AP is in the same MLD as the reporting AP, the eighth information is carried in the MLD-Index field. For example, FIG. 6 is used as an example. It is assumed that the AP whose MAC address is BSSID-1x is a reporting AP, the AP whose MAC address is BSSID-2x and an AP whose MAC address is BSSID-2y are two reported APs. Because the reported AP whose MAC address is BSSID-2y and the reporting AP whose MAC address is BSSID-1x are in a same MLD, a first information field of a reduced neighbor report element corresponding to the reported AP whose MAC address is BSSID-2x carries the third value. In addition, although the reported AP whose MAC address is BSSID-2x is not affiliated to the same MLD as the reporting AP whose MAC address is BSSID-1x, the reported AP whose MAC address is BSSID-2x belongs to a same multiple BSSID set as the AP whose MAC address is BSSID-2y and that is in the MLD to which the reporting AP whose MAC address is BSSID-1x is affiliated. Therefore, a first information field of a reduced neighbor report element corresponding to the reported AP whose MAC address is BSSID-2y carries the third value. When the first information carries the third value, a corresponding field is added to the reduced neighbor report element to carry the eighth information.

In another embodiment, the eighth information may be carried in the reduced neighbor report element only when the reported AP belongs to a same multiple BSSID set as a member of the MLD to which the reporting AP is affiliated. The following provides description by using an example.

Optionally, the second information may indicate whether the reported AP belongs to the same multiple BSSID set as the member of the MLD to which the reporting AP is affiliated. If the reported AP belongs to the same multiple BSSID set as the member of the MLD to which the reporting AP is affiliated, the second information carries a fifth value. If the reported AP does not belong to the same multiple BSSID set as the member of the MLD to which the reporting AP is affiliated, the second information carries a sixth value. For example, the first information includes one bit. When the bit is set to 1, it indicates that the reported AP belongs to the same multiple BSSID set as the member of the MLD to which the reporting AP is affiliated. When the bit is set to 0, it indicates that the reported AP does not belong to the same multiple BSSID set as the member of the MLD to which the reporting AP is affiliated.

When a value carried in the second information is a fifth value, a corresponding field is added to the reduced neighbor report element to carry the eighth information.

In still another example, if the fourth information indicates that the reported AP belongs to a multiple BSSID set, for example, a multiple BSSID field in a BSS parameter field indicates that the reported AP belongs to a multiple BSSID set, a TBTT information field may also carry the MLD-index field.

In this embodiment of this application, there are two possibilities for the member of the MLD to which the reporting AP is affiliated, which are specifically as follows: 1. any member of the MLD to which the reporting AP is affiliated; and 2. any member other than the reporting AP of the MLD to which the reporting AP is affiliated. In this application, there are the foregoing two possibilities for a member of an MLD to which any reporting AP is affiliated. Details are not described in other places.

Ninth information indicates a multiple BSSID set index (Multiple BSSID set-index) of the multiple BSSID set to which the reported AP belongs. A field that carries the ninth information may be referred to as a ninth information field. The ninth information field may also have another name, for example, a multiple BSSID set-index field. The ninth information field may be set in a TBTT info field of the reduced neighbor report element (Reduced Neighbor Report element). Optionally, the multiple BSSID set-index field may carry an index or an ID of the multiple BSSID set.

Optionally, in manner 1, the ninth information may be carried in the reduced neighbor report element only when both of the following conditions are satisfied:

Condition 1: The reported AP belongs to the multiple BSSID set.

Condition 2: The reported AP is affiliated to the same MLD as the reporting AP or belongs to a same multiple BSSID set as a member of the MLD to which the reporting AP is affiliated.

Optionally, in manner 2, the ninth information is parsed when the following condition is satisfied:

Condition 1: The reported AP belongs to the same multiple BSSID set as the member of the MLD to which the reporting AP is affiliated.

Optionally, in manner 3, the ninth information is parsed when the following condition is satisfied:

Condition 1: The reported AP belongs to the multiple BSSID set.

For example, if the reported AP belongs to the multiple BSSID set, a multiple BSSID indication bit in the BSS parameters field is set to a first value, for example, set to 1. If the reported AP is affiliated to the same MLD as the reporting AP or belongs to a same multiple BSSID set as a member of the MLD to which the reporting AP is affiliated, a value of the Co-MLD field is 1. If both the multiple BSSID indication bit and the Co-MLD field are set to 1, a multiple BSSID set-index field is added to the TBTT info field. Optionally, when only condition 1 is satisfied, a new multiple BSSID set-index field may also be added to the TBTT info field.

It may be understood that if reduced neighbor report elements of a plurality of multiple reported APs include same ninth information (for example, multiple BSSID set-index), it indicates that the plurality of reported APs are APs in a same multiple BSSID set. Optionally, when the reported AP is in a same multiple BSSID set as the reporting AP, the multiple BSSID set-index in the reduced neighbor report element of the reported AP may be set to a special value (for example, 0). Subsequently, after reading that the multiple BSSID set-index in the reduced neighbor report element of the reported AP is the special value, the receive end may determine that the reported AP is in the same multiple BSSID set as the reporting AP. In another manner, information about each AP in the same multiple BSSID set may be learned based on a multiple BSSID element carried in the first management frame by the reporting AP.

Certainly, if the foregoing two conditions are not satisfied, the TBTT info field may also include a multiple BSSID set-index field. The field is a reserved value or does not indicate any multiple BSSID set. In a solution in which the multiple BSSID set-index field is carried only if condition 1 and condition 2 are satisfied, and in a solution in which the multiple BSSID set-index field is carried only when condition 1 is satisfied, signaling overheads are lower.

Optionally, information about members other than the reporting AP in the same multiple BSSID set as the reporting AP may be indicated by a multiple BSSID element carried in a management frame, instead of being carried in the reduced neighbor report element.

In addition to including one or more of the eighth information, the ninth information, the first information, the second information, the third information, or the fourth information, the reduced neighbor report element may further include one or more of fifth information, sixth information, or seventh information.

The fifth information indicates a link identifier (Link ID) of the reported AP. It may be understood that each of a plurality of APs included in a same AP multi-link device MLD occupies a unique link identifier (Link ID). Therefore, an AP corresponding to a determined link identifier (Link ID) may be uniquely determined based on the link identifier (Link ID). In this embodiment of this application, link IDs may one-to-one correspond to operating classes (Operating Class), channel numbers (channel number), reported AP MAC addresses, or combinations of more of the operating classes, the channel numbers, and the reported AP MAC addresses. Therefore, if a BSS parameter of a specific reported AP needs to be carried in the first management frame or another management frame sent by the reporting AP, a link identifier (Link ID) corresponding to the reported AP may be directly added, and the receive end may determine, based on the link identifier (Link ID) corresponding to the reported AP, information such as a corresponding operating class (Operating Class), a channel number (channel number), and a reported AP MAC address, without repeatedly indicating the information. This reduces overheads.

For example, as shown in FIG. 8(c), if the first information in the Co-MLD field indicates that the reported AP is in the same MLD as the reporting AP or belongs to a same multiple BSSID set as the member of the MLD to which the reporting AP is affiliated, the eighth information is carried in an MLD-Index field. In addition, the ninth information may be further carried in the multiple BSSID set-index field. The fifth information may be carried in a Link ID field. Certainly, the TBTT information field shown in FIG. 8(b) may further include a Link ID field and a multiple BSSID set-index field.

The sixth information indicates a link identifier (Link ID) of the reporting AP and/or a MAC address (Address) of the MLD to which the reporting AP is affiliated. For a use principle of the link identifier (Link ID) of the reporting AP, refer to description about a use principle of the reported AP in the fifth information. Details are not described herein again. In addition, the MAC address (Address) of the MLD to which the reporting AP is affiliated helps determine a MAC address of an MLD to which the reported AP is affiliated. As mentioned in the foregoing solution, if the MLD index of the MLD to which the reported AP is affiliated is the same as the MLD index of the MLD to which the reporting AP is affiliated, the MLD index of the MLD to which the reported AP is affiliated may be simply represented by the first value. Therefore, after it is determined, based on the first value, that the MLD index of the reported AP is the same as that of the reporting AP, the MAC address (which may be used as the MLD index) of the MLD to which the reported AP is affiliated may be further determined based on the indicated MAC address of the MLD to which the reporting AP is affiliated. In addition, the MAC address of the MLD to which the AP is affiliated may be further for establishing an association between multi-link devices, for example, be carried in a probe request frame/probe response frame, authentication request frame/authentication response frame, and association request frame/association response frame, that are in an interaction process.

Optionally, the sixth information may not be in the reduced neighbor report element, but is still in the first management frame, for example, in an MLD element of the first management frame. The MLD element indicates information about a plurality of APs in a same MLD or information about one or more single-link APs.

Figure 17:
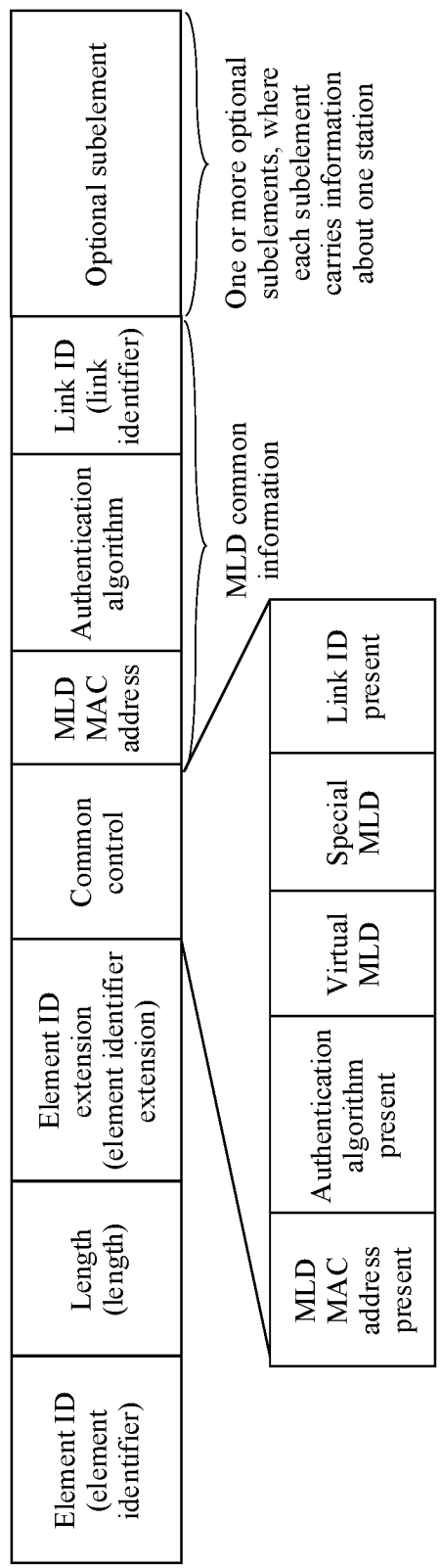
FIG. 17 is a schematic diagram of a structure of an MLD element according to an embodiment of this application.

As shown in FIG. 17, the MLD element includes a common control field, an MLD common information field, and one or more optional subelements. Optionally, the MLD common information field includes an MLD MAC address field, and optionally includes a field, for example, an authentication algorithm field. The MLD MAC address field indicates an address of an MLD indicated by the MLD element, and the address is for identifying one MLD. Optionally, the address of the MLD is a MAC address (address) of the MLD. In other words, the MAC address is for identifying an AP multi-link device management entity (management entity). A MAC address of the AP multi-link device may be the same as one MAC address of n APs included in the multi-link AP MLD, or may be different from all MAC addresses of the n APs. For example, the MAC address of the AP multi-link device is a common MAC address, and may identify the multi-link AP.

Optionally, the common control field includes an MLD address existed field (or referred to as an MLD address present field or an MLD address present identifier), to indicate whether there is an MLD address field in the MLD common information field. Optionally, the common control field further includes an authentication algorithm present field, to indicate whether there is an authentication algorithm field in the MLD common information field. Optionally, the "present field" may include one bit. A first value indicates that a corresponding field is present, and a second value indicates that the corresponding field is not present. For example, the first value is 1, and the second value is 0.

Optionally, one MLD element further includes one or more subelements, and one subelement describes information about one AP in the multi-AP multi-link device. Content of each subelement includes a link identifier of the AP. Optionally, each subelement further includes fields related to the AP, such as an SSID field, a timestamp (timestamp) field, a beacon interval field, and an element of the AP. The element of the AP is, for example, a BSS load element, an EHT capability element, or an EHT operation element.

In an AP MLD discovery mechanism, the reporting AP (any AP other than a nontransmitted AP in the multiple BSSID set may serve as a reporting AP) in the AP MLD sends the first management frame, for example, a beacon frame or a probe response frame, on a link on which the reporting AP operates. In addition to the sent reduced neighbor report element (Reduced Neighbor Report element, RNR element), an MLD element further needs to be carried. The MLD element may indicate common information of the AP MLD and specific information of each AP. This can help a STA MLD choose to establish a multi-link association with an optimal AP MLD. To avoid an excessively long first management frame, the first management frame carries only MLD common information of an MLD element, without carrying information about a subelement corresponding to each AP. The first half part of the MLD element shown in FIG. 18 includes one or more or all of an MLD MAC address, a link identifier, or an MLD index; and optionally, further includes an authentication algorithm field. The link identifier indicates the reporting AP. Details are described in the sixth information, and are not described herein again. The MLD index indicates an AP MLD index, and is consistent with an MLD index indicated by the eighth information in the RNR element. To be specific, for the same AP MLD, the MLD index used by the RNR element is the same as the MLD index in the MLD element. For example, as shown in FIG. 6, it is assumed that the reporting AP in the MLD 1 is BSSID-1x. In this case, the first management frame sent by the reporting AP carries the RNR element. The RNR element carries information about APs such as BSSID-2y, BSSID-3x, BSSID-2x, BSSID-3y, BSSID-1y, and BSSID-2z; and optionally, carries information about BSSID-3z. In this case, the first management frame further additionally carries the first half part of the MLD element of the MLD 1, the first half part of an MLD element of the MLD 2, and the first half part of an MLD element of an MLD 3; and optionally, includes the first half part of a special MLD element indicating BSSID-3z. An MLD index of the special MLD element is set to a special value, for example, 255. An MLD MAC address is an AP MAC address, or is not present. A link identifier is a link identifier of the single AP.

The RNR element sent by the reporting AP needs to include the following information about the reported AP:
(1) all APs affiliated to a same AP MLD as the reporting AP, or all APs in the AP MLD to which the reporting AP is affiliated;
(2) all APs in an AP MLD to which a nontransmitted AP in a same multiple BSSID set as the reporting AP is affiliated; or all APs in an AP MLD to which a non-transmitted AP in the multiple BSSID set to which the reporting AP belongs; or
(3) all APs in an AP MLD that satisfies the following two conditions: (1) At least one AP in the AP MLD is in a same multiple BSSID set as one AP in the AP MLD to which the reporting AP is affiliated; and (2) no AP in the AP MLD operates on a same link as the reporting AP. In a special case, the AP MLD includes only one AP. Optionally, the AP MLD includes an AP operating at 6 GHz. Optionally, the AP MLD may be an AP MLD including only one AP.

For the AP MLD that satisfies conditions 1 and 2, after obtaining the information, a station in the STA MLD may directly send a probe response frame on a current link or receive a beacon frame on a current link. The probe request frame carries the first part of the MLD element, or further carries a link identifier or link identifiers of one or more APs, to obtain complete information of the corresponding AP MLD, that is, further includes detailed information of each AP in the corresponding AP MLD. The station in the STA MLD specifies detailed information of a plurality of APs, and then establishes a multi-link association with the AP MLD, or directly establishes a multi-link association with the AP MLD without scanning. In the first half part of the MLD element, an MLD MAC address may be a special MAC address, or an MLD index is set to a special MLD index, to obtain MLD information of all surrounding APs. After receiving a request of the STA MLD, the AP in the AP MLD sends a probe response frame. The probe response frame includes content of the request of the STA MLD, for example, carrying one or more MLD elements. Optionally, each MLD element includes an MLD index.

An AP MLD satisfying condition 3 optionally includes an AP operating at 6 GHz. The STA MLD may directly obtain information about the AP MLD without performing scanning on another link. If the STA MLD is interested in the AP MLD, for example, in an appropriate frequency band, the STA MLD may further send the foregoing probe request frame; or receive, on a corresponding link, specific information sent by one AP in the AP MLD; and then establishes a multi-link association with the AP MLD, or directly establishes a multi-link association with the AP MLD without scanning. After receiving a request of the STA MLD, the AP in the AP MLD sends a probe response frame. The probe response frame includes content of the request of the STA MLD, for example, carrying one or more MLD elements. Optionally, each MLD element includes an MLD index.

The MLD common information in the first half of the MLD element carried in the probe request frame sent by one STA in the STA MLD may include only one or two fields, and does not need to carry all fields, for example, carry an MLD index or an MLD MAC address. FIG. 6 is used as an example. The following conditions are included:
(1) all APs in a same AP MLD 1 as a reporting AP with BSSID-1x, that is, BSSID-2y and BSSID-3x;
(2) all APs in an AP MLD 3 to which a nontransmitted AP (that is, the BSSID-1y) in a same multiple BSSID set 1 as a reporting AP with BSSID-1x is affiliated: BSSID-1y and BSSID-2z; and
(3) two APs in an AP MLD 2, that is, an AP MLD that satisfies the foregoing two conditions in FIG. 6: BSSID-2x and BSSID-3y, where BSSID-2x in the AP MLD 2 is in a same multiple BSSID set 2 as an AP 2y in the AP MLD1, and no AP in the AP MLD 2 is on a same link as BSSID-1x. Optionally, the AP MLD that satisfies the foregoing two conditions in FIG. 6 alternatively includes only one AP, that is, BSSID-3z.

Figure 18:
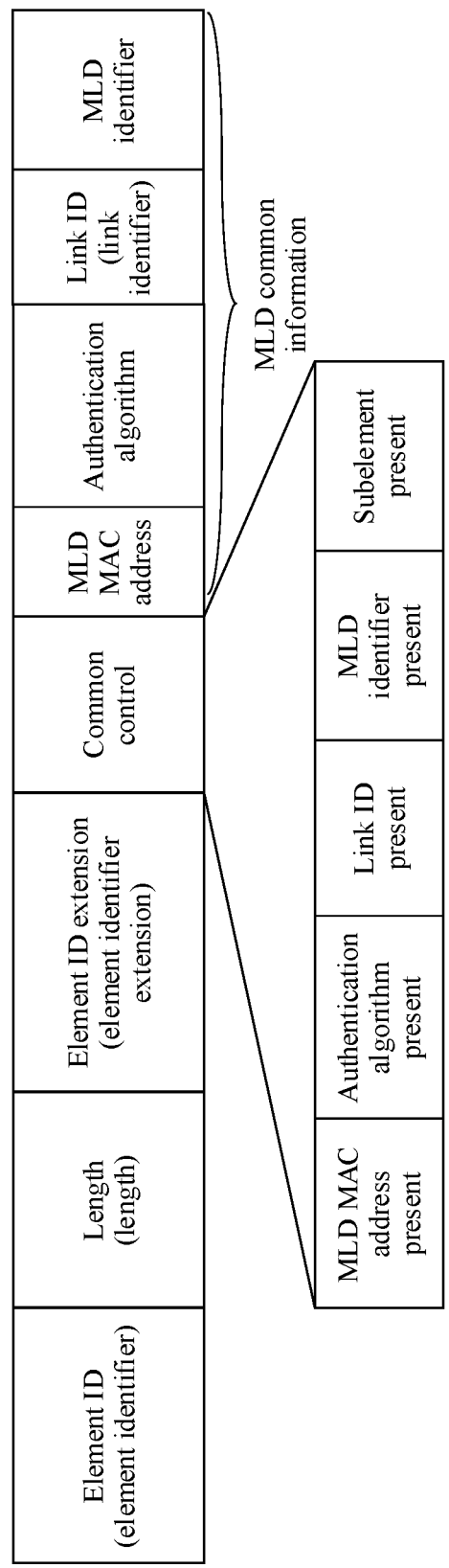
FIG. 18 is a schematic diagram of a structure of another MLD element according to an embodiment of this application.

In addition, the first half part of the MLD element shown in FIG. 18 further includes a common control field. The common control field includes one or more or all of an MLD MAC address present field, a link ID present field, an MLD index present field, and a subelement present field; and optionally, includes an authentication algorithm field. The MLD MAC address present field indicates whether the MLD common information includes an MLD MAC address field. The link ID present field indicates whether the MLD common information includes a link ID field. The MLD index present field indicates whether the MLD common information includes an MLD index field. The foregoing fields may be indicated by using one bit. For example, 1 indicates being present. 0 indicates being not present. Two values of one field are used, where a first value indicates being present, and a second value indicates being not present.

It should be understood that the first half of the MLD element shown in FIG. 17 may be alternatively replaced with the first half of the MLD element shown in FIG. 18, for the AP MLD to provide further detailed information for the station MLD. For example, the first half of the MLD element is placed in a probe response frame or an association response frame. Optionally, the common control field includes an MLD common information present field, to indicate whether MLD common information is present, or whether a field other than an MLD MAC address or an MLD index in the MLD common information field is present, to help further reduce repeated information (in this case, the STA MLD has learned of this part of information).

If the reporting AP belongs to a multiple BSSID set, the reporting AP further needs to send a multiple BSSID element, including a nontransmitted profile, to indicate information about one or more nontransmitted APs. If the one nontransmitted AP comes from one AP MLD, the first part of the MLD element shown in FIG. 18 or a complete part of the MLD element shown in FIG. 17 may be further placed in information about the nontransmitted AP.

The seventh information indicates whether the first management frame carries information about all first reported APs. The first reported AP is a member of the MLD to which the reporting AP is affiliated. In another manner, the seventh information indicates whether the management frame carries the information about all the first reported APs and information about members of a multiple BSSID set to which all the first reported APs belong. The seventh information may be located in the reduced neighbor report element, another existing element in the first management frame, or a newly added element in the first management frame. For ease of understanding, the following provides several optional indication examples of the seventh information.

Example 1: The seventh information is carried in a specific field (which may be referred to as, for example, a "complete field"). The specific field indicates whether the reporting AP includes, in the management frame, the information about all the first reported APs and the information about the members of the multiple BSSID set to which all the first reported APs belong. For example, if the reporting AP includes, in the management frame, the information about all the first reported APs and the information about the members of the multiple BSSID set to which all the first reported APs belong, the seventh information may be specifically set to a value, for example, 1. If the reporting AP does not include, in the management frame, the information about all the first reported APs or the information about the members of the multiple BSSID set to which all the first reported APs belong, the seventh information may be specifically set to another value, for example, 0.

After obtaining the seventh information, the receive end may learn whether related information corresponding to all the reported AP is received.

Example 2: The seventh information is carried in a specific field (which may be referred to as, for example, a "complete field"). The specific field indicates a quantity of information periodicities required for the reporting AP to send the information about all the first reported APs and the information about all the members of the multiple BSSID set to which all the first reported APs belong. One information period may be specifically one beacon frame, or two beacon frames, or another time unit in which a time length can be measured.

After obtaining the seventh information, the receive end may learn whether all related information corresponding to all the reported APs is received. If not all related information corresponding to all the reported APs is received, the receive end may further learn how many information periodicities are still required to receive all the related information.

In this embodiment of this application, there are two possibilities for the members of the MLD to which the reporting AP is affiliated, which are specifically as follows: 1. any member of the MLD to which the reporting AP is affiliated; and 2. any member other than the reporting AP of the MLD to which the reporting AP is affiliated. In this application, there are the foregoing two possibilities for members of an MLD to which any reporting AP is affiliated. Details are not described in other places.

In this embodiment of this application, there are two possibilities for members of a multiple BSSID set to which the first reported AP belongs, which are specifically as follows: 1. any member of the multiple BSSID set to which the first reported AP belongs; and 2. any member other than the first reported AP in the multiple BSSID set to which the first reported AP belongs. In this application, there are the foregoing two possibilities for the members of the multiple BSSID set to which any first reported AP belongs, and details are not described in other places.

The information placed in the TBTT information field mentioned in this embodiment of this application includes one or more of the eighth information, the ninth information, the first information, the second information, the third information, the fourth information, or the fifth information. One or more of the first information, the second information, the third information, the fourth information, or the fifth information is carried in the BSS parameter field in the TBTT information field. Therefore, the BSS parameter field may have a length of one or two bytes. If the length of the BSS parameter field is changed to two bytes, the BSS parameter field is equivalent to a 1-byte BSS parameter field and a 1-byte BSS parameter extension field in Table 4. The eighth information has a length of one byte, and the ninth information has a length of one byte.

Therefore, a TBTT info length (TBTT information length) field indicates a length of each TBTT info field. Table 5 shows formats of carried specific information of different lengths. One or more of a length of 13 bytes, a length of 14 bytes, or a length of 15 bytes are added.

TABLE 5

| TBTT information length (byte) | Content carried in a TBTT information field |
|---|---|
| 1 | TBTT offset field of a neighbor AP |
| 2 | TBTT offset field and BSS parameter field of the neighbor AP |
| 5 | TBTT offset field and short SSID field of the neighbor AP |
| 6 | TBTT offset field, short SSID field, and BSS parameter field of the neighbor AP |
| 7 | TBTT offset field and BSSID field of the neighbor AP |
| 8 | TBTT offset field, BSSID field, and BSS parameter field of the neighbor AP |
| 11 | TBTT offset field, BSSID field, and short SSID field of the neighbor AP |
| 12 | TBTT offset field, BSSID field, short SSID field, and BSS parameter field of the neighbor AP |
| 13 | TBTT offset field, BSSID field, short SSID field, BSS parameter field, and eighth information field of the neighbor AP |
| 13 | TBTT offset field, BSSID field, short SSID field, BSS parameter field, and ninth information field of the neighbor AP |
| 13 | TBTT offset field, BSSID field, short SSID field, BSS parameter field, and extended BSS parameter field of the neighbor AP |
| 14 | TBTT offset field, BSSID field, short SSID field, BSS parameter field, eighth information field, and ninth information field of the neighbor AP |
| 14 | TBTT offset field, BSSID field, short SSID field, BSS parameter field, extended BSS parameter field, and eighth information field of the neighbor AP |
| 14 | TBTT offset field, BSSID field, short SSID field, BSS parameter field, extended BSS parameter field, and ninth information field of the neighbor AP |
| 15 | TBTT offset field, BSSID field, short SSID field, BSS parameter field, extended BSS parameter field, eighth information field, and ninth information field of the neighbor AP |
| 0, 9-10 | Reserved |
| 16-255 | Reserved. Information in first 12 bytes is the same as a carried field with a TBTT information length of 12. |

Certainly, the length of the BSS parameter field may alternatively be another byte quantity, for example, three bytes, four bytes, or five bytes. The length of the eighth information may alternatively be another byte quantity, for example, two to six bytes. The length of the ninth information may alternatively be another byte quantity, for example, two to six bytes.

Step S402: The station receives the first management frame.

Specifically, after receiving the first management frame, the station obtains, through parsing, information in the first management frame, for example, a reduced neighbor report element (Reduced Neighbor Report element) in the first management frame and a multiple BSSID element corresponding to the reporting AP. The following focuses on how to obtain the information in the reduced neighbor report element through parsing.

Specific information that is in the eighth information, the ninth information, the first information, the second information, the third information, the fourth information, the fifth information, the sixth information, and the seventh information, and that is carried in the reduced neighbor report element is obtained by the station through parsing. Generally, if the reduced neighbor report element (Reduced Neighbor Report element) carries one or more neighbor AP info fields, target information (including at least one of the eighth information, the ninth information, the first information, the second information, the third information, the fourth information, the fifth information, the sixth information, or the seventh information) corresponding to the one or more reported APs is correspondingly obtained through parsing. If the reduced neighbor report element (Reduced Neighbor Report element) carries one or more neighbor AP info fields, that is, in case 1, each neighbor AP info field corresponds to information of one reported AP, and in case 2, a plurality of reported APs share one operating class and one channel number, one neighbor AP info field may include information of a plurality of reported APs. In this case, each of TBTT information fields in the neighbor AP info fields includes other information of one reported AP. In case 2, optionally, lengths of all the TBTT information fields corresponding to the reported APs are the same. If the lengths are different, each reported AP may be indicated by using only one neighbor AP info field.

The following provides description by using an example in which a station receives target information in a neighbor AP info field corresponding to one of the reported APs (principles of target information in neighbor AP info fields corresponding to other reported APs may be similar). Details are as follows:

If the first information is obtained through parsing, the station may learn, based on the first information, whether the reported AP is affiliated to the same MLD as the reporting AP or whether the reported AP belongs to a same multiple BSSID set as a member of the MLD to which the reporting AP is affiliated. For example, when a value carried in the first information is a third value (for example, 1), the station determines that the reported AP is affiliated to the same MLD as the reporting AP or the reported AP belongs to the same multiple BSSID set as the member of the MLD to which the reporting AP is affiliated. If the value carried in the first information is a fourth value (for example, 0), the station determines that the reported AP is neither affiliated to the same MLD as the reporting AP, nor belongs to the same multiple BSSID set as the member of the MLD to which the reporting AP is affiliated.

If the second information is obtained through parsing, the station may learn, based on the second information, whether the reported AP belongs to the same multiple BSSID set as the member of the MLD to which the reporting AP is affiliated. For example, when a value carried in the second information is a fifth value (for example, 1), the station determines that the reported AP belongs to the same multiple BSSID set as the member of the MLD to which the reporting AP is affiliated. When the value carried in the second information is a sixth value (for example, 0), the station determines that the reported AP does not belong to the same multiple BSSID set as the member of the MLD to which the reporting AP is affiliated.

Optionally, if the station determines, based on the first information, that the reported AP is affiliated to the same MLD as the reporting AP or the reported AP belongs to the same multiple BSSID set as the member of the MLD to which the reporting AP is affiliated, and determines, based on the second information, that the reported AP belongs to the same multiple BSSID set as the member of the MLD to which the reporting AP is affiliated, the station further parses the eighth information, that is, parses to obtain an MLD index (MLD-Index) of the reported AP. Certainly, if the first information and the second information do not exist, the station may directly attempt to parse the eighth information.

If the third information is obtained through parsing, the station may learn, based on the third information, whether the reported AP is affiliated to the same MLD as the reporting AP. For example, when a value carried in the third information is a seventh value (for example, 1), the station may determine that the reported AP is affiliated to the same MLD as the reporting AP. When the value carried in the third information is an eighth value (for example, 0), the station may determine that the reported AP is not affiliated to the same MLD as the reporting AP.

If the fourth information is obtained through parsing, the station may learn, based on the fourth information, whether the reported AP belongs to a multiple BSSID set. For example, the fourth information may be specifically a multiple BSSID indication bit. When the multiple BSSID indication bit is set to a specific value (which may be, for example, 1), it indicates that the reported AP belongs to the multiple BSSID set. When the multiple BSSID indication bit is set to another specific value (which may be, for example, 0), it indicates that the reported AP does not belong to the multiple BSSID set.

Optionally, in manner 1, the ninth information is parsed when all the following conditions are satisfied:

Condition 1: The reported AP belongs to the multiple BSSID set.

Condition 2: The reported AP is affiliated to the same MLD as the reporting AP or belongs to a same multiple BSSID set as a member of the MLD to which the reporting AP is affiliated.

Optionally, in manner 2, the ninth information is parsed when the following condition is satisfied:

Condition 1: The reported AP belongs to the same multiple BSSID set as the member of the MLD to which the reporting AP is affiliated.

Optionally, in manner 3, the ninth information is parsed when the following condition is satisfied: Condition 1: The reported AP belongs to the multiple BSSID set.

It may be understood that a multiple BSSID set index of the multiple BSSID set to which the reported AP belongs may be learned from the ninth information.

If the fifth information is obtained through parsing, a link identifier (Link ID) of the reported AP may be obtained. Because link IDs one-to-one correspond to operating classes (Operating Class), channel numbers (channel number), reported AP MAC addresses, or combinations of one or more of the operating classes, the channel numbers, or the reported AP MAC addresses. Therefore, if the station has previously received information such as an operating class (Operating Class) of the reported AP, a channel number (channel number), and a MAC address of the reported AP, the station may obtain the information based on the correspondence, without repeatedly indicating the information. This reduces overheads.

If the sixth information is obtained through parsing, the link identifier (Link ID) of the reporting AP may be obtained. Because link IDs one-to-one correspond to operating classes (Operating Class), channel numbers (channel number), reporting AP MAC addresses, or combinations of one or more of the operating classes, the channel numbers, or the reporting AP MAC addresses. Therefore, if the station has previously received information such as an operating class (Operating Class) of the reporting AP, a channel number (channel number), and a MAC address of the reporting AP, the station may obtain the information based on the correspondence, without repeatedly indicating the information. This reduces overheads.

If the seventh information is obtained through parsing, it may be learned, based on the seventh information, whether the first management frame carries the information about all the first reported AP. The first reported AP is a member of the MLD to which the reporting AP is affiliated. Optionally, if the seventh information indicates that the first management frame does not carry the information about all the first reported APs, the station continues to receive a new management frame until the information about all the first reported APs is received. If the seventh information indicates a quantity of information periodicities left before reception can be completed, reception may continue for the corresponding information periodicities, so as to receive the information about all the first reported APs.

In another manner, if the seventh information is obtained through parsing, it may be learned, based on the seventh information, whether the management frame carries the information about all the first reported APs and information about members of a multiple BSSID set to which all the first reported APs belong. Optionally, if the seventh information indicates that the first management frame does not carry the information about all the first reported APs or does not carry the information about the members of the multiple BSSID set to which all first reported APs belong, the station continues to receive a new management frame, until the information about all the first reported APs and the information about the members of the multiple BSSID set to which all the first reported APs belong are received. If the seventh information indicates a quantity of information periodicities left before reception can be completed, reception may continue for the corresponding information periodicities, so as to receive the information about all the first reported APs and the information about the members of the multiple BSSID set to which all the first reported APs belong.

FIG. 8(a) is used as an example. After obtaining the Co-MLD field through parsing, the station determines that the Co-MLD field is set to 1, and then determines that the reported AP is affiliated to the same MLD as the reporting AP or that the reported AP belongs to the same multiple BSSID set as the member AP of the MLD to which the reporting AP is affiliated. In this case, the station further determines that the TBTT information field further includes an MLD-index field, and further parses the MLD-index field to obtain an index or a MAC address of the MLD to which the reported AP is affiliated. FIG. 8(b) is used as an example.

After obtaining the same-MLD field through parsing, the station determines that the same-MLD field is set to 1, and then determines that the reported AP is affiliated to the same MLD as the reporting AP. In addition, the station may further determine, based on the MLD multiple BSSID field, whether the reported AP belongs to the same multiple BSSID set as the member AP of the MLD to which the reporting AP is affiliated. In this case, the station further parses the MLD-index field to obtain the index or the MAC address of the MLD to which the reported AP is affiliated.

FIG. 8(c) is used as an example. After obtaining the Co-MLD field through parsing, the station determines that the Co-MLD field is set to 1, and then determines that the reported AP is affiliated to the same MLD as the reporting AP or that the reported AP belongs to the same multiple BSSID set as the member AP of the MLD to which the reporting AP is affiliated. In this case, the station further parses the MLD-index field, the link ID field, and the multiple BSSID set index field to obtain the index or the MAC address, the link ID, and the multiple BSSID set index of the MLD to which the reported AP is affiliated.

In this embodiment of this application, optionally, the station may learn, based on one or more of the eighth information, the ninth information, the first information, the second information, the third information, the fourth information, the fifth information, the sixth information, or the seventh information, a specific MLD to which each reported AP is affiliated, and a specific multiple BSSID set to which each reported AP belongs, so as to have an overall understanding of a structure of the multiple BSSID sets that are based on the AP multi-link device. In this way, the station may select a required appropriate AP from the structure of the multiple BSSID sets that are based on the AP multi-link device. During specific implementation, the station may include a link identifier (Link ID) or a link ID list in the probe request frame, and optionally carry an MLD-Index or an MLD MAC address. In this case, after receiving the probe request frame, the AP determines a corresponding AP based on the link ID, the link ID list, the MLD-Index, or the MLD MAC address in the probe request frame, and then replies to the station with more detailed information (for example, capability information and operation information of the AP. The capability information indicates specific functions supported by the AP, and the operation information may indicate an operating center frequency, an operating bandwidth, and the like of the AP). Then, the station establishes an association with the corresponding AP based on the more detailed information. The following uses examples for description.

In example 1, the station includes one or more of an MLD-index or one or more link IDs in the probe request frame, to request an AP to reply with, in the probe response frame, information about an AP or APs corresponding to the one or more link IDs. Then, the station establishes an association with one or more of the APs based on the information about the AP or APs corresponding to the one or more link IDs. For example, as shown in FIG. 6, the MLD-index carried in the probe request is MLD2, and the carried link ID is the link 2 (link 2). In this case, the AP may determine, based on MLD2 and the link 2, that a corresponding AP is an AP whose MAC address is BSSID-2x, and therefore, sends more detailed information of the AP whose MAC address is BSSID-2x to the station. The station establishes an association with the AP whose MAC address is BSSID-2x.

In example 2, the station includes an MLD-index and one or more link IDs in the probe request frame, to request an AP to reply with, in the probe response frame, information about APs corresponding to link IDs other than the one or more link IDs. Then, the station chooses to establish an association with one or more of the APs based on the information about the APs corresponding to the link IDs other than the one or more link IDs. For example, as shown in FIG. 6, the MLD-index carried in the probe request is MLD1, and link IDs carried in the probe request are the link 1 (link 1) and the link 3 (link 3). In this case, the AP may determine, based on MLD2, the link 1, and the link 3, that an AP on the link 2 other than the link 1 and the link 3 in an MLD corresponding to MLD2 is an AP whose MAC address is BSSID-2x, and therefore, send more detailed information of the AP whose MAC address is BSSID-2x to the station. The station establishes an association with the AP whose MAC address is BSSID-2x.

Optionally, the station may further include signaling, for example, a special link ID, in the probe request frame, to request an AP to reply with information about all first reported APs in an MLD to which the AP is affiliated and information about members of a multiple BSSID set to which all the first reported APs belong, or only to request the AP to reply with the information about all the first reported APs in the MLD to which the AP is affiliated, so as to serve as a basis for the station to select an associated AP.

In the method shown in FIG. 4, the reduced neighbor report element of the first management frame carries the information about the MLD to which the reported AP is affiliated and the information about the multiple BSSID set to which the reported AP belongs, so that the station receiving the first management frame can learn of, based on the information, a basic status of each reported AP in the MLD and the multiple BSSID set, so as to better select an appropriate AP from the reporting AP and the reported APs for association.

Figure 9:
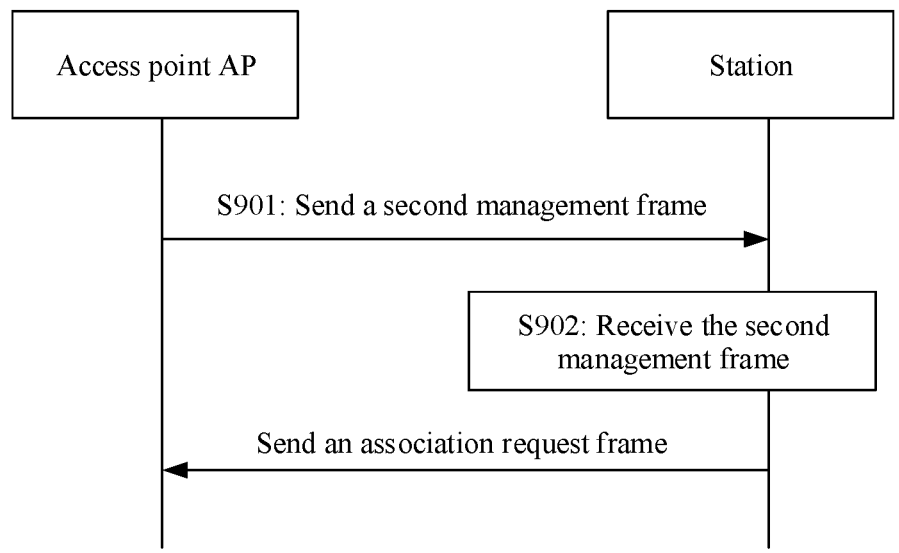
FIG. 9 is a schematic diagram of interaction of another AP multi-link device discovery method according to an embodiment of this application.

FIG. 9 shows an AP multi-link device discovery method according to an embodiment of this application. The method may be applied between stations, between an access point and a station, and between access points. For ease of description, the following uses communication between an access point and a station as an example for description. The method includes but is not limited to the following steps.

Step S901: An access point AP sends a second management frame to a station.

Specifically, the second management frame carries information about a neighbor AP, and the neighbor AP may serve as a candidate AP during BSS transition of the station. The second management frame may help the station obtain information about a neighbor AP of the associated AP, where the neighbor AP is used as a potential candidate roaming AP. For example, the second management frame may be a beacon frame, a probe response frame, an association response frame, a reassociation response frame, or an authentication frame. The second management frame may be sent by an AP multi-link device or a reporting AP (reporting AP) in the AP multi-link device. The station receiving the second management frame may be a station in a station multi-link device or a single-link station. In another type of BSS, the second management frame may alternatively be sent by a station that belongs to a multi-link device MLD. The second management frame may alternatively be received by an access point that is affiliated to the MLD or that is a single-link access point. The following illustrates an example in which the reporting AP in the AP multi-link device sends the second management frame to the station.

In this embodiment of this application, in an example, the AP multi-link device may include one logical AP, which transitions and operates on multiple links. In another example, the AP multi-link device includes n logical APs that operate on n different links (link), respectively. Therefore, the n links may be represented by link identifiers: link1, link2, . . . , and linkn. MAC addresses of the APs are different. An AP multi-link device is identified by using an MLD MAC address (address), that is, the MAC address is for identifying an AP multi-link device management entity (management entity). A MAC address of the AP multi-link device may be the same as one MAC address of the n logical APs included in the multi-link AP, or may be different from all MAC addresses of the n logical APs. For example, the MAC address of the AP multi-link device is a common MAC address, and may identify the AP multi-link device.

In an example, one or more logical APs in the AP multi-link device may belong to one or more multiple (Multiple) base service set identifier (Basic Service Set Identifier, BSSID) sets (set). In an example, logical APs in an AP multi-link device belong to different multiple BSSID sets. In another example, a plurality of logical APs in the AP multi-link device may belong to a same multiple BSSID set. For example, if two logical APs in the AP multi-link device operate on one link, the two logical APs may belong to a same multiple BSSID set.

In this embodiment of this application, an architecture of a multiple BSSID set based on an AP multi-link device may be similar to related description of FIG. 5, FIG. 6, and FIG. 7 in the foregoing embodiments. Details are not described herein again.

In this embodiment of this application, the second management frame carries a neighbor report element (Neighbor Report element). The neighbor report element needs to carry information about a neighbor AP of the reporting AP, for example, an operating class, a channel number, and a BSSID in which the neighbor AP operates. If the AP in the AP multi-link device belongs to a multiple BSSID set, the neighbor report element may further include a corresponding multiple BSSID element. The following provides description by using an example of the neighbor report element.

First information is carried in the neighbor report element (Neighbor Report element), for example, a BSSID information field in the neighbor report element.

First Information

The first information indicates one or more of the following information:

whether a reported AP is affiliated to the same MLD as the reporting AP; whether the reported AP is an AP in an MLD; or whether the reported AP is affiliated to a same MLD as a previous reported AP.

Optionally, when the first information indicates more of the foregoing listed three items, the more items may be separately indicated. For example, the first information includes three bits, and each bit indicates one of the three items. For example, when the first bit is 1, it indicates that the reported AP is affiliated to the same MLD as the reporting AP. When the first bit is 0, it indicates that the reported AP is not affiliated to the same MLD as the reporting AP. When the second bit is set to 1, it indicates that the reported AP is an AP in the MLD. When the second bit is set to 0, it indicates that the reported AP is not an AP in the MLD. When the third bit is set to 1, it indicates that the reported AP is affiliated to the same MLD as the previous reported AP. When the third bit is set to 0, it indicates that the reported AP is not affiliated to the same MLD as the previous reported AP.

Optionally, second information is carried in the neighbor report element (Neighbor Report element), for example, an optional subelement field in the neighbor report element.

Second Information

In a first optional solution, the second information includes one or more of: a MAC address (Address) of an AP multi-link device MLD to which the reported AP is affiliated, a quantity of APs included in the AP multi-link device MLD to which the AP is affiliated, an indication of a simultaneous transmit/receive (simultaneous transmit/receive, STR) capability between the APs in the AP multi-link device MLD to which the AP is affiliated, a link identifier (Link ID) corresponding to the reported AP, or information (for example, a link ID, an operating class, a channel number, a BSSID, capabilities (capabilities), or operating information (Operating Information)) about APs other than the reported AP in the AP multi-link device MLD to which the AP is affiliated.

In a second optional solution, the second information includes one or more of: the MAC address (Address) of the AP multi-link device MLD to which the reported AP is affiliated, the link identifier (Link ID) corresponding to the reported AP, capabilities (capabilities), or the operating information (Operating Information). Optionally, in this solution, the information (for example, the link ID, the operating class, the channel number, and the BSSID) about the APs other than the reported AP in the AP multi-link device MLD to which the AP is affiliated may be indicated in one or more other neighbor report elements. Optionally, one neighbor report element carries information about one AP.

Figure 10:
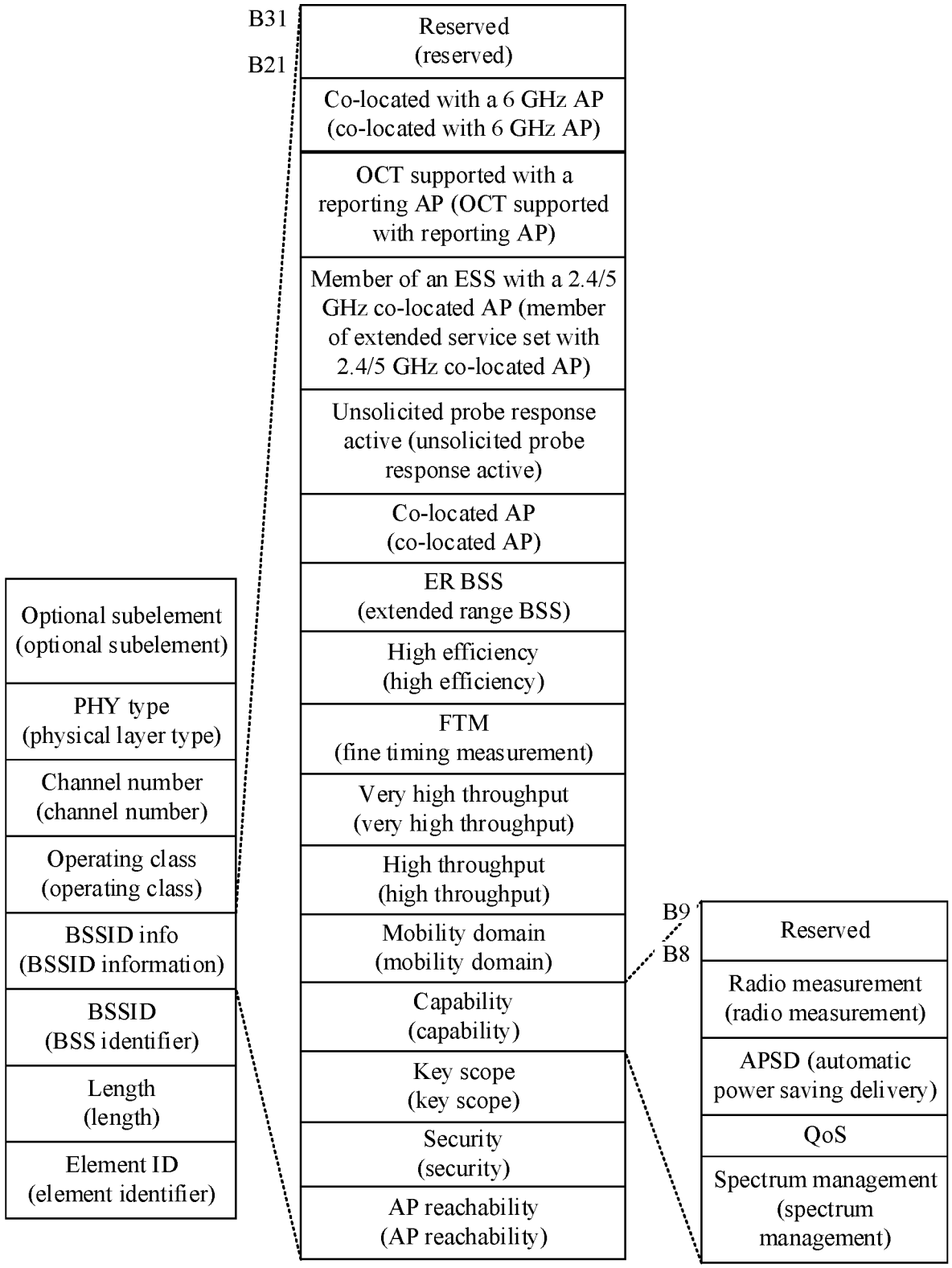
FIG. 10 is a schematic diagram of a format of another neighbor report element according to an embodiment of this application.

Optionally, an MLD indication bit (for example, the bit 1 between bit 21 and bit 31 is used as an MLD indication bit) is set in the neighbor report element, to indicate whether the reported AP is affiliated to a specific MLD. If the reported AP is an AP in a specific MLD, a value of the MLD indication bit is a first value; or if the reported AP is not an AP in a specific MLD, the value of the MLD indication bit is a second value. For example, the MLD indication bit includes one bit. When the bit is set to 1, it indicates that the reported AP is an AP in a specific MLD. When the bit is set to 0, it indicates that the reported AP is not an AP in a specific MLD. FIG. 10 shows bits 21 to 31 in a frame structure.

Optionally, when the MLD indication bit is set to the first value, the second information is carried (for example, a subelement for describing the MLD to which the reported AP is affiliated is carried in optional subelements, and then the second information is carried in the subelement).

Optionally, if the reported AP is affiliated to the same MLD as the reporting AP, the neighbor report element no longer carries the second information because the station has obtained the reporting AP based on another field.

Optionally, it is assumed that the reported AP is affiliated to the same MLD as the previous reported AP. In this case, because the station has obtained, based on another field, related information of the MLD to which the previous reported AP is affiliated, the neighbor report element no longer carries a MAC address of the MLD to which the reported AP is affiliated; and certainly, may choose to carry a MAC address of the MLD to which the reported AP is affiliated.

Optionally, if the reported AP belongs to the multiple BSSID set, an optional subelement (optional subelements) field of the neighbor report element (Neighbor Report element) carries a multiple BSSID element (element) field of a multiple BSSID set to which the reported AP belongs. A reference BSSID (or transmitted BSSID) of the multiple BSSID element is carried in a BSSID field in the neighbor report element.

Step S902: The station receives the second management frame.

Specifically, after receiving the second management frame, the station obtains information in the second management frame through parsing, for example, the neighbor report element (Neighbor Report element) in the second management frame. The following focuses on how to use the information in the neighbor report element.

Specific information that is in the second information and the first information and that is carried in the neighbor report element can be obtained by the station through parsing. For example, if the optional subelement (optional subelements) field in the neighbor report element (Neighbor Report element) carries the second information, and/or the reserved (reserved) field between the bits 21 and 31 in the BSSID info field carries the first information, the second information and/or the first information are/is obtained through parsing.

If the first information is obtained through parsing, the station may learn of one or more of the following content based on the first information:
  whether a reported AP is affiliated to the same MLD as the reporting AP;
  whether the reported AP is an AP in an MLD; or
  whether the reported AP is affiliated to a same MLD as a previous reported AP.

In this embodiment of this application, optionally, if the reported AP is affiliated to an AP in the MLD, the station further parses the second information.

In a first optional solution, the second information includes one or more of: a MAC address (Address) of an AP multi-link device MLD to which the reported AP is affiliated, a quantity of APs included in the AP multi-link device MLD to which the AP is affiliated, an indication of a simultaneous transmit/receive (simultaneous transmit/receive, STR) capability between the APs in the AP multi-link device MLD to which the AP is affiliated, a link identifier (Link ID) corresponding to the reported AP, or information (a link ID, an operating class, a channel number, a BSSID, capabilities (capabilities), or operating information (Operating Information)) about APs other than the reported AP in the AP multi-link device MLD to which the AP is affiliated.

In a second optional solution, the second information includes one or more of: the MAC address (Address) of the AP multi-link device MLD to which the reported AP is affiliated, the link identifier (Link ID) corresponding to the reported AP, capabilities (capabilities), or the operating information (Operating Information). Optionally, in this solution, the information (for example, the link ID, the operating class, the channel number, and the BSSID) about the APs other than the reported AP in the AP multi-link device MLD to which the AP is affiliated may be indicated in one or more other neighbor report elements. Optionally, one neighbor report element carries information about one AP.

In this embodiment of this application, the station may learn of, based on the second information in the neighbor report element, a specific MLD to which the reported AP is affiliated, and may have an overall understanding of a structure of the AP multi-link device with reference to information in neighbor report elements corresponding to other reported APs, so as to select an optional AP present during BSS transition of the station.

During specific implementation, the station sends an association request frame or a reassociation request frame to the AP. After receiving the association request frame or the reassociation request frame, the AP includes a neighbor report element in a returned association response frame or reassociation response frame. The neighbor report element carries information about one or more APs belonging to an MLD, for example, capability information and operation information of the APs. The capability information indicates specific functions supported by the APs, and the operation information may indicate an operating center frequency, an operating bandwidth, and the like of the APs. Then, the station chooses, based on more detailed information, to establish an association with a corresponding AP. The following uses an example for description.

In example 1, the station sends an association request to the AP, and the AP includes a neighbor report element in an association response frame or a reassociation response, where the neighbor report element includes information about one or more APs. Then, the station may choose to establish an association with one or more APs in the MLD. For example, as shown in FIG. 6, the station sends the association request frame to the AP. In this case, the AP includes, a neighbor report element of an AP in the association response frame or the reassociation response frame carries information about an AP whose MAC address is BSSID-2x and that is in the MLD 2. Then, the station chooses whether to establish an association with the AP whose MAC address is BSSID-2x.

In the method shown in FIG. 9, the neighbor report element of the second management frame carries information about the MLD to which the reported AP is affiliated, so that the station receiving the second management frame can learn of a basic status of each reported AP in the MLD based on the information. This helps select, from the neighbor APs, a candidate AP present during BSS transition of the station.

For the neighbor report element in the second management frame, in another implementation, this embodiment proposes to add at least one of the following information to the neighbor report element:
whether the reported AP is affiliated to the same MLD the reporting AP;
whether the reported AP belongs to a specific MLD; or
if the reported AP belongs to a specific MLD, some or all information corresponding to the MLD is further indicated, for example, one or more of an MLD MAC address, a link ID corresponding to the reported AP, a quantity of stations included in the MLD, or information about each station.

In a first implementation, as shown in FIG. 10, one 1-bit MLD indication bit is carried in between B21 and B31 in the BSS information field, to indicate whether the BSSID is affiliated to a specific MLD. If the BSSID is affiliated to the specific MLD, the MLD indication bit is set to 1; otherwise, the MLD indication bit is set to 0.

When the MLD indication bit is set to 1, a subelement for describing the MLD to which the reporting AP is affiliated is carried in the optional subelements, and one or more of the following indication information is carried in the subelement:
an MLD MAC address;
a quantity of APs in an MLD;
an indication of an STR (simultaneous transmit/receive, simultaneous transmit/receive) capability between APs;
a link ID corresponding to the reported AP; or
information about another member AP in the MLD, such as a link ID, an operating class, a channel number, and a BSSID of the member AP.

In a second implementation, for example, as shown in FIG. 10, one 1-bit MLD indication bit is carried between B21 and B31 in the BSS information field, to indicate whether the BSSID is affiliated to a specific MLD. If the BSSID is a part of a specific MLD, the MLD indication bit is set to 1; otherwise, the MLD indication bit is set to 0.

When the MLD indication bit is set to 1, a subelement for describing the MLD to which the reported AP is affiliated is carried in the optional subelements, and the following indication information is carried in the subelement:
an MLD MAC address.

The information about the another AP in the MLD, for example, the operating class, the channel number, and the BSSID, may be indicated by using another neighbor report element, and the same subelement for describing the corresponding MLD is carried in the optional subelements.

Optionally, in the second implementation, the neighbor report element may further include an indication manner for indicating whether a reported AP indicated by a neighbor report element is affiliated to a same MLD as a reported AP indicated by a next neighbor report element in the management frame. For example, one 1-bit previous MLD indication bit is carried between B21 and B31 in the BSS information field, to indicate whether the reported AP is affiliated to a same MLD as a previous reported AP.

In a third implementation, one 1-bit MLD indication bit is carried between B21 and B31 in the BSS information field, to indicate whether the reported AP is affiliated to the same MLD as the reporting AP. If the reported AP is affiliated to the same MLD as the reporting AP, optionally, the neighbor report element may not include information about the MLD to which the reported AP and the reporting AP are affiliated, because the management frame sent by the reporting AP carries the information about the MLD to which the reporting AP is affiliated.

In the method in this embodiment of this application, the station may obtain, from the neighbor report element, the information about the MLD to which the reported AP is affiliated, so that the station can learn of a basic status of each reported AP in the MLD based on the information. This helps select, from the neighbor APs, a candidate AP present during BSS transition of the station.

Figure 11:
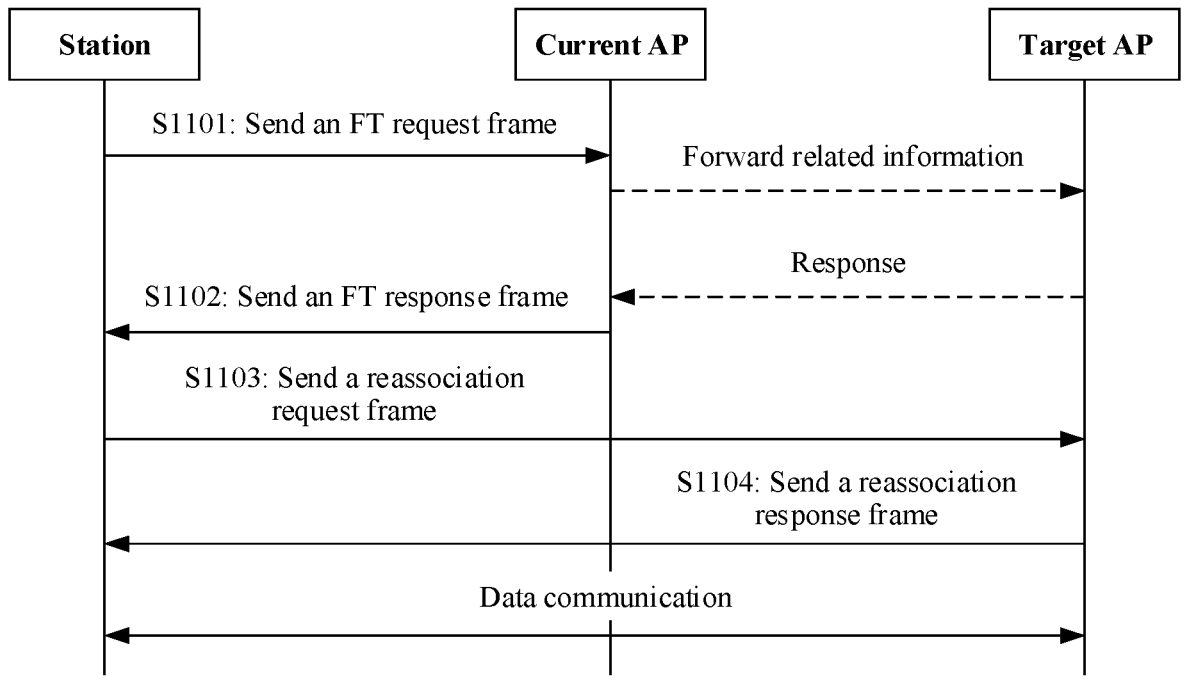
FIG. 11 is a schematic diagram of interaction of a fast BSS transition method based on a DS system according to an embodiment of this application.

FIG. 11 shows a fast BSS transition method based on a DS system according to an embodiment of this application. A station (non-AP), a current AP (current AP) associated with the station, and a target AP (Target AP) to which the station needs to be transitioned are included in the method. A method for transitioning, by the station, from the associated current AP to the target AP includes the following steps.

Step S1101: The station sends a fast transition (fast transition, FT) request (Request) frame to the current AP.

Optionally, the current AP replies with an ACK frame after receiving the FT request frame.

Step S1102: The current AP sends an FT response frame to the station.

Optionally, the station replies with an ACK frame after receiving the FT response frame or the authentication response frame.

In this embodiment of this application, the station specifically serves as a fast transition originator (Fast Transition Originator, FTO). By sending the FT request frame, the station initiates BSS transition performed based on a distributed system (Distributed system, DS). A sending address of the FT request frame is a MAC address of the station, and a receiving address of the FT request frame is a MAC address of the current AP, the FT request frame further carries first address information. The first address information includes a MAC address of an MLD to which the station is affiliated, a MAC address of an MLD to which a target AP is affiliated, and a target AP MAC address; or the first address information includes the MAC address of the MLD to which the station is affiliated and the MAC address of the MLD to which the target AP is affiliated.

Figures 13, 14, 15:
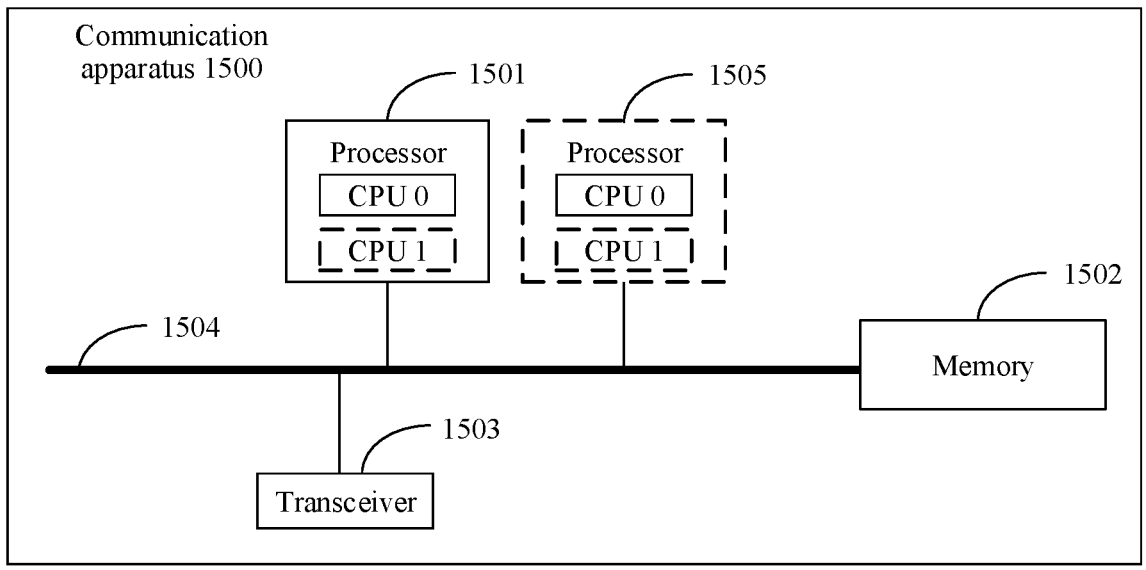
FIG. 13 is a schematic diagram of a format of an FT request action frame field according to an embodiment of this application.
FIG. 14 is a schematic diagram of a format of another FT request action frame field according to an embodiment of this application.
FIG. 15 is a schematic diagram of composition of a communication apparatus according to an embodiment of this application.

For example, FIG. 13 and FIG. 14 show a TF request action field and a TF response frame action field. The TF request action field includes a category subfield, an FT action subfield, a STA address subfield, a target AP address subfield, and an FT request frame body subfield, as shown in FIG. 13. The FT response frame action field includes an FT confirm action field, and the FT request action field includes a category subfield, an FT action subfield, a STA address subfield, a target AP address subfield, a status code subfield, and an FT response frame body subfield, as shown in FIG. 14. The TF request frame action field and the TF response action field are carried in the TF request frame and the TF response frame, respectively. MAC headers of the TF request frame and the TF response frame carry a receiving address and a sending address.

Optionally, if the station is a station in a station MLD, and the target AP is an AP in an AP multi-link device, the MAC address, in the first address information, of the MLD to which the station is affiliated is carried in a station MAC address field in FIG. 13 or FIG. 14. The MAC address, in the first address information, of the MLD to which the target AP is affiliated is carried in a target AP MAC address field in FIG. 13 or FIG. 14. It should be noted that, if the station sending the FT request frame is not affiliated to the MLD, the station MAC address field is still for carrying the MAC address of the station sending the FT request frame. If the target AP to which the station sending the FT request frame needs to be transitioned is not affiliated to the MLD, the target AP address field is still for carrying the target AP MAC address to which the station needs to be transitioned.

In another manner, the station MAC address field in the FT request action field is still for carrying the MAC address of the station sending the FT request frame, and the target AP address field is still for carrying the target AP MAC address to which the station sending the FT request frame needs to be transitioned. The MAC address of the MLD to which the station is affiliated and the MAC address of the MLD to which the target AP is affiliated are carried in the FT request frame body subfield in FIG. 13 or FIG. 14. It should be noted that the MAC address of the MLD to which the station is affiliated does not exist if the station sending the FT request frame is affiliated to the MLD. The MAC address of the MLD to which the target AP is affiliated does not exist if the target AP to which the station sending the FT request frame needs to be transitioned is not affiliated to the MLD.

Specifically, after receiving the FT action frame, the current AP parses the FT action frame to obtain the first address information carried in the FT action frame; and sends the first address information obtained through parsing to the target AP (Target AP).

Step S1103: The station sends a reassociation request frame to the target AP.

A current AP address field in the reassociation request frame carries a MAC address of an MLD to which the current AP is affiliated.

Optionally, the target station responds with an ACK frame after receiving the reassociation request frame.

Step S1104: The target AP replies with a reassociation response frame to the current station.

Optionally, the station replies with an ACK frame after receiving the reassociation response frame.

Optionally, both the reassociation request frame and the reassociation response frame carry the first address information. The MAC address, in the first address information, of the MLD to which the target AP is affiliated is carried in the target AP MAC address field or carried in a newly added field. Optionally, the MAC address, in the first address information, of the MLD to which the station is affiliated is carried in the station MAC address field or carried in a newly added field. In addition, if the station sending the reassociation request frame is not affiliated to the MLD, the station MAC address field is still for carrying the MAC address of the station sending the reassociation request frame.

In addition to the foregoing FT protocol, this embodiment of this application is further applicable to an FT resource request protocol. In addition to steps S1101, S1102, S1103, and S1104, the FT resource request protocol based on the DS system further includes the following steps between step S1102 and step S1103.

Step S1105: The station sends an FT confirm (confirm) frame to the current AP.

Optionally, the current AP replies with an ACK frame after receiving the FT confirm (confirm) frame.

Step S1106: The current AP sends an FT ACK frame to the station.

Optionally, the station replies with an ACK frame after receiving the FT ACK frame.

The FT confirm (confirm) frame includes an FT confirm action field. The FT confirm action field includes a category subfield, an FT action subfield, a STA address subfield, a target AP address subfield, and an FT confirm frame body subfield, and has a structure similar to that in FIG. 13. The FT ACK frame includes an FT ACK action field. The FT ACK action field includes a category subfield, an FT action subfield, a STA address subfield, a target AP address subfield, a status code subfield, and an FT ACK frame body subfield, and has a structure similar to that in FIG. 14. The FT confirm frame and the FT ACK frame carry the first address information. A specific carrying method is described in the foregoing FT request frame and FT response frame. Details are not described again. There may be one or more or none of the MAC address of the MLD to which the station is affiliated and the MAC address of the MLD to which the target AP is affiliated. For details, refer to description of the FT request frame and the FT response frame. Details are not described herein again.

The method shown in FIG. 11 is for fast transition from a station multi-link device to an AP multi-link device, from a station to an AP multi-link device, or from a station multi-link device to an AP, to help all stations in the multi-link device participate in fast transition.

Figure 12:
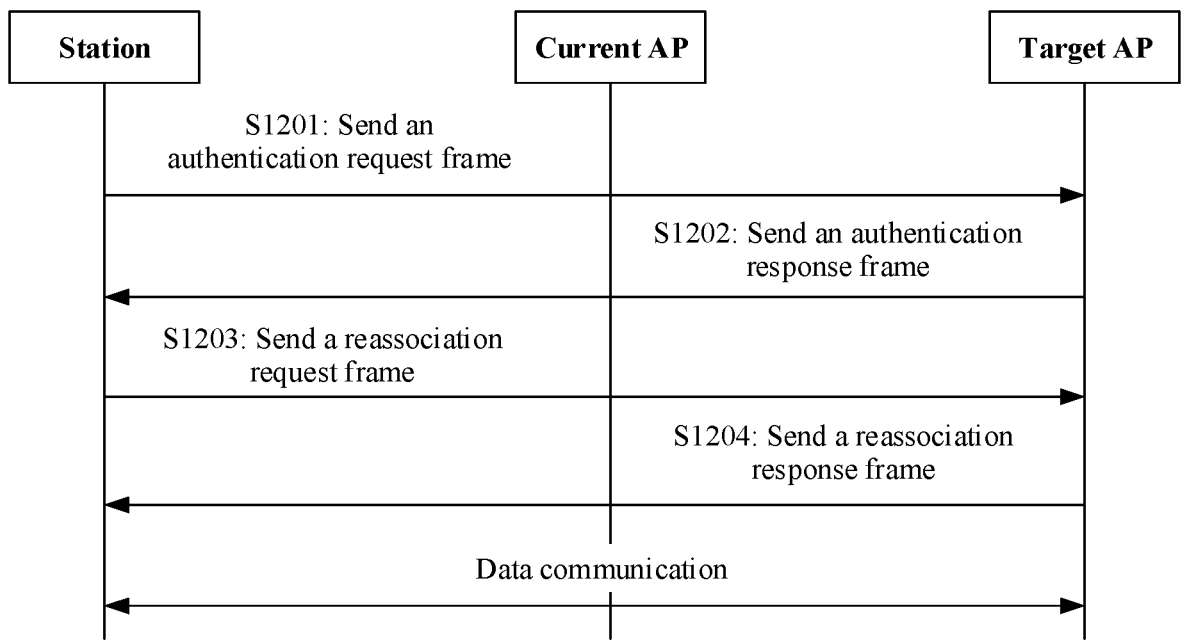
FIG. 12 is a schematic diagram of interaction of a fast BSS transition method based on a radio air interface according to an embodiment of this application.

FIG. 12 shows a fast BSS transition method based on a radio air interface according to an embodiment of this application. A station (non-AP), a current AP (current AP) associated with the station, a target AP (Target AP) to which the station needs to be transitioned are included in the method. If the station is a station in a station MLD, and the target AP is an AP in an AP multi-link device, when the station transitions from the associated current AP to the target AP, the method includes the following steps.

Step S1201: The station sends an authentication request frame to the target AP.

Optionally, the target AP replies with an ACK frame after receiving the authentication request frame.

Step S1202: The target AP sends an authentication response frame to the station.

Optionally, the station replies with an ACK frame after receiving the authentication response frame.

In this embodiment of this application, the authentication request frame and the authentication response frame further carry first address information. For example, the first address information is carried in a frame body. The first address information includes a MAC address of an MLD to which the station is affiliated, a MAC address of an MLD to which the target AP is affiliated, and a target AP MAC address. Alternatively, the first address information includes the MAC address of the MLD to which the station is affiliated and the MAC address of the MLD to which the target AP is affiliated. In another manner, the authentication request frame carries first address information. Specifically, in the authentication request frame, an SA address field carries a MAC address of an MLD to which a STA is affiliated, and a DA field carries the MAC address of the MLD to which the target AP is affiliated. The authentication response frame carries first address information. Specifically, in the authentication response frame, an SA address field carries the MAC address of the MLD to which the target AP is affiliated, and a DA field carries an address of the MLD to which the STA is affiliated. There may be one or more or none of the MAC address of the MLD to which the station is affiliated and the MAC address of the MLD to which the target AP is affiliated. For details, refer to description of the FT request frame and the FT response frame. Details are not described herein again.

Step S1203: The station sends a reassociation request frame to the target AP.

A current AP address field in the reassociation request frame carries a MAC address of an MLD to which the current AP is affiliated.

Optionally, the target station responds with an ACK frame after receiving the reassociation request frame.

Step S1204: The target AP replies with a reassociation response frame to the current station.

Optionally, the station replies with an ACK frame after receiving the reassociation response frame.

Optionally, both the reassociation request frame and the reassociation response frame carry the first address information. The MAC address, in the first address information, of the MLD to which the target AP is affiliated is carried in a target AP MAC address field or carried in a newly added field. Optionally, the MAC address, in the first address information, of the MLD to which the station is affiliated is carried in a station MAC address field or carried in a newly added field. In addition, if the station sending the reassociation request frame is not affiliated to the MLD, the station MAC address field is still for carrying the MAC address of the station sending the reassociation request frame.

In addition to the foregoing FT protocol, this embodiment of this application is further applicable to an FT resource request protocol. The FT resource request protocol based on a radio air interface not only includes the foregoing steps S1201, S1202, S1203, and S1204, but also includes the following steps between steps S1202 and S1203:

Step S1205: The station sends an authentication confirm (confirm) frame to the current AP.

Step S1206: The current AP sends an authentication ACK frame to the station.

The authentication confirm (confirm) frame and the authentication ACK frame further carry one or more of the MAC address of the MLD to which the station is affiliated and the MAC address of the MLD to which the target AP is affiliated, which are, for example, carried in a frame body. In another manner, the authentication confirm (confirm) frame carries the first address information. Specifically, in the authentication confirm (confirm) frame, an SA address field carries the address of the MLD to which the STA is affiliated, and a DA field carries the MAC address of the MLD to which the target AP is affiliated. The authentication ACK frame carries the first address information. Specifically, in the authentication ACK frame, an SA address field carries the MAC address of the MLD to which the target AP is affiliated, and a DA field carries the address of the MLD to which the STA is affiliated. There may be one or more or none of the MAC address of the MLD to which the station is affiliated and the MAC address of the MLD to which the target AP is affiliated. For details, refer to description of the FT request frame and the FT response frame. Details are not described herein again.

For transition from a non-AP MLD to an AP MLD, in an example, a STA address field and a target AP Address field in a corresponding FT request/response/confirm/ACK frame should carry a SAP address of the corresponding non-AP MLD and a SAP address of the corresponding AP MLD, respectively.

The method shown in FIG. 12 is for fast transition from a station multi-link device to an AP multi-link device, from a station to an AP multi-link device, or from a station multi-link device to an AP, to help all stations in the multi-link device participate in fast transition.

The following describes in detail apparatuses provided in embodiments of this application, to improve AP discovery efficiency.

FIG. 15 shows a communication apparatus 1500 according to an embodiment of this application. The apparatus may be the access point AP in the foregoing embodiments (for example, the reporting AP in the AP multi-link device) or the station in the foregoing embodiments (for example, the station receiving the first management frame, the station receiving the second management frame, or the station in the foregoing BSS transition procedure), or may be a chip or a processing system in the access point AP (for example, the reporting AP in the AP multi-link device) or the station (for example, the station receiving the first management frame, the station receiving the second management frame, or the station in the foregoing BSS transition procedure). The apparatus may implement the method and functions in the embodiment shown in FIG. 4, the method and functions in the embodiment shown in FIG. 9, the method and functions in the embodiment shown in FIG. 11 are implemented, or the method and functions in the embodiment shown in FIG. 12. Due to a difference between integration degrees, the communication apparatus may include one or more of the components shown in FIG. 15. The components shown in FIG. 15 may include at least one processor 1501, a memory 1502, a transceiver 1503, and a communication bus 1504.

The following specifically describes the components of the communication apparatus 1500 with reference to FIG. 15.

The processor 1501 is a control center of the communication apparatus 1500, and may be a processor or a collective term of a plurality of processing elements. For example, the processor 1501 is a central processing unit (central processing unit, CPU), an application-specific integrated circuit (Application Specific Integrated Circuit, ASIC), or one or more integrated circuits configured to implement embodiments of this application, for example, one or more microprocessors (digital signal processor, DSP), or one or more field programmable gate arrays (Field Programmable Gate Array, FPGA). The processor 1501 may implement various functions of the communication device by running or executing a software program stored in the memory 1502 and invoking data stored in the memory 1502. During specific implementation, in an embodiment, the processor 1501 may include one or more CPUs, for example, a CPU 0 and a CPU 1 shown in FIG. 15.

During specific implementation, in an embodiment, the communication apparatus 1500 may include a plurality of processors, for example, the processor 1501 and a processor 1505 shown in FIG. 15. Each of the processors may be a single-core (single-CPU) processor or may be a multi-core (multi-CPU) processor. The processor herein may be one or more communication devices, circuits, and/or processing cores configured to process data (for example, computer program instructions).

The memory 1502 may be a read-only memory (read-only memory, ROM) or another type of static storage communication device that can store static information and instructions; or a random access memory (random access memory, RAM) or another type of dynamic storage communication device that can store information and instructions. The memory may alternatively be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 1502 may exist independently, or may be connected to the processor 1501 through a communication bus 15010. Alternatively, the memory 1502 may be integrated with the processor 1501. The memory 1502 is configured to store a software program for executing the solution of this application, and the processor 1501 controls execution of the software program.

The transceiver 1503 is configured to communicate with another device (for example, a second device). Certainly, the transceiver 1503 may be further configured to communicate with a communication network, for example, the Ethernet, a radio access network (radio access network, RAN), or a wireless local area network (Wireless Local Area Network, WLAN). The transceiver 1503 may include a receiving unit for implementing a receiving function and a sending unit for implementing a sending function.

The communication bus 15010 may be an industry standard architecture (Industry Standard Architecture, ISA) bus, a peripheral component interconnect (Peripheral Component interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 15, but this does not mean that there is only one bus or only one type of bus.

In an example, the communication apparatus 1500 is a complete device. The communication apparatus may include a processor 1501, a memory 1502, a transceiver 1503, and a communication bus 1504. Optionally, the communication apparatus may further include another component, for example, a display.

Optionally, the communication apparatus 1500 is an access point AP (for example, the reporting AP in the AP multi-link device), and may be configured to implement the method and functions in the embodiment shown in FIG. 4. For example, the memory stores a computer program (instruction). When the processor invokes the computer program, the foregoing method and functions are implemented. For example, the processor is configured to generate a first management frame (carrying a reduced neighbor report element), and the transceiver is configured to send a second management frame (carrying a neighbor report element). For example, the processor is configured to control the transceiver to perform step S401. Certainly, a process of generating the first management frame in step S401 may also be performed by the processor.

Optionally, the communication apparatus 1500 is a station, and may be configured to implement the method and functions of the station in the embodiment shown in FIG. 9. For example, the memory stores a computer program. When the processor invokes the computer program, the foregoing method and functions are implemented. For example, the processor is configured to generate signaling or a frame (for example, an FT request frame or an authentication request frame), and the transceiver is configured to send the signaling or the frame (for example, an FT response frame or an authentication response frame). For example, the processor is configured to generate and control the transceiver to receive the FT request frame or the authentication request frame in step S901. Then, the processor determines, based on a related condition, whether the FT response frame or the authentication response frame needs to be replied with, and if the FT response frame or the authentication response frame needs to be replied with, the transceiver sends the FT response frame or the authentication response frame. In another example, the communication apparatus 1500 is a chip system or a processing system in an access point AP (for example, a reporting AP in an AP multi-link device) or a station (for example, a station receiving a first management frame, a station receiving a second management frame, or a station in the foregoing BSS handover procedure), so that a device on which the chip system or the processing system is installed implements the method and functions in the embodiment shown in FIG. 4, FIG. 9, FIG. 11, or FIG. 12. In this case, the communication apparatus 1500 may include a part of components shown in FIG. 15. For example, the communication apparatus 1500 includes a processor, and the processor may be coupled to the memory and invoke and execute instructions in the memory, so that a device on which the chip system or the processing system is installed is configured to implement the method and functions shown in FIG. 4, FIG. 9, FIG. 11, or FIG. 12. Optionally, the memory may be a component in the chip system or the processing system, or may be a coupled/connected component outside the chip system or the processing system. In an example, the chip system or the processing system is installed in an access point AP (for example, a reporting AP in an AP multi-link device) or a station (for example, a station receiving a first management frame, a station receiving a second management frame, or a station in the foregoing BSS transition procedure), so that the access point AP (for example, the reporting AP in the AP multi-link device) or the station (for example, the station receiving the first management frame, the station receiving the second management frame, or the station in the foregoing BSS handover procedure) may implement a corresponding method and function in the foregoing embodiments.

The chip system or processing system may support communication based on 802.11 series protocols, for example, 802.11be, 802.11ax, and 802.11ac. The chip system may be installed in devices in various scenarios that support WLAN transmission. The devices in the WLAN transmission scenarios are described at the beginning of this specification, and details are not described herein.

In embodiments of this application, division into functional modules may be performed on an access point AP (for example, a reporting AP in an AP multi-link device) or a station (for example, a station receiving a first management frame, a station receiving a second management frame, or a station in the foregoing BSS transition procedure) based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into the modules is an example, and is merely a logical function division. In actual implementation, another division manner may be used.

Figure 16:
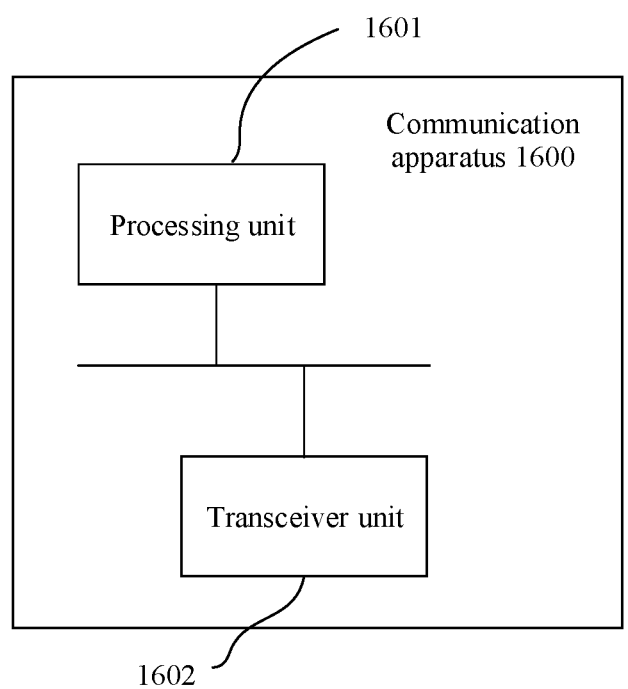
FIG. 16 is a schematic diagram of composition of another communication apparatus according to an embodiment of this application.

When an integrated unit is used, FIG. 16 is a possible schematic diagram of a structure of a communication apparatus 1600. The communication apparatus 1600 may be a link device, or a chip or a processing system in a multi-link device. The communication apparatus 1600 may perform operations of the multi-link device in the foregoing method embodiments. The communication apparatus 1600 includes a processing unit 1601 and a transceiver unit 1602.

In an example, the communication apparatus 1600 is the foregoing access point AP (for example, the reporting AP in the AP multi-link device) or the foregoing station (for example, the station receiving the first management frame, the station receiving the second management frame, or the station in the foregoing BSS transition procedure).

The processing unit 1601 may be configured to control and manage actions of the communication apparatus 1600, for example, generating the first management frame or the second management frame. For another example, the processing unit 1601 controls operations of the transceiver unit 1602. Optionally, if the communication apparatus 1600 includes a storage unit, the processing unit 1601 may further execute a program or instructions stored in the storage unit, so that the communication apparatus 1600 implements the method and functions in any one of the foregoing embodiments.

For example, the processing unit 1601 may control the transceiver unit to perform, for example, step S401 in FIG. 4, step 901 in FIG. 9, steps S1101 to S1104 in FIG. 11, or steps S1201 to S1204 in FIG. 12, and/or another process of the technology described in this specification. All related content of the steps in the foregoing method embodiments may be cited in function description of corresponding functional modules. Details are not described herein again.

For example, the transceiver unit 1602 may send and receive data or signaling transmitted on one link, or may send and receive data or signaling transmitted on multiple links. Optionally, the transceiver unit 1602 may be one transceiver module, or may include a plurality of transceiver modules. When the transceiver unit 1602 is one transceiver module, the transceiver module may send and receive data on multiple links. For example, if a first multi-link device operates on two links, when the transceiver unit 1602 includes two transceiver modules, one of the transceiver modules operates on one link, and the other transceiver module operates on the other link. For example, the transceiver unit 1602 may be configured to perform, for example, step S401 in FIG. 4, step S901 in FIG. 9, steps S1101 to S1104 in FIG. 11, or steps S1201 to S1204 in FIG. 12, and/or another process of the technology described in this specification. All related content of the steps in the foregoing method embodiments may be cited in function description of corresponding functional modules. Details are not described herein again.

For example, the communication apparatus 1600 may be the communication apparatus shown in FIG. 15, the processing unit 1601 may be the processor 1501 in FIG. 15, and the transceiver unit BB02 may be the transceiver 1503 in FIG. 15. Optionally, the communication apparatus 1600 may further include a memory. The memory is configured to store corresponding program code and data that are for the communication apparatus 1600 to perform any one of the foregoing communication methods between multi-link devices. Descriptions of all related content of the components in FIG. 15 may be cited in function description of corresponding components of the communication apparatus 1600, and details are not described herein again.

For example, the communication apparatus 1600 may alternatively be a chip or a processor, the processing unit 1601 is a processing circuit in the chip or the processor, the transceiver unit 1602 may be an input/output circuit in the chip or the processor, the input/output circuit is an interface for mutual communication or data exchange between the chip or the processor and another coupled component. It can be ensured that signaling or data information or program instructions are input to the chip or the processor for processing, processed data or signaling is output to the another coupled component, and the first multi-link device on which the chip or the processor is installed is controlled to implement functions.

In another example, the communication apparatus 1600 is a second device or a chip in the second device.

For example, the processing unit 1601 may be configured to generate a first management frame or a second management frame, for example, the first management frame in step S401 in FIG. 4 is generated by the processing unit 1601, the second management frame in S901 in FIG. 9 is generated by the processing unit 1601, the FT request frame in step S1101 in FIG. 11 is generated by the processing unit 1601, or the authentication request frame in step S1201 in FIG. 12 is generated by the processing unit 1601; and/or configured to perform another process of the technology described in this specification. All related content of the steps in the foregoing method embodiments may be cited in function description of corresponding functional modules. Details are not described herein again.

For example, the transceiver unit 1602 may send and receive data or signaling transmitted on one link, or may send and receive data or signaling transmitted on multiple links. Optionally, the transceiver unit 1602 may be one transceiver module, or may include a plurality of transceiver modules. When the transceiver unit 1602 is one transceiver module, the transceiver module may send and receive data on multiple links. For example, if the station operates on two links, when the transceiver unit 1602 includes two transceiver modules, one transceiver module operates on one link, and the other transceiver module operates on the other link. For example, the transceiver unit 1602 may be configured to perform, for example, step S401 in FIG. 4, steps S901 and S902 in FIG. 9, steps S1101 to S1104 shown in FIG. 11, or steps S1201 to S1204 shown in FIG. 12; and/or another process of the technology described in this specification. All related content of the steps in the foregoing method embodiments may be cited in function description of corresponding functional modules. Details are not described herein again.

For example, the communication apparatus 1600 may be the communication apparatus shown in FIG. 15, the processing unit 1601 may be the processor 1501 in FIG. 15, and the transceiver unit 1602 may be the transceiver 1503 in FIG. 15. Optionally, the communication apparatus 1600 may further include a memory. The memory is configured to store program code and data that are for the communication apparatus 1600 to perform any one of the foregoing embodiments. Descriptions of all related content of the components in FIG. 15 may be cited in function description of corresponding components of the communication apparatus 1600, and details are not described herein again.

For example, the communication apparatus 1600 may alternatively be a chip or a processor, the processing unit 1601 is a processing circuit in the chip or the processor, the transceiver unit 1602 may be an input/output circuit in the chip or the processor, the input/output circuit is an interface for mutual communication or data exchange between the chip or the processor and another coupled component. It can be ensured that signaling or data information or program instructions are input to the chip or the processor for processing, processed data or signaling is output to the another coupled component, and a device on which the chip or the processor is installed is controlled to implement functions.

An embodiment of this application further provides a computer-readable storage medium. The computer-readable storage medium stores computer program code. When the foregoing processor executes the computer program code, an electronic device (for example, an AP or a station) in which the processor is located is enabled to perform the method in any one of the embodiments in FIG. 4, FIG. 9, FIG. 11, and FIG. 12.

An embodiment of this application further provides a computer program product. When the computer program product is run on a computer, the computer (for example, an AP or a station) is enabled to perform the method in any one of the embodiments in FIG. 4, FIG. 9, FIG. 11, and FIG. 12.

An embodiment of this application further provides a communication apparatus. The apparatus may exist in a product form of a chip. A structure of the apparatus includes a processor and an interface circuit. The processor is configured to communicate with another apparatus by using a reception circuit, so that the apparatus performs the method in any one of the embodiments in FIG. 4, FIG. 9, FIG. 11, and FIG. 12.

An embodiment of this application further provides a communication system. The communication system includes the foregoing access point AP (for example, the reporting AP in the AP multi-link device) and the foregoing station. The access point AP (for example, the reporting AP in the AP multi-link device) and the station may perform the method in the embodiment in FIG. 4, FIG. 9, FIG. 11, or FIG. 12. Alternatively, the communication system includes the foregoing station. The station may perform the method in the foregoing embodiment in FIG. 11. Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person of skill in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or dedicated computer.

The objectives, technical solutions, and benefits of this application are further described in detail in the foregoing specific implementations. It should be understood that what is described are merely specific implementations of this application, but are not intended to limit the protection scope of this application. Any modification, equivalent replacement, or improvement made based on technical solutions of this application shall fall within the protection scope of this application.

What is claimed is:

1. An access point multi-link device (AP MLD) discovery method, comprising:
 generating, by a reporting AP, a management frame, wherein the management frame comprises a first information field, wherein the first information field indicates an MLD identifier of an AP MLD with which a reported AP is affiliated or the first information field indicates that the reported AP is not affiliated with any AP MLD; and
 sending, by the reporting AP, the management frame to a station.

2. The method according to claim 1, wherein the reported AP is affiliated with a same AP MLD as the reporting AP, or the reported AP belongs to a same multiple basic service set identifier (BSSID) set as a member of an AP MLD with which the reporting AP is affiliated.

3. The method according to claim 1, wherein the first information field is set to 0 to indicate the reported AP is affiliated with a same AP MLD as the reporting AP.

4. The method according to claim 1, wherein the first information field is set to 255 to indicate that the reported AP is not affiliated with any AP MLD.

5. The method according to claim 1, wherein the management frame further comprises a link identifier of the reported AP.

6. The method according to claim 5, wherein the link identifier of the reported AP is unique in the AP MLD with which the reported AP is affiliated.

7. The method according to claim 1, wherein the management frame further comprises a link identifier of the reporting AP.

8. The method according to claim 1, wherein the management frame further comprises an MLD element, wherein a common control field of the MLD element carries link ID present field.

9. The method according to claim 1, wherein the management frame is a beacon frame or a probe response frame.

10. An access point multi-link device (AP MLD) discovery method, comprising:
receiving, by a station, a management frame from a reporting AP, wherein the management frame comprises a first information field, wherein the first information field indicates an MLD identifier of an AP MLD with which a reported AP is affiliated or the first information field indicates that the reported AP is not affiliated with any AP MLD; and
determining, by the station, the MLD identifier of the AP MLD with which the reported AP is affiliated or that the reported AP is not affiliated with any AP MLD according to the first information field.

11. The method according to claim 10, wherein the reported AP is affiliated with a same AP MLD as the reporting AP, or the reported AP belongs to a same multiple basic service set identifier (BSSID) set as a member of an AP MLD with which the reporting AP is affiliated.

12. The method according to claim 10, wherein the first information field is set to 0 to indicate the reported AP is affiliated with a same AP MLD as the reporting AP.

13. The method according to claim 10, wherein the first information field is set to 255 to indicate that the reported AP is not affiliated with any AP MLD.

14. The method according to claim 10, wherein the management frame further comprises a link identifier of the reported AP.

15. The method according to claim 14, wherein the link identifier of the reported AP corresponds to an operating class, a channel number, or a BSSID of the reported AP.

16. The method according to claim 10, wherein the management frame further comprises a link identifier of the reporting AP.

17. The method according to claim 16, wherein the link identifier of the reporting AP is carried in an MLD common information field of an MLD element.

18. The method according to claim 10, wherein the first information field is carried in a reduced neighbor report element.

19. An apparatus, comprising:
at least one memory storing program instructions; and
at least one processor coupled to the at least one memory, wherein the program instructions, when executed by the at least one processor, enable the apparatus to:
generate a management frame, wherein the management frame comprises a first information field, wherein the first information field indicates a multi-link device (MLD) identifier of an access point multi-link device (AP MLD) with which a reported AP is affiliated or the first information field indicates that the reported AP is not affiliated with any AP MLD; and
send the management frame to a station.

20. The apparatus according to claim 19, wherein the first information field is set to 0 to indicate the reported AP is affiliated with a same AP MLD as a reporting AP.

21. The apparatus according to claim 19, wherein the first information field is set to 255 to indicate that the reported AP is not affiliated with any AP MLD.

22. An apparatus, comprising:
at least one memory storing program instructions; and
at least one processor coupled to the at least one memory, wherein the program instructions, when executed by the at least one processor, enable the apparatus to:
receive a management frame from a reporting access point (AP), wherein the management frame comprises a first information field, wherein the first information field indicates a multi-link device (MLD) identifier of an AP MLD with which a reported AP is affiliated or the first information field indicates that the reported AP is not affiliated with any AP MLD; and
determine the MLD identifier of the AP MLD with which the reported AP is affiliated or that the reported AP is not affiliated with any AP MLD according to the first information field.

23. The apparatus according to claim 22, wherein the first information field is set to 0 to indicate the reported AP is affiliated with a same AP MLD as the reporting AP.

24. The apparatus according to claim 22, wherein the first information field is set to 255 to indicate that the reported AP is not affiliated with any AP MLD.

25. The method according to claim 1, wherein the first information field is carried in a reduced neighbor report element.

26. The method according to claim 5, wherein the link identifier of the reported AP corresponds to an operating class, a channel number, or a BSSID of the reported AP.

27. The method according to claim 7, wherein the link identifier of the reporting AP is carried in an MLD common information field of an MLD element.

28. The method according to claim 10, wherein the management frame is a beacon frame or a probe response frame.

29. The apparatus according to claim 19, wherein the reported AP is affiliated with a same AP MLD as a reporting AP, or the reported AP belongs to a same multiple basic service set identifier (BSSID) set as a member of an AP MLD with which the reporting AP is affiliated.

30. The apparatus according to claim 22, wherein the reported AP is affiliated with a same AP MLD as the reporting AP, or the reported AP belongs to a same multiple basic service set identifier (BSSID) set as a member of an AP MLD with which the reporting AP is affiliated.

* * * * *

UNITED STATES PATENT AND TRADEMARK OFFICE
CERTIFICATE OF CORRECTION

PATENT NO. : 11,902,887 B2
APPLICATION NO. : 17/959034
DATED : February 13, 2024
INVENTOR(S) : Ming Gan et al.

It is certified that error appears in the above-identified patent and that said Letters Patent is hereby corrected as shown below:

In the Claims

Column 54, Line 66, Claim 8, after "carries" insert therefore -- a --.

Signed and Sealed this
Seventh Day of May, 2024

Katherine Kelly Vidal
Director of the United States Patent and Trademark Office